US012650864B2

(12) United States Patent
Zhou et al.

(10) Patent No.: US 12,650,864 B2
(45) Date of Patent: Jun. 9, 2026

(54) ELECTRONIC DEVICE AND HUMAN-COMPUTER INTERACTION METHOD

(71) Applicant: Huawei Technologies Co., Ltd., Shenzhen (CN)

(72) Inventors: Xueyi Zhou, Shenzhen (CN); Jie Xu, Shanghai (CN); Ke Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 18/684,809

(22) PCT Filed: Aug. 17, 2022

(86) PCT No.: PCT/CN2022/113067
§ 371 (c)(1),
(2) Date: Feb. 19, 2024

(87) PCT Pub. No.: WO2023/020541
PCT Pub. Date: Feb. 23, 2023

(65) Prior Publication Data
US 2024/0427615 A1 Dec. 26, 2024

(30) Foreign Application Priority Data
Aug. 20, 2021 (CN) .......................... 202110961754.3

(51) Int. Cl.
*G06F 9/451* (2018.01)
*G06F 3/04817* (2022.01)

(52) U.S. Cl.
CPC .......... *G06F 9/452* (2018.02); *G06F 3/04817* (2013.01)

(58) Field of Classification Search
CPC .... G06F 9/452; G06F 3/04817; G06F 3/1454; G06F 2203/04803; G06F 3/0481; G06F 9/451; G06F 3/0486; G06F 3/04883; G09G 5/14
See application file for complete search history.

(56) References Cited

U.S. PATENT DOCUMENTS

| | | | |
|---|---|---|---|
| 2012/0081353 A1* | 4/2012 | Yusupov | G09G 5/14 345/530 |
| 2019/0250727 A1 | 8/2019 | Gogarty et al. | |
| 2022/0398049 A1* | 12/2022 | Chopra | G06F 3/0647 |
| 2023/0376264 A1* | 11/2023 | Xu | G06F 3/1454 |

* cited by examiner

*Primary Examiner* — Cao H Nguyen
(74) *Attorney, Agent, or Firm* — Slater Matsil, LLP

(57) ABSTRACT

In a human-computer interaction method, a second electronic device receives a first picture and identification information of at least one application that are sent by a first electronic device based on a first operation. The second electronic device displays the first picture and an icon of the at least one application. The second electronic device receives a second operation performed on a first icon, where the first icon is one icon in the icon of the at least one application. In response to the second operation, content of an application window of a first application displayed by the second electronic device is the same as that of an application window of the first application opened on a first interface.

20 Claims, 40 Drawing Sheets

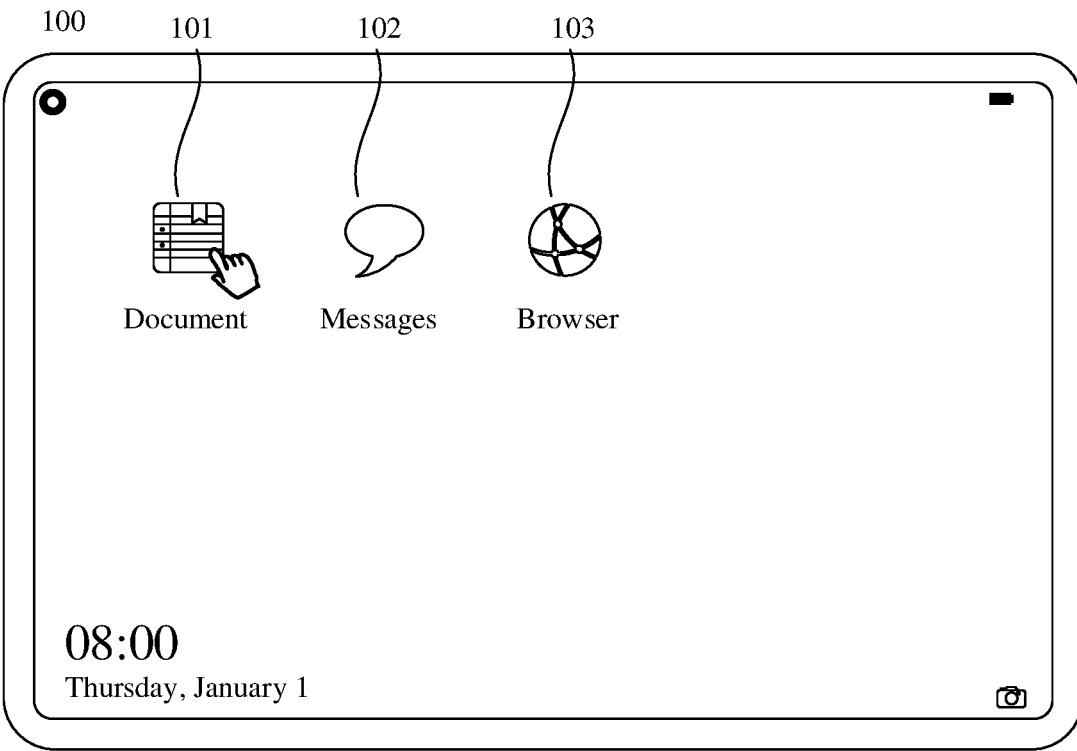
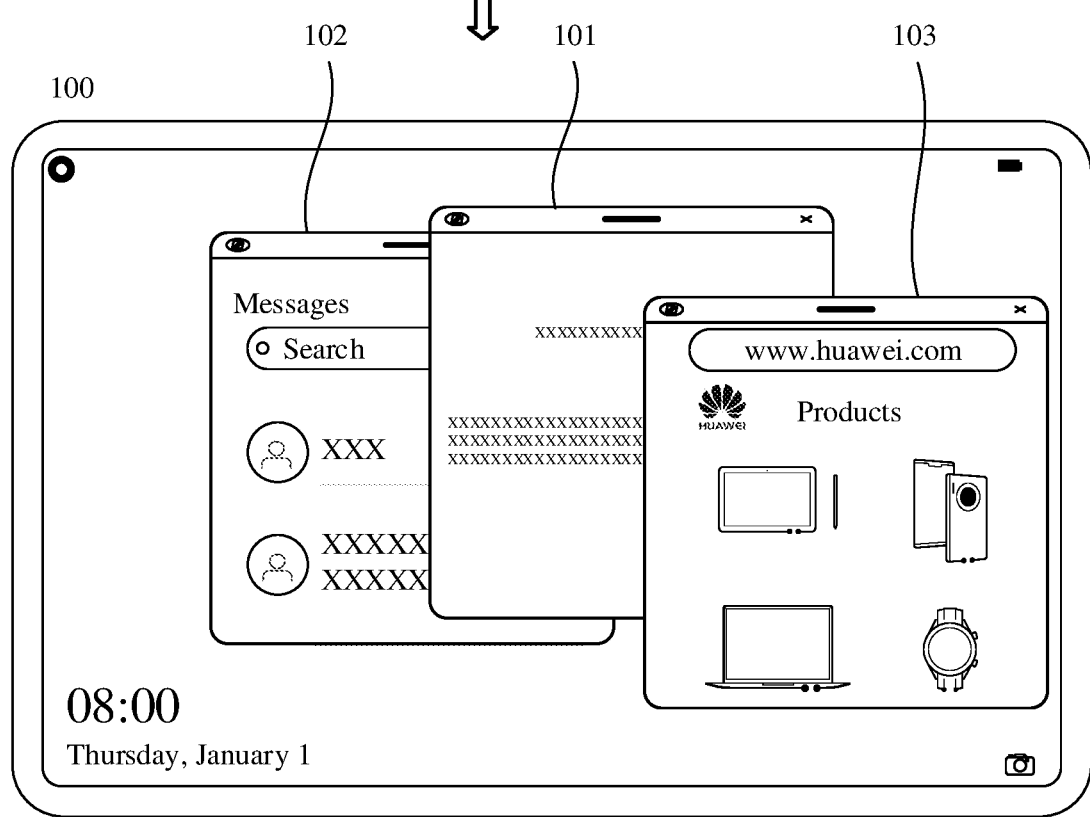
FIG. 7

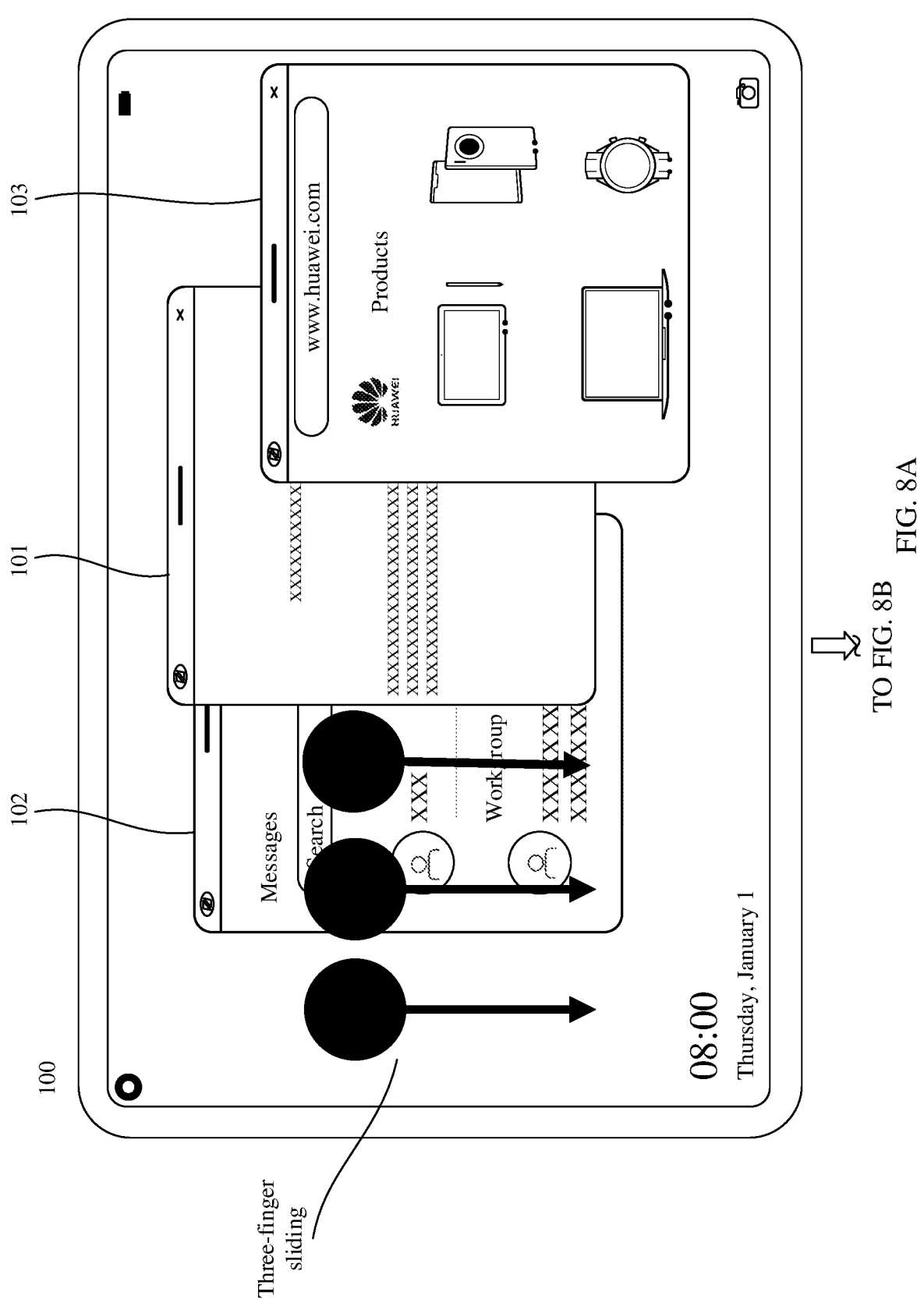
TO FIG. 8B     FIG. 8A

CONT. FROM

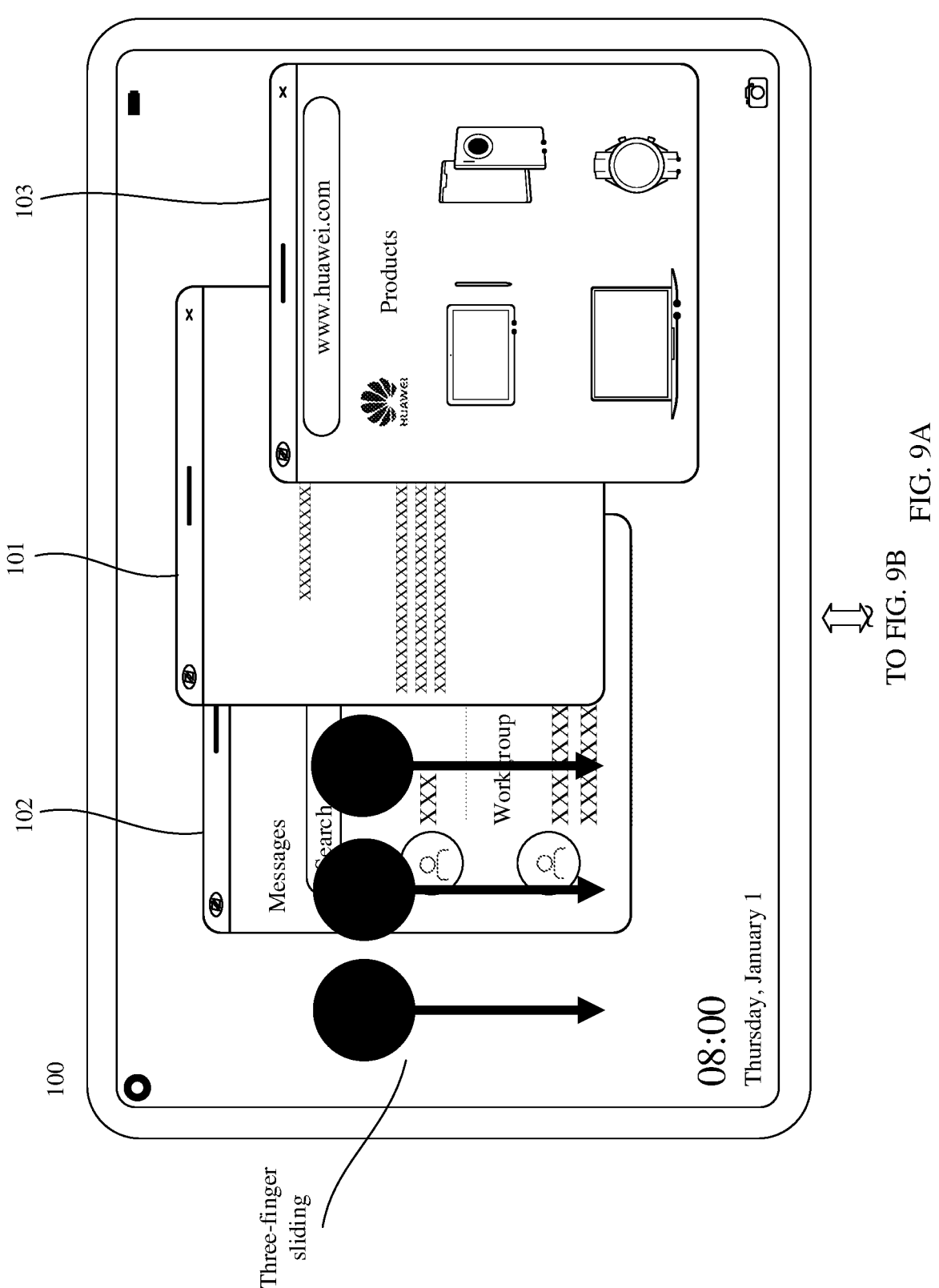
TO FIG. 9B    FIG. 9A

CONT. FROM FIG. 9A

TO FIG. 10A-2

CONT. FROM

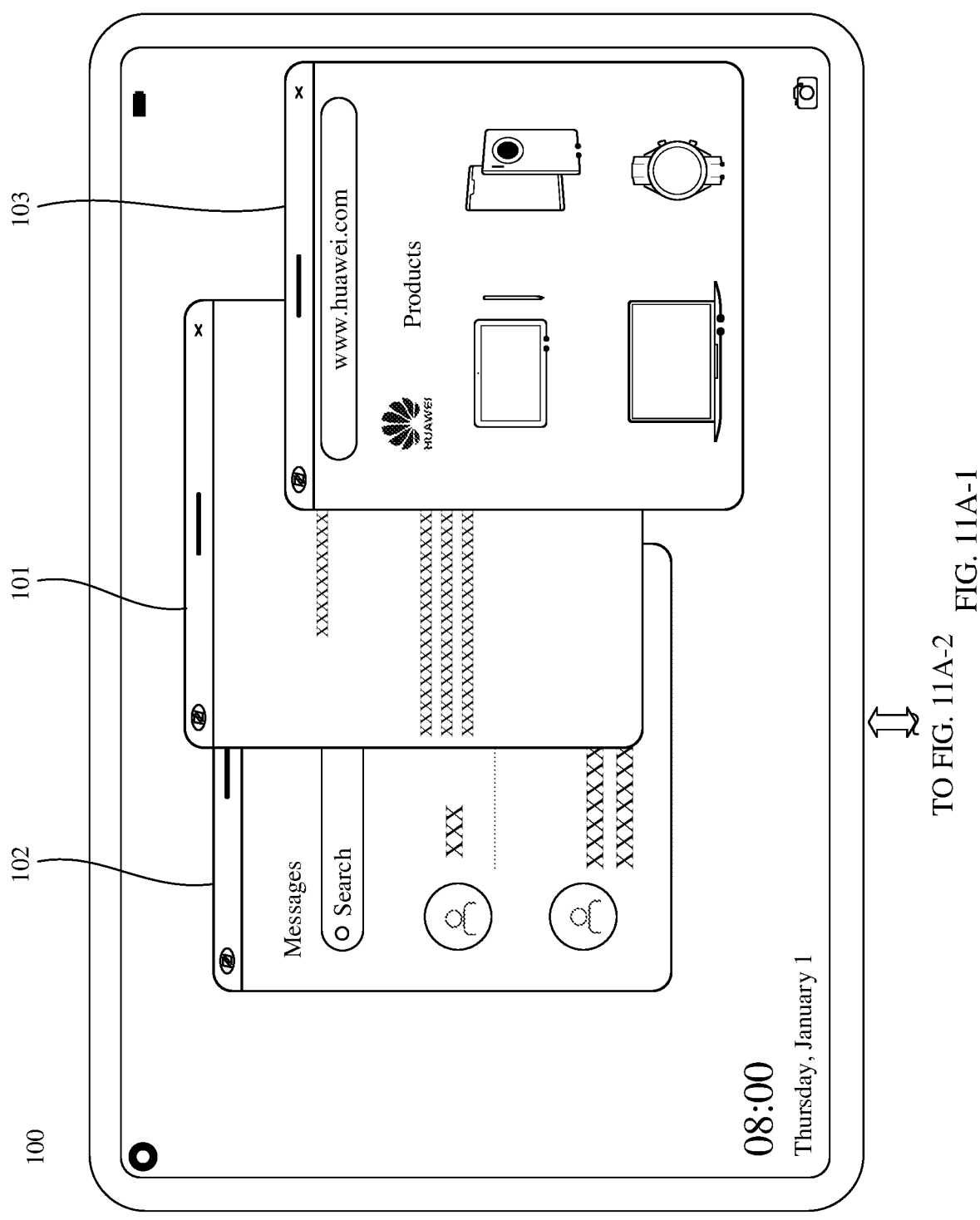
TO FIG. 11A-2    FIG. 11A-1

CONT. FROM

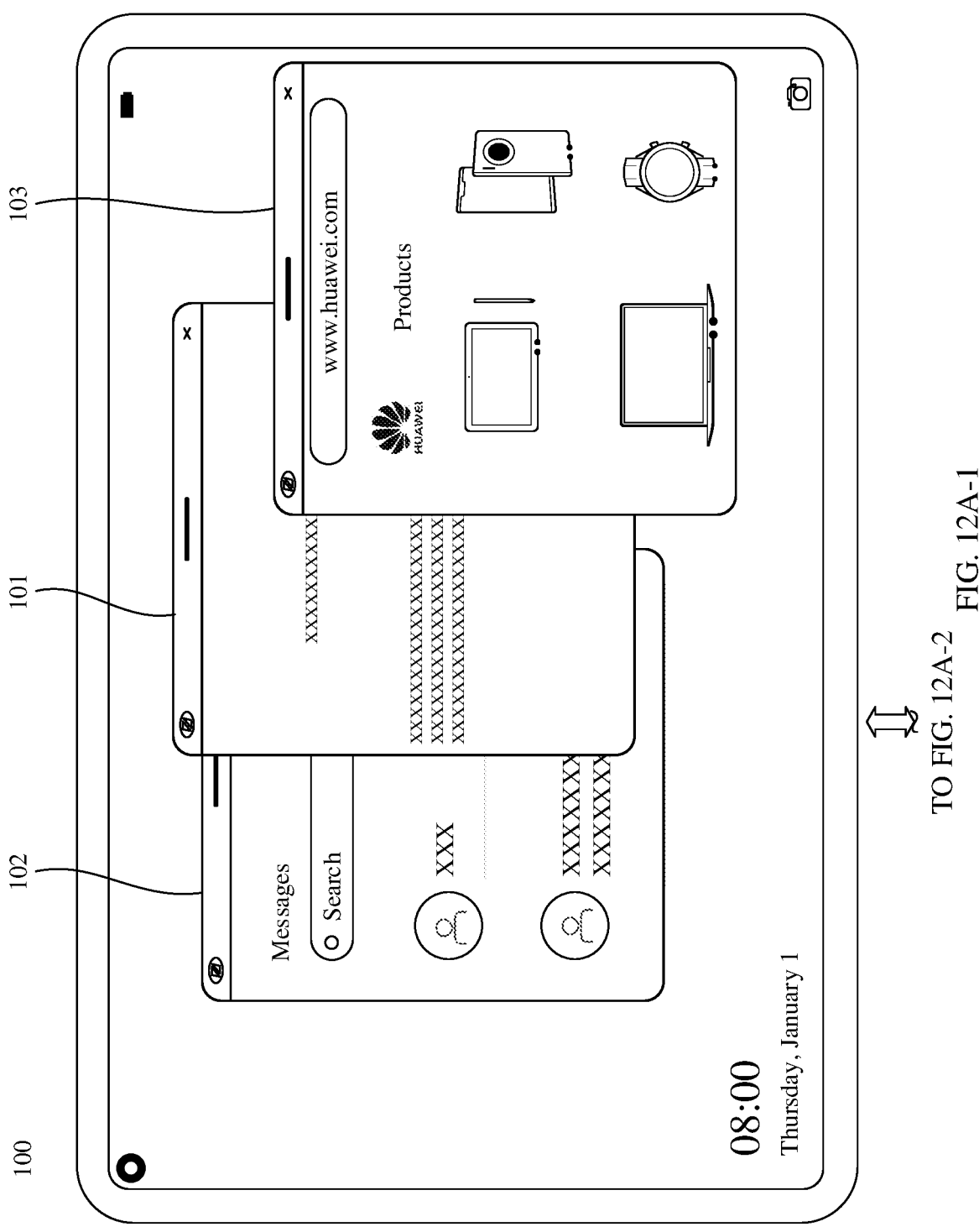
TO FIG. 12A-2    FIG. 12A-1

CONT. FROM

200

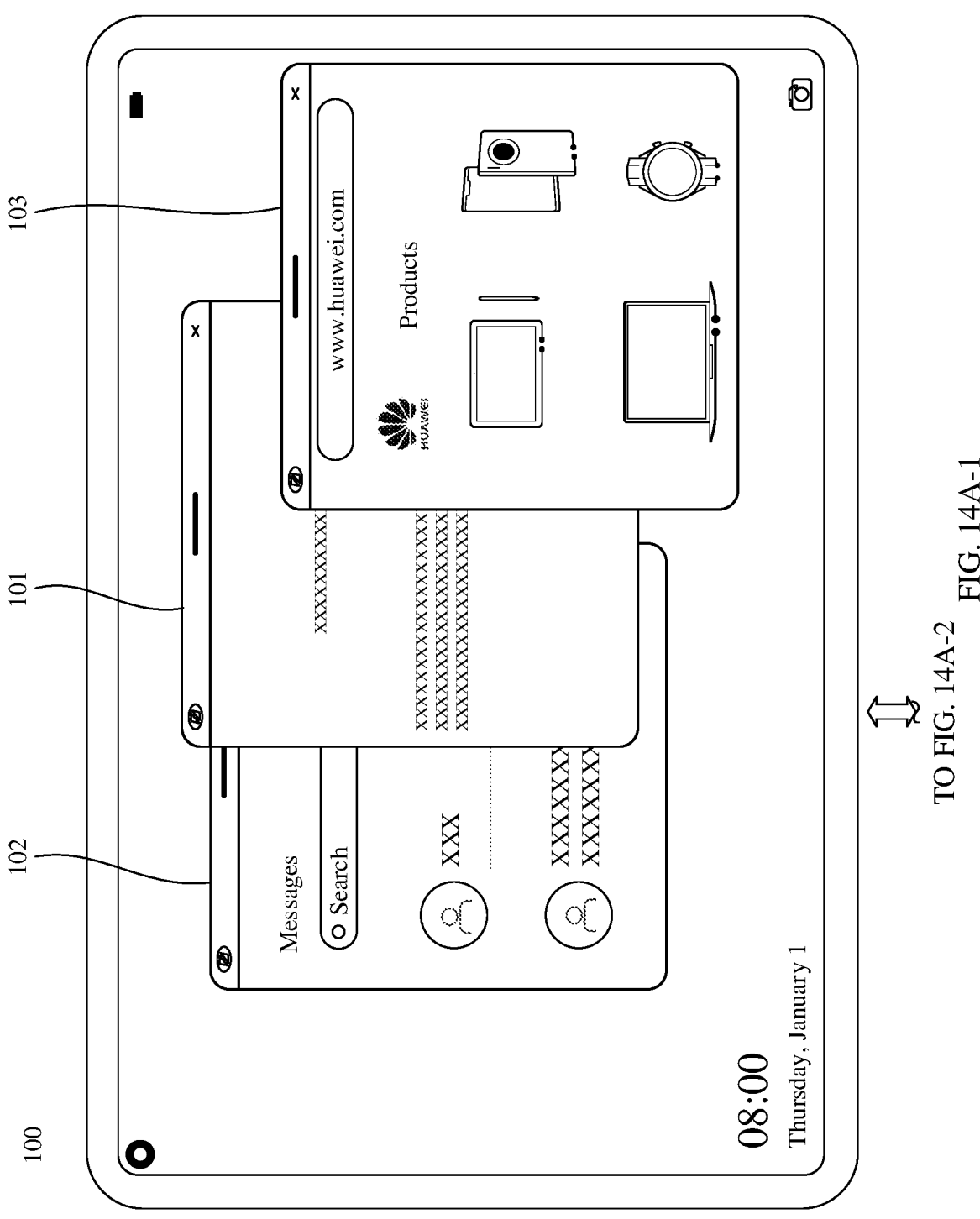
TO FIG. 14A-2　　FIG. 14A-1

CONT. FROM

200

100

200

100

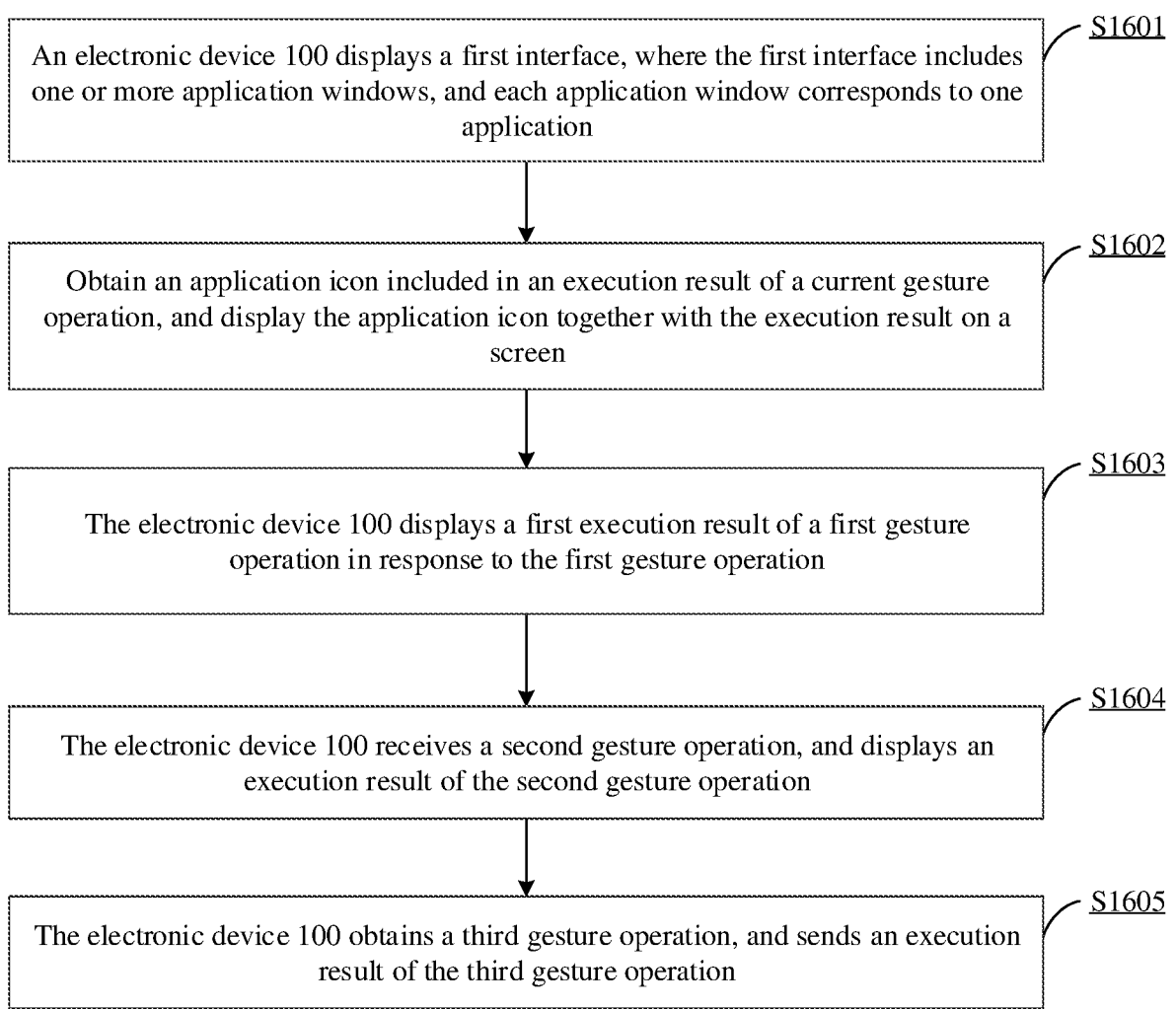

An electronic device 100 displays a first interface, where the first interface includes one or more application windows, and each application window corresponds to one application                    S1601

Obtain an application icon included in an execution result of a current gesture operation, and display the application icon together with the execution result on a screen                    S1602

The electronic device 100 displays a first execution result of a first gesture operation in response to the first gesture operation                    S1603

The electronic device 100 receives a second gesture operation, and displays an execution result of the second gesture operation                    S1604

The electronic device 100 obtains a third gesture operation, and sends an execution result of the third gesture operation                    S1605

CONT. FROM

CONT. FROM
FIG. 18A
400
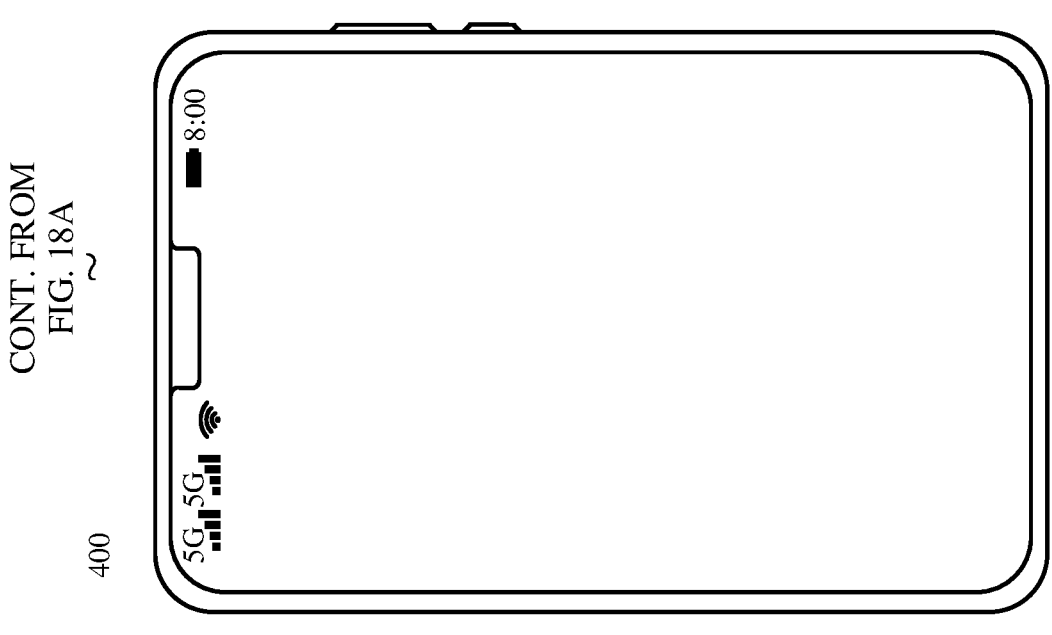
CONT. FROM
FIG. 18A
300
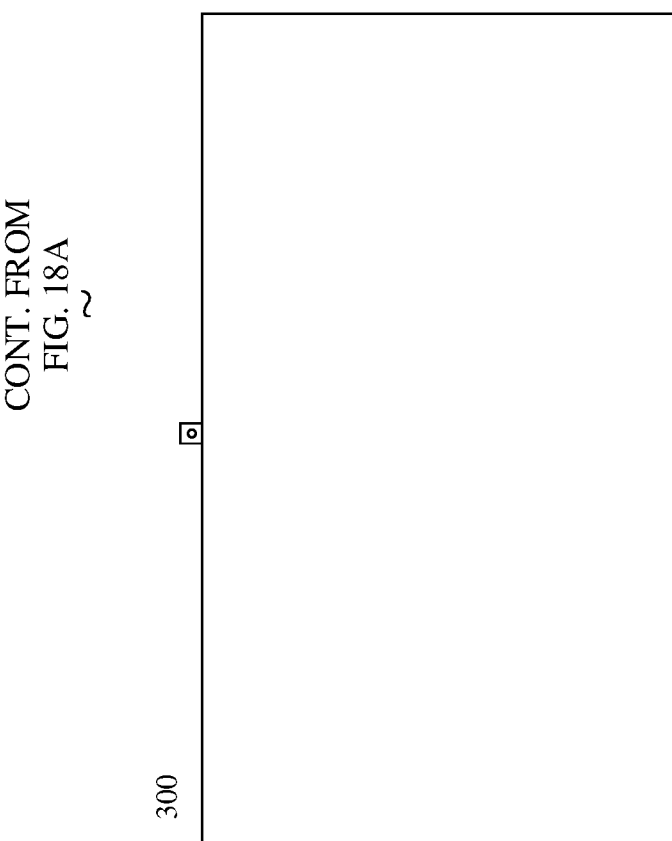
FIG. 18B

CONT. FROM
FIG. 19A
400
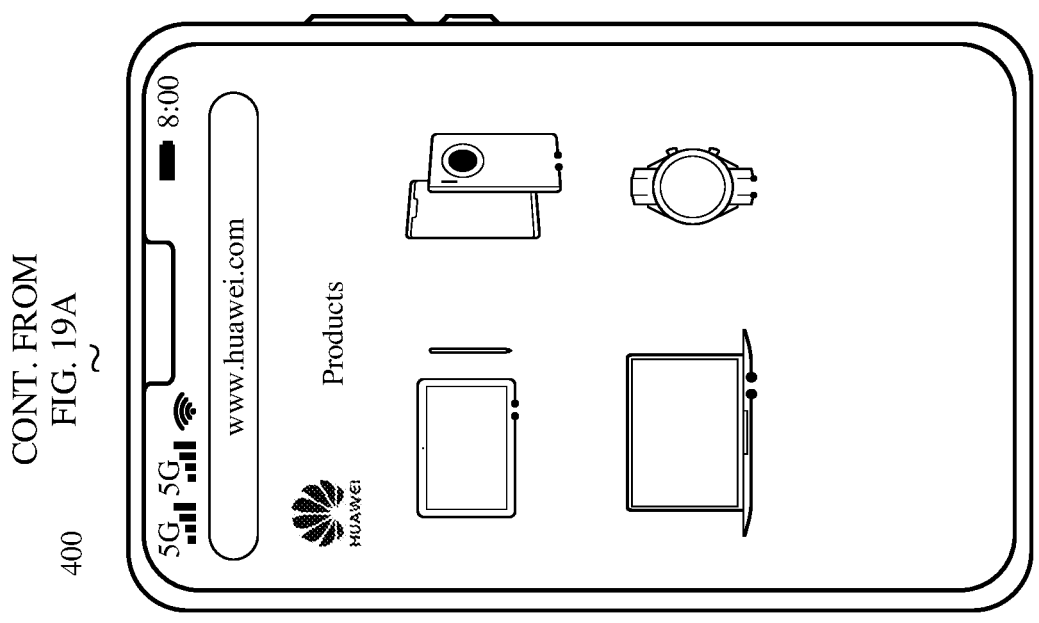
CONT. FROM
FIG. 19A
300
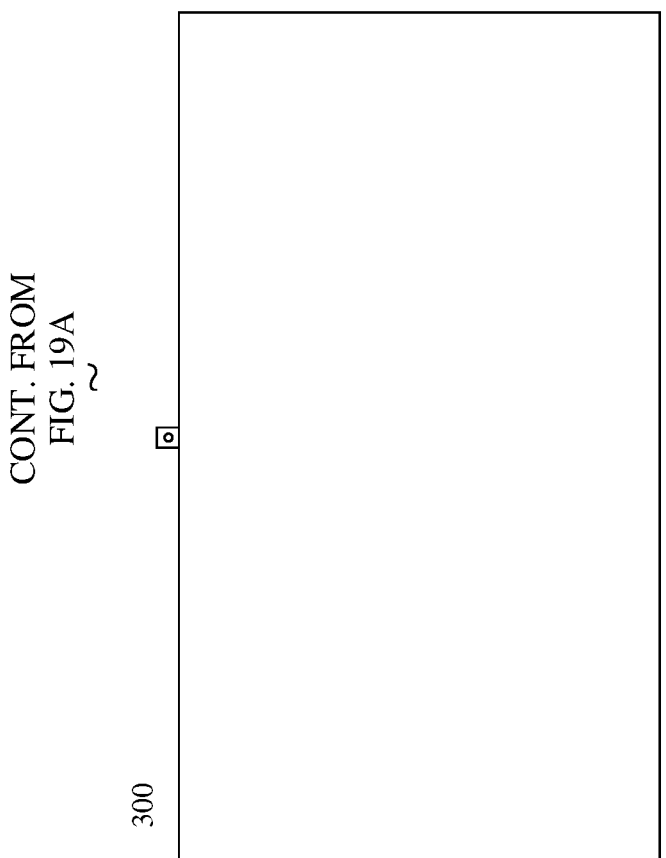
FIG. 19B

CONT. FROM

1101

11012

11011

Products

Messages

Search

XXX

Work

08:00
Thursday, January 1

CONT. FROM

CONT. FROM

~

200

2002

2001

ELECTRONIC DEVICE AND HUMAN-COMPUTER INTERACTION METHOD

CROSS-REFERENCE TO RELATED APPLICATIONS

This application is a National Stage of International Application No. PCT/CN2022/113067 filed on Aug. 17, 2022, which claims priority to Chinese Patent Application No. 202110961754.3, filed on Aug. 20, 2021. Both of the aforementioned applications are hereby incorporated by reference in their entireties.

TECHNICAL FIELD

Embodiments of this application relate to the field of intelligent terminals, and in particular, to an electronic device and a human-computer interaction method.

BACKGROUND

In the field of intelligent terminals, there are increasingly more gesture operations performed by a user to control an application of an electronic device. To reduce types of gesture operations to facilitate management, when the gesture operations are set for the electronic device, a plurality of functions are completed by using one gesture operation. For example, for a same gesture operation, different functions are generated when the gesture operation is performed at different locations of a window of an application displayed on the electronic device. However, this requires high precision of the gesture operation. For example, when a function is implemented, the gesture operation is limited to a narrow operation area on a screen of the electronic device. If a location of the gesture operation is deviated, a misoperation is easily generated.

SUMMARY

An objective of embodiments of this application is to provide an electronic device and a human-computer interaction method, to improve user operation experience in a process of cross-screen display of an application.

A first aspect of embodiments of this application provides a human-computer interaction method, including: A second electronic device receives a first picture and identification information of at least one application that are sent by a first electronic device based on a first operation, where the first picture is a screenshot of a first interface currently displayed by the first electronic device, the at least one application is an application corresponding to an application window opened on the first interface, and the identification information is an icon of the application.

The second electronic device displays the first picture and the icon of the at least one application, where the first picture covers a part of a display area of the second electronic device.

The second electronic device receives a second operation performed on a first icon, where the first icon is one icon in the icon of the at least one application.

The second electronic device displays, in response to the second operation, an application window of a first application corresponding to the first icon, where content of the application window of the first application displayed by the second electronic device is the same as that of an application window of the first application opened on the first interface.

In other words, in embodiments of this application, the first electronic device and the second electronic device may each be an intelligent terminal with a touch screen. For example, the first electronic device and the second electronic device may each be a tablet computer. The first operation and the second operation may be a gesture operation performed on the touch screen of the first electronic device and the second electronic device, for example, may be any one of a tapping operation, a sliding operation, or a dragging operation.

The first electronic device may simultaneously display, on a screen of the first electronic device, application windows of an opened document application, a messages application, and a browser application. The first picture is a screenshot including the application windows of the document application, the messages application, and the browser application. The identification information corresponding to the application is icons of the document application, the messages application, and the browser application.

For example, the first operation is a three-finger sliding operation. Because the first operation may be performed on any area of the screen of the first electronic device, a user does not need to perform a high-precision operation, for example, touching and holding an application window of an application on the screen of the first electronic device, so that operation experience of the user is improved.

The second electronic device may display the first picture and the icon of the application in a local area of a screen, for example, a lower right corner of the screen. The icon of the application may be located above, below, on a left side of, or on a right side of the first picture.

The second operation may be an operation performed on the first picture on the screen of the second electronic device, the icon of the application, or another display area of the screen of the second electronic device. The second operation may be a tapping operation on the first picture and the icon of the application; or a dragging operation of dragging the icon of the application to an area of the screen of the second electronic device, for example, dragging to an upper area of the screen; or a tapping operation performed in an area of the screen of the second electronic device other than the first picture and the icon of the application.

When the second operation is performed on the icon of the application, the application corresponding to the icon of the application is moved from the first electronic device to the second electronic device for display. A size of the application window of the application in the screen of the second electronic device may be different from that in the first electronic device. For example, the application window of the application in the screen of the first electronic device is displayed in a thumbnail manner. After the application is moved to the second electronic device, the application window of the application in the screen of the second electronic device is displayed in a full-screen manner.

In a possible implementation of the first aspect, that the second electronic device displays, in response to the second operation, an application window of a first application corresponding to the first icon includes:

The second electronic device sends a first instruction to the first electronic device in response to the second operation.

The second electronic device receives first information sent by the first electronic device in response to the first instruction, where the first information indicates the application window of the first application corresponding to the first icon.

The second electronic device displays, based on the first information, the application window of the first application corresponding to the first icon.

In other words, in embodiments of this application, the first instruction may be a tapping operation or a dragging operation on the icon of the application. The first information includes an application name corresponding to the icon of the application.

In a possible implementation of the first aspect, before the second electronic device receives the first picture and the identification information of the at least one application that are sent by the first electronic device, the method further includes:

The first electronic device displays the first interface in full screen, where the first interface includes at least one application window corresponding to the at least one application.

The first electronic device receives the first operation performed on the first interface.

The first electronic device sends, in response to the first operation, the first picture and the identification information of the at least one application to the second electronic device.

In embodiments of this application, the first electronic device may simultaneously display, on a screen of the first electronic device, application windows of an opened document application, a messages application, and a browser application. The first operation is a three-finger sliding operation performed on the screen of the first electronic device. The first picture is a screenshot including the application windows of the document application, the messages application, and the browser application. The identification information corresponding to the application is icons of the document application, the messages application, and the browser application.

In a possible implementation of the first aspect, that the second electronic device displays, based on the first information, the application window of the first application corresponding to the first icon includes:

The second electronic device displays, in full screen based on the first information and the second operation, the application window of the first application corresponding to the first icon.

In other words, in embodiments of this application, in response to the tapping operation performed on the icon of the application, the second electronic device displays, in full screen on the screen of the second electronic device, the application window of the application corresponding to the icon of the application.

In a possible implementation of the first aspect, that the second electronic device displays, based on the first information, the application window of the first application corresponding to the first icon includes:

The second electronic device displays, on a left side of the screen based on the first information and the second operation, the application window of the first application corresponding to the first icon.

In a possible implementation of the first aspect, the second operation includes dragging the first icon to a first area of the screen of the second electronic device, and the first area is located on the left side of the screen of the second electronic device.

In a possible implementation of the first aspect, that the second electronic device displays, based on the first information, the application window of the first application corresponding to the first icon includes:

The second electronic device displays, on a right side of the screen based on the first information and the second operation, the application window of the first application corresponding to the first icon.

In a possible implementation of the first aspect, the second operation includes dragging the first icon to a first area of the screen of the second electronic device, and the first area is located on the right side of the screen of the second electronic device.

In a possible implementation of the first aspect, that the second electronic device displays, based on the first information, the application window of the first application corresponding to the first icon includes:

The second electronic device displays, on an upper side of the screen based on the first information and the second operation, the application window of the first application corresponding to the first icon.

In a possible implementation of the first aspect, the second operation includes dragging the first icon to a first area of the screen of the second electronic device, and the first area is located on the upper side of the screen of the second electronic device.

In a possible implementation of the first aspect, that the second electronic device displays, based on the first information, the application window of the first application corresponding to the first icon includes:

The second electronic device displays, on a lower side of the screen based on the first information and the second operation, the application window of the first application corresponding to the first icon.

In a possible implementation of the first aspect, the second operation includes dragging the first icon to a first area of the screen of the second electronic device, and the first area is located on the lower side of the screen of the second electronic device.

In other words, in embodiments of this application, the first area may be a local area of the screen of the second electronic device, for example, a left half screen, a right half screen, an upper half screen, or a lower half screen. In response to the dragging operation performed on the icon of the application, based on the first area at which the icon of the application is released by the dragging operation on the screen of the second electronic device, the second electronic device displays, at a location that is in the screen of the second electronic device and that corresponds to the first area, the application window of the application corresponding to the icon of the application. For example, if the icon of the application is dragged to the left half screen of the screen of the second electronic device, the application window of the application is displayed on the left half screen. For another example, if the icon of the application is dragged to the upper half screen of the screen of the second electronic device, the application window of the application is displayed on the upper half screen.

In a possible implementation of the first aspect, the second electronic device is connected to the first electronic device in a wireless or wired manner; or the second electronic device and the first electronic device are located in a same wireless local area network; or the second electronic device and the first electronic device are logged in with a same user account; or the second electronic device is an extended screen of the first electronic device; or the second electronic device and the first electronic device may respectively include two screens of a same electronic device. In other words, a same electronic device may include two screens, and the interaction method between two electronic devices according to embodiments of this application may be applied to the two screens on the same electronic device. For example, the first electronic device includes a first screen, the second electronic device includes a second screen, and the two screens are located on a same electronic device. When the two screens are on the same electronic device, the two screens share a control device such as a processor.

In a possible implementation of the first aspect, the first operation is a three-finger sliding operation; or the icon of the at least one application is displayed above, below, to the left of, or to the right of the first picture.

A second aspect of embodiments of this application provides a human-computer interaction method, including:

A first electronic device displays a first interface in full screen, where the first interface includes at least one application window corresponding to at least one application.

The first electronic device receives a first operation performed on the first interface.

The first electronic device sends, in response to the first operation, a first picture and identification information of at least one application to a second electronic device, where the first picture is a screenshot of the first interface, and the identification information is an icon of an application.

The second electronic device displays the first picture and the icon of the at least one application, where the first picture covers a part of a display area of the second electronic device.

The second electronic device receives a second operation performed on a first icon, where the first icon is one icon in the icon of the at least one application.

The second electronic device displays, in response to the second operation, an application window of a first application corresponding to the first icon, where content of the application window of the first application displayed by the second electronic device is the same as that of an application window of a first application opened on the first interface.

In other words, in embodiments of this application, the first electronic device and the second electronic device may each be an intelligent terminal with a touch screen. For example, the first electronic device and the second electronic device may each be a tablet computer.

The first electronic device may simultaneously display, on a screen of the first electronic device, application windows of an opened document application, a messages application, and a browser application. The first picture is a screenshot including the application windows of the document application, the messages application, and the browser application. The identification information corresponding to the application is icons of the document application, the messages application, and the browser application.

The first operation and the second operation may be a gesture operation performed on the touch screen of the first electronic device and the second electronic device, for example, may be any one of a tapping operation, a sliding operation, or a dragging operation.

For example, the first operation is a three-finger sliding operation. Because the first operation may be performed on any area of the screen of the first electronic device, a user does not need to perform a high-precision operation, for example, touching and holding an application window of an application on the screen of the first electronic device, so that operation experience of the user is improved.

The second electronic device may display the first picture and the icon of the application in a local area of a screen, for example, a lower right corner of the screen. The icon of the application may be located above, below, on a left side of, or on a right side of the first picture.

The second operation may be an operation performed on the first picture on the screen of the second electronic device, the icon of the application, or another display area of the screen of the second electronic device. The second operation may be a tapping operation on the first picture and the icon of the application; or a dragging operation of dragging the icon of the application to an area of the screen of the second electronic device, for example, dragging to an upper area of the screen; or a tapping operation performed in an area of the screen of the second electronic device other than the first picture and the icon of the application.

When the second operation is performed on the icon of the application, the application corresponding to the icon of the application is moved from the first electronic device to the second electronic device for display. A size of the application window of the application in the screen of the second electronic device may be different from that in the first electronic device. For example, the application window of the application in the screen of the first electronic device is displayed in a thumbnail manner. After the application is moved to the second electronic device, the application window of the application in the screen of the second electronic device is displayed in a full-screen manner.

In a possible implementation of the second aspect, the second electronic device is one of at least one third electronic device, and each third electronic device is located in a first direction of the first electronic device.

In a possible implementation of the second aspect, that the first electronic device sends, in response to the first operation, a first picture and identification information of at least one application to a second electronic device includes:

The first electronic device selects a third electronic device in the first direction corresponding to a direction of the first operation as the second electronic device.

The first electronic device sends the first picture and the identification information of the at least one application to the selected second electronic device.

In a possible implementation of the second aspect, the first operation includes at least one of sliding up, sliding down, sliding left, sliding right, sliding lower left, sliding lower right, sliding upper left, and sliding upper right on the first interface.

In other words, in embodiments of this application, there may be a plurality of third electronic devices, and the plurality of third electronic devices are separately located in different directions of the first electronic device. The first electronic device selects, based on the direction of the first operation, a third electronic device in a corresponding direction as the second electronic device, and sends the first picture and the identification information of the at least one application to the second electronic device. For example, there is a third electronic device on a left side of the first electronic device and a third electronic device on a right side of the first electronic device. A gesture operation of sliding left is performed on the screen of the first electronic device, so that the first electronic device determines the third electronic device on the left side as the second electronic device, and sends the first picture and the identification information of the at least one application to the second electronic device. Alternatively, the third electronic device may be located below, above, on an upper left side of, on an upper right side of, on a lower left side of, and on a lower right side of the first electronic device.

In a possible implementation of the second aspect, that the second electronic device displays, in response to the second operation, an application window of a first application corresponding to the first icon includes:

The second electronic device sends a first instruction to the first electronic device in response to the second operation.

The second electronic device receives first information sent by the first electronic device in response to the first instruction, where the first information indicates the application window of the first application corresponding to the first icon.

The second electronic device displays, based on the first information, the application window of the first application corresponding to the first icon.

In other words, in embodiments of this application, the first instruction may be a tapping operation or a dragging operation on the icon of the application. The first information includes an application name corresponding to the icon of the application.

In a possible implementation of the second aspect, that the second electronic device displays, based on the first information, the application window of the first application corresponding to the first icon includes:

The second electronic device displays, in full screen based on the first information and the second operation, the application window of the first application corresponding to the first icon.

In other words, in embodiments of this application, in response to the tapping operation performed on the icon of the application, the second electronic device displays, in full screen on the screen of the second electronic device, the application window of the application corresponding to the icon of the application.

In a possible implementation of the second aspect, that the second electronic device displays, based on the first information, the application window of the first application corresponding to the first icon includes:

The second electronic device displays, on a left side of the screen based on the first information and the second operation, the application window of the first application corresponding to the first icon.

In a possible implementation of the second aspect, the second operation includes dragging the first icon to a first area of the screen of the second electronic device, and the first area is located on the left side of the screen of the second electronic device.

In a possible implementation of the second aspect, that the second electronic device displays, based on the first information, the application window of the first application corresponding to the first icon includes:

The second electronic device displays, on a right side of the screen based on the first information and the second operation, the application window of the first application corresponding to the first icon.

In a possible implementation of the second aspect, the second operation includes dragging the first icon to a first area of the screen of the second electronic device, and the first area is located on the right side of the screen of the second electronic device.

In a possible implementation of the second aspect, that the second electronic device displays, based on the first information, the application window of the first application corresponding to the first icon includes:

The second electronic device displays, on an upper side of the screen based on the first information and the second operation, the application window of the first application corresponding to the first icon.

In a possible implementation of the second aspect, the second operation includes dragging the first icon to a first area of the screen of the second electronic device, and the first area is located on the upper side of the screen of the second electronic device.

In a possible implementation of the second aspect, that the second electronic device displays, based on the first information, the application window of the first application corresponding to the first icon includes:

The second electronic device displays, on a lower side of the screen based on the first information and the second operation, the application window of the first application corresponding to the first icon.

In a possible implementation of the second aspect, the second operation includes dragging the first icon to a first area of the screen of the second electronic device, and the first area is located on the lower side of the screen of the second electronic device.

In other words, in embodiments of this application, the first area may be a local area of the screen of the second electronic device, for example, a left half screen, a right half screen, an upper half screen, or a lower half screen. In response to the dragging operation performed on the icon of the application, based on the first area at which the icon of the application is released by the dragging operation on the screen of the second electronic device, the second electronic device displays, at a location that is in the screen of the second electronic device and that corresponds to the first area, the application window of the application corresponding to the icon of the application. For example, if the icon of the application is dragged to the left half screen of the screen of the second electronic device, the application window of the application is displayed on the left half screen. Alternatively, the first area may be on the right half screen, the upper half screen, or the lower half screen of the screen of the second electronic device. For another example, if the icon of the application is dragged to the upper half screen of the screen of the second electronic device, the application window of the application is displayed on the upper half screen.

In a possible implementation of the second aspect, the first electronic device further takes a screenshot of the first interface in response to the first operation, and stores the screenshot of the first interface on the first electronic device.

In other words, in embodiments of this application, in addition to sending the first picture and the identification information of the application to the second electronic device, the first electronic device may further implement a function of taking a screenshot of the first electronic device.

In a possible implementation of the second aspect, the second electronic device is connected to the first electronic device in a wireless or wired manner; or the second electronic device and the first electronic device are located in a same wireless local area network; or the second electronic device and the first electronic device are logged in with a same user account; or the second electronic device is an extended screen of the first electronic device.

In other words, in embodiments of this application, the second electronic device and the first electronic device may establish an extended screen connection, and the screen of the second electronic device is used as an extended screen of the first electronic device.

In a possible implementation of the second aspect, the first operation is a three-finger sliding operation; or the icon of the at least one application is displayed above, below, to the left of, or to the right of the first picture.

A third aspect of the embodiments of this application provides a human-computer interaction method, applied to an electronic device including a first screen and a second screen. The method includes:

The first screen displays a first interface in full screen, where the first interface includes at least one application window corresponding to at least one application.

The first screen receives a first operation performed on the first interface.

The electronic device controls, in response to the first operation, the second screen to display a first picture and an icon of the at least one application, where the first picture is a screenshot of the first interface, and the first picture covers a part of a display area of the second screen.

The second screen receives a second operation performed on a first icon, where the first icon is one icon in the icon of the at least one application.

The second screen displays, in response to the second operation, an application window of a first application corresponding to the first icon, where content of the application window of the first application displayed on the second screen is the same as that of an application window of the first application opened on the first interface.

For example, the electronic device may be a dual-screen computer with two screens.

In a possible implementation of the third aspect, the first operation includes at least one of sliding up, sliding down, sliding left, sliding right, sliding lower left, sliding lower right, sliding upper left, and sliding upper right on the first interface.

In a possible implementation of the third aspect, specifically, the electronic device controls, in response to the second operation, the second screen to display the application window of the first application corresponding to the first icon.

In a possible implementation of the third aspect, the electronic device controls, based on the second operation, the second screen to display, in different forms, the application window of the first application corresponding to the first icon. For example, when the second operation is tapping the first icon, in response to the second operation, the second screen may display, in full screen, the application window of the first application corresponding to the first icon. Alternatively, the second operation includes dragging the first icon to a first area of the second screen. When the first area is located on a left side of the second screen, in response to the second operation, the second screen displays, on the left side of the screen, the application window of the first application corresponding to the first icon. When the first area is located on a right side of the second screen, in response to the second operation, the second screen displays, on the right side of the screen, the application window of the first application corresponding to the first icon.

In a possible implementation of the third aspect, the electronic device may further display, in response to the first operation, the screenshot of the first interface on the first screen. Further, based on an operation performed by a user on the screenshot, the electronic device may edit, save, or delete the screenshot.

In a possible implementation of the third aspect, the first operation is a three-finger sliding operation.

In a possible implementation of the third aspect, the icon of the at least one application is displayed above, below, to the left of, or to the right of the first picture.

A fourth aspect of embodiments of this application provides an electronic device, including: a memory, where the memory stores instructions; and a processor, configured to read and execute the instructions in the memory, so that the electronic device is enabled to perform the human-computer interaction method provided in the first aspect or the third aspect.

A fifth aspect of embodiments of this application provides an electronic device, including: a memory, where the memory stores instructions; and a processor, configured to read and execute the instructions in the memory, so that the electronic device is enabled to perform the method performed by the first device in the human-computer interaction method provided in the second aspect.

A sixth aspect of embodiments of this application provides a computer-readable storage medium, where the computer-readable storage medium includes instructions, and when the instructions are executed by an electronic device, the electronic device is enabled to implement the human-computer interaction method provided in the first aspect or the third aspect.

A seventh aspect of embodiments of this application provides a computer-readable storage medium, where the computer-readable storage medium includes instructions, and when the instructions are executed by an electronic device, the electronic device is enabled to implement the method performed by the first device in the human-computer interaction method provided in the second aspect.

An eighth aspect of embodiments of this application provides a computer program product, including a non-volatile computer-readable storage medium, where the non-volatile computer-readable storage medium includes computer program code used to perform the human-computer interaction method provided in the first aspect or the third aspect.

A ninth aspect of embodiments of this application provides a computer program product, including a non-volatile computer-readable storage medium, where the non-volatile computer-readable storage medium includes computer program code used to perform the method performed by the first electronic device in the second aspect.

BRIEF DESCRIPTION OF THE DRAWINGS

FIG. 7 is a diagram of a scenario in which an application of an electronic device is opened and displayed according to an embodiment of this application;

FIG. 9A and FIG. 9B are a diagram of a scenario in which a screenshot of a screen of a first electronic device and an icon of an application included in the screenshot are displayed on a second electronic device according to an embodiment of this application;

FIG. 10A-1 and FIG. 10A-2 and FIG. 10B are diagrams of a scenario in which a gesture operation is performed on a screenshot displayed on a second electronic device according to an embodiment of this application;

FIG. 11A-1 and FIG. 11A-2 and FIG. 11B are diagrams of a scenario in which a gesture operation of tapping is performed on an icon of an application displayed on a second electronic device according to an embodiment of this application;

FIG. 12A-1 and FIG. 12A-2 and FIG. 12B are diagrams of a scenario in which a gesture operation of dragging is performed on an icon of an application displayed on a second electronic device according to an embodiment of this application;

FIG. 14A-1 and FIG. 14A-2 and FIG. 14B are diagrams of a scenario in which a gesture operation of tapping is performed on an area other than an icon of an application and a screenshot that are displayed on a second electronic device according to an embodiment of this application;

FIG. 16 is a method flowchart of another human-computer interaction method of an electronic device according to an embodiment of this application;

FIG. 18A and FIG. 18B are a diagram of a scenario in which a gesture operation of tapping is performed on an icon of an application displayed on an electronic device according to an embodiment of this application;

FIG. 19A and FIG. 19B are a diagram of a scenario in which a gesture operation of tapping is performed on a sending object list displayed on an electronic device according to an embodiment of this application;

DETAILED DESCRIPTION OF ILLUSTRATIVE EMBODIMENTS

Embodiments of this application include but are not limited to an electronic device and a human-computer interaction method. To make the objectives, technical solutions, and advantages of embodiments of this application clearer, the following further describes the implementations of embodiments of this application in detail with reference to the accompanying drawings.

As described above, for a same gesture operation corresponding to a plurality of functions, a problem exists that a misoperation is prone to occur due to a narrow operation area. For example, FIG. 1 shows a scenario in which a user performs a gesture operation on a screen of an electronic device 100, and moves a window of a document application 101 on the screen of the electronic device 100 to a screen of an electronic device 200 that is communicatively connected to the electronic device 100, to implement cross-screen display of the document application 101.

Figure 1:
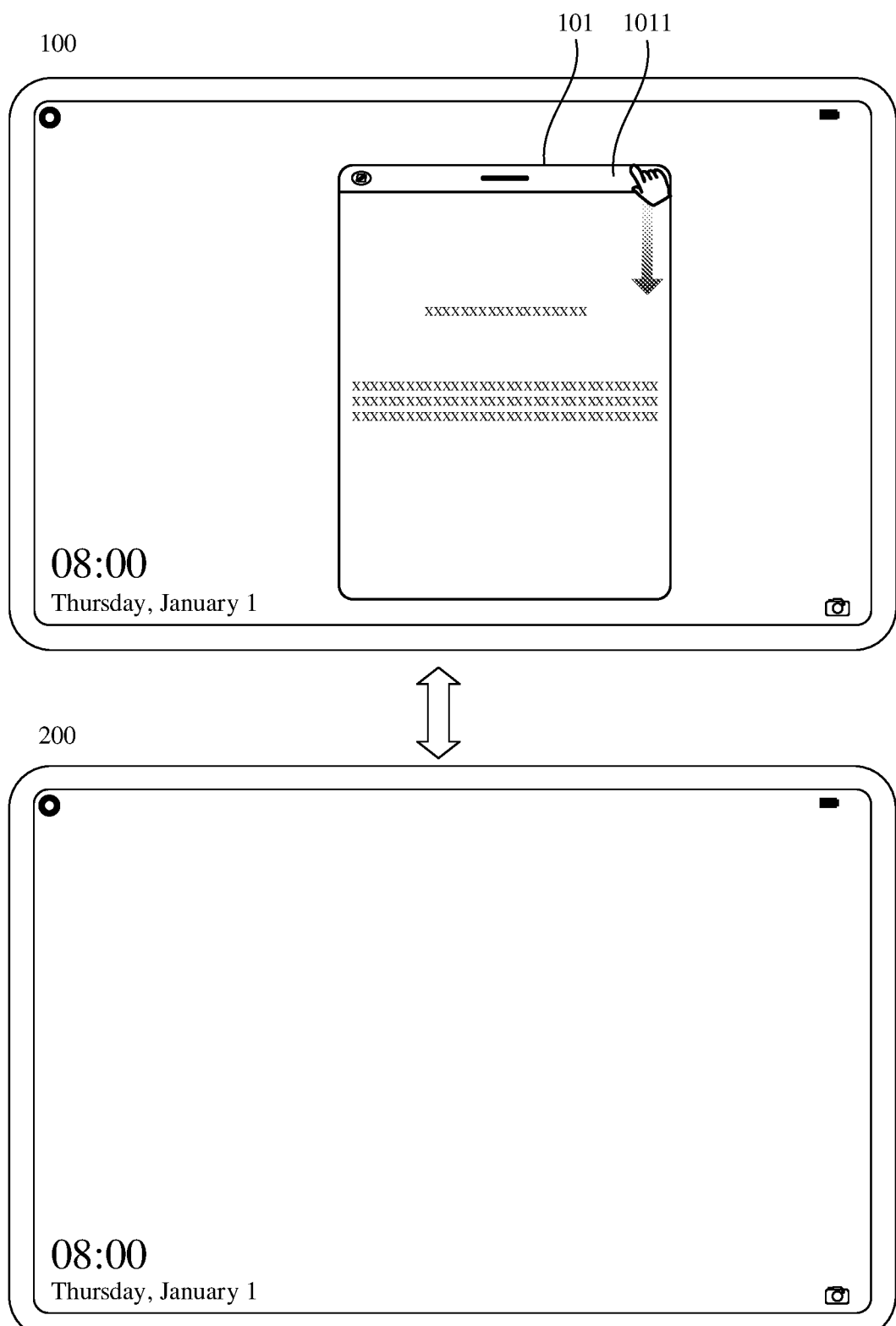
FIG. 1 is a diagram of a scenario in which cross-screen display of an application is implemented between a plurality of electronic devices according to an embodiment of this application.
Figure 2:
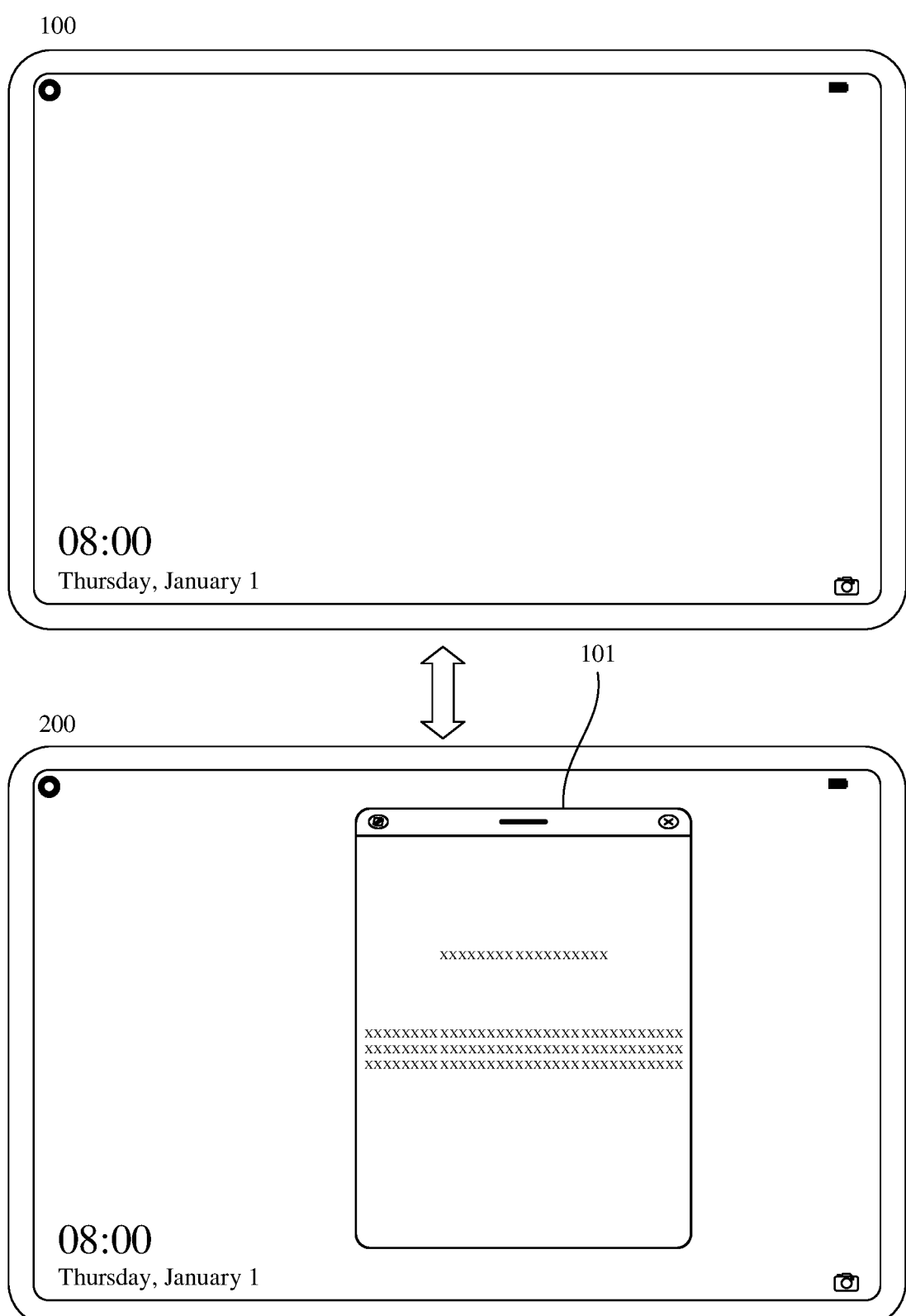
FIG. 2 is a diagram of a scenario in which cross-screen display of an application is implemented between a plurality of electronic devices according to an embodiment of this application.
Figure 3:
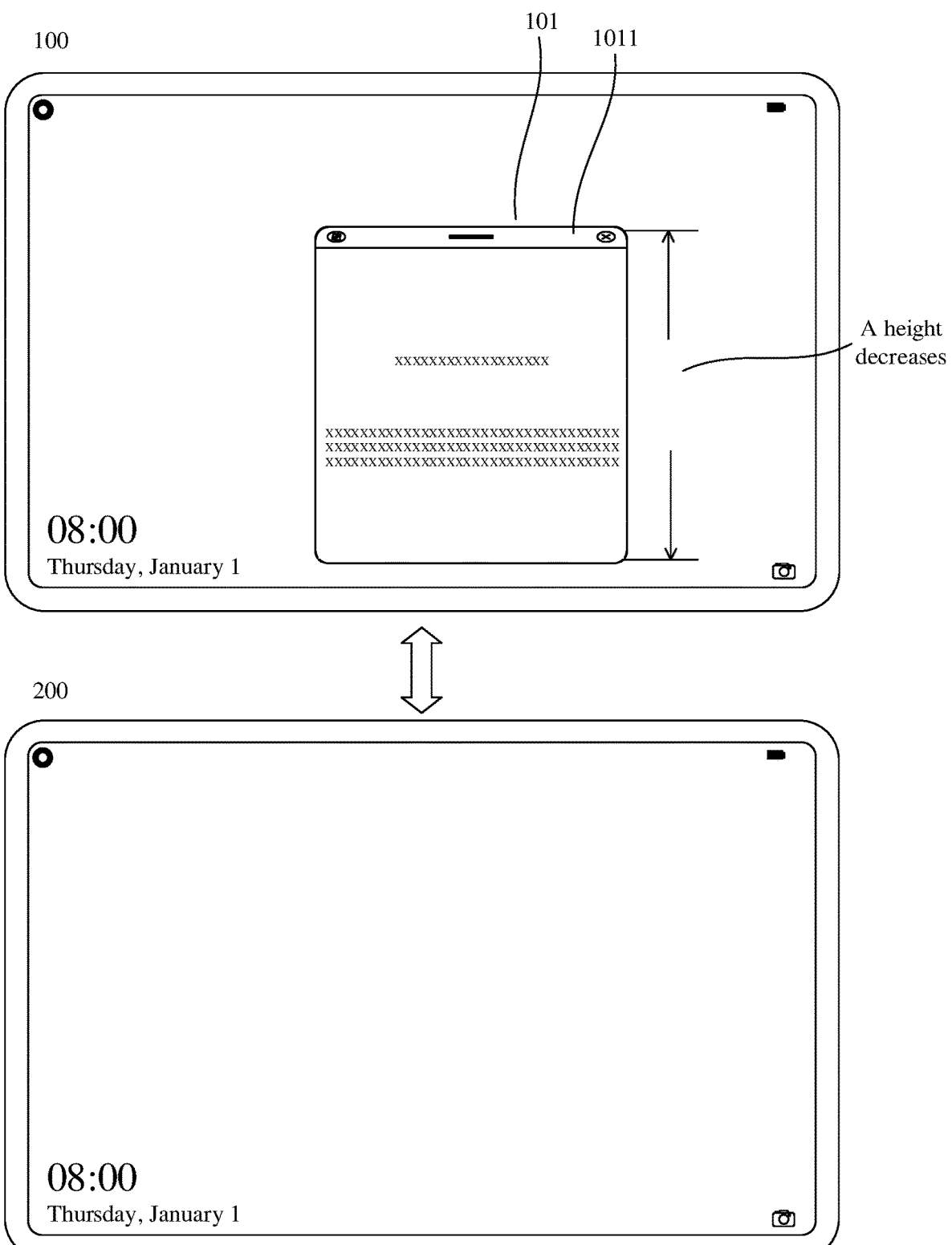
FIG. 3 is a diagram of a scenario in which cross-screen display of an application is implemented between a plurality of electronic devices according to an embodiment of this application.

As shown in FIG. 1, the screen of the electronic device 200 may be used as an extended screen of the screen of the electronic device 100, and the window of the document application 101 is displayed on the screen of the electronic device 100 in a floating window manner. After the user performs a gesture operation of single-finger dragging-down on a title bar 1011 of the window of the document application 101, as shown in FIG. 2, the electronic device 100 moves the window of the document application 101 to the screen of the electronic device 200. However, because a contact area of a finger of the user on the screen of the electronic device 100 is wider than the title bar 1011 of the window of the document application 101, the finger of the user may touch an edge of the title bar 1011 of the window of the document application 101. In addition, the edge of the title bar 1011 of the window of the document application 101 further supports changing a window size by using a gesture operation of single-finger dragging. As shown in FIG. 3, when the gesture operation of single-finger dragging is performed by the user on the title bar 1011 of the window of the document application 101, a misoperation of changing the window size of the document application 101 is generated, for example, a height of the window of the document application 101 decreases.

To resolve the foregoing problem, embodiments of this application provide a human-computer interaction method, to implement cross-screen display of an application of an electronic device. In this method, in response to a first gesture operation performed by a user on a first screen, an execution result of the first gesture operation is displayed on a second screen, where the execution result may be a screenshot of a currently opened application window on the first screen. In response to a second gesture operation performed by the user on the execution result displayed on the second screen, an application window selected by the second gesture operation is moved from the first screen to the second screen for display, where the second gesture operation is used to select at least one application in the execution result. The first screen and the second screen may belong to a same electronic device, or may belong to different electronic devices. For example, after the user performs a gesture operation of three-finger sliding on the screen of the first electronic device, a screenshot of an application window of the screen of the first electronic device and an icon of an application included in the screenshot are displayed on the screen of the second electronic device. After the user performs a gesture operation of tapping or dragging on the icon of the application displayed on the screen of the second electronic device, the application corresponding to the icon is moved from the first electronic device to the second electronic device for display, so that cross-screen display of the application is implemented.

According to the method in embodiments of this application, in a scenario in which an application is displayed across screens, the user may not need to perform a high-precision gesture operation, for example, a dragging operation on a title bar of the application. Instead, the user may perform the second gesture operation on the execution result of the first gesture operation to implement cross-screen display of the application. For example, a tapping operation is performed on an execution result corresponding to a screenshot gesture of three-finger sliding, namely, an icon corresponding to an application window displayed in a screenshot, to implement cross-screen display of an application. In this way, operation difficulty of the second gesture operation performed by the user can be reduced, cross-screen display of the application can be implemented, and it can be further ensured that the execution result of the first gesture operation is not affected.

It may be understood that the technical solutions in embodiments of this application may be applicable to the field of intelligent terminals having a touchscreen or a touchpad. The electronic device in embodiments of this application is a terminal device having an electronic display screen. Common terminal devices include: a vehicle-mounted device, a mobile phone, a tablet computer, a notebook computer, a palmtop computer, a mobile Internet device (mobile Internet device, MID), a wearable device (for example, a smart watch, a smart band, and a pedometer), a personal digital assistant, a portable media player, a navigation device, a video game device, a set-top box, a virtual reality and/or augmented reality device, an Internet of Things device, an industrial control device, a streaming media client device, an e-book, a reading device, a POS terminal, and another device.

Figure 4:
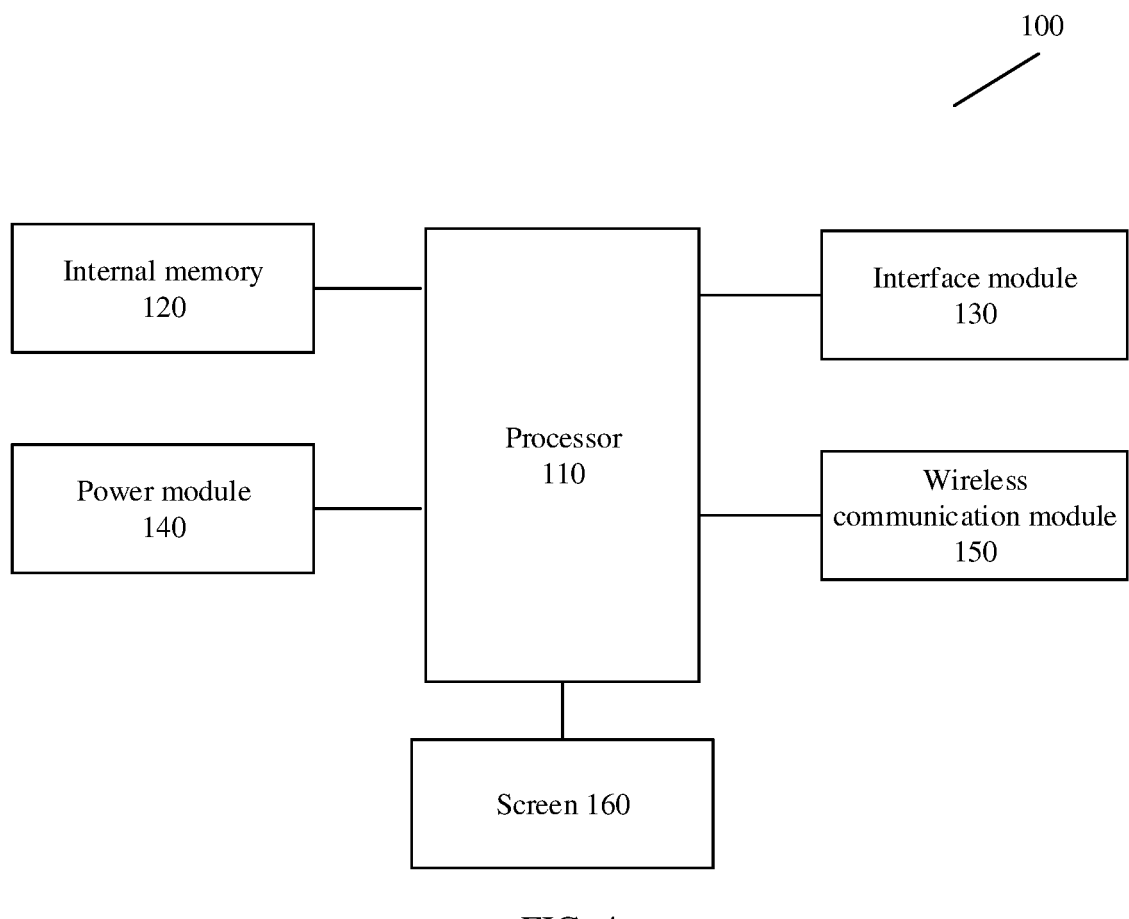
FIG. 4 is a block diagram of a hardware structure of an electronic device according to an embodiment of this application.

FIG. 4 is a schematic diagram of a structure of an electronic device 100 according to an embodiment of this application. The electronic device 100 may include a processor 110, an internal memory 120, an interface module 130, a power module 140, a wireless communication module 150, and a screen 160.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In embodiments of this application, the processor 110 may implement an execution result of a gesture operation performed by a user on the electronic device 100.

The internal memory 120 may be configured to store computer-executable program code, and the executable program code includes instructions. The internal memory 120 may include a program storage area and a data storage area. The program storage area may store an operating system, an application (such as a document application, a messages application, and a browser) required by at least one function, and the like. The data storage area may store data (such as audio data and an address book) created during use of the electronic device 100, and the like. In embodiments of this application, the internal memory 120 may store an icon of an application.

The interface module 130 may be configured to connect to an external memory card, for example, a micro SD card, to extend a storage capability of the electronic device 100. The external memory card communicates with the processor 110 through the interface module 130, to implement a data storage function. For example, files such as music and videos are stored in the external memory card.

The power module 140 receives input of a battery, and supplies power to the processor 110, the internal memory 120, a display 111, and the like.

The wireless communication module 150 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

The screen 160 may be a touchscreen formed by a touch sensor and a display screen, which is also referred to as a "touchscreen", and is configured to detect a gesture operation performed on or near the touchscreen. The screen 160 may transfer a detected gesture operation to the processor 110, to determine a type of the gesture operation. In embodiments of this application, the screen 160 is configured to receive a gesture operation performed by the user. For example, the screen 160 may determine, by using the touch sensor, a type of the gesture operation performed by the user.

After the hardware structure of the electronic device 100 in embodiments of this application is described, the following describes a block diagram of a software structure of the electronic device 100.

Figure 5:
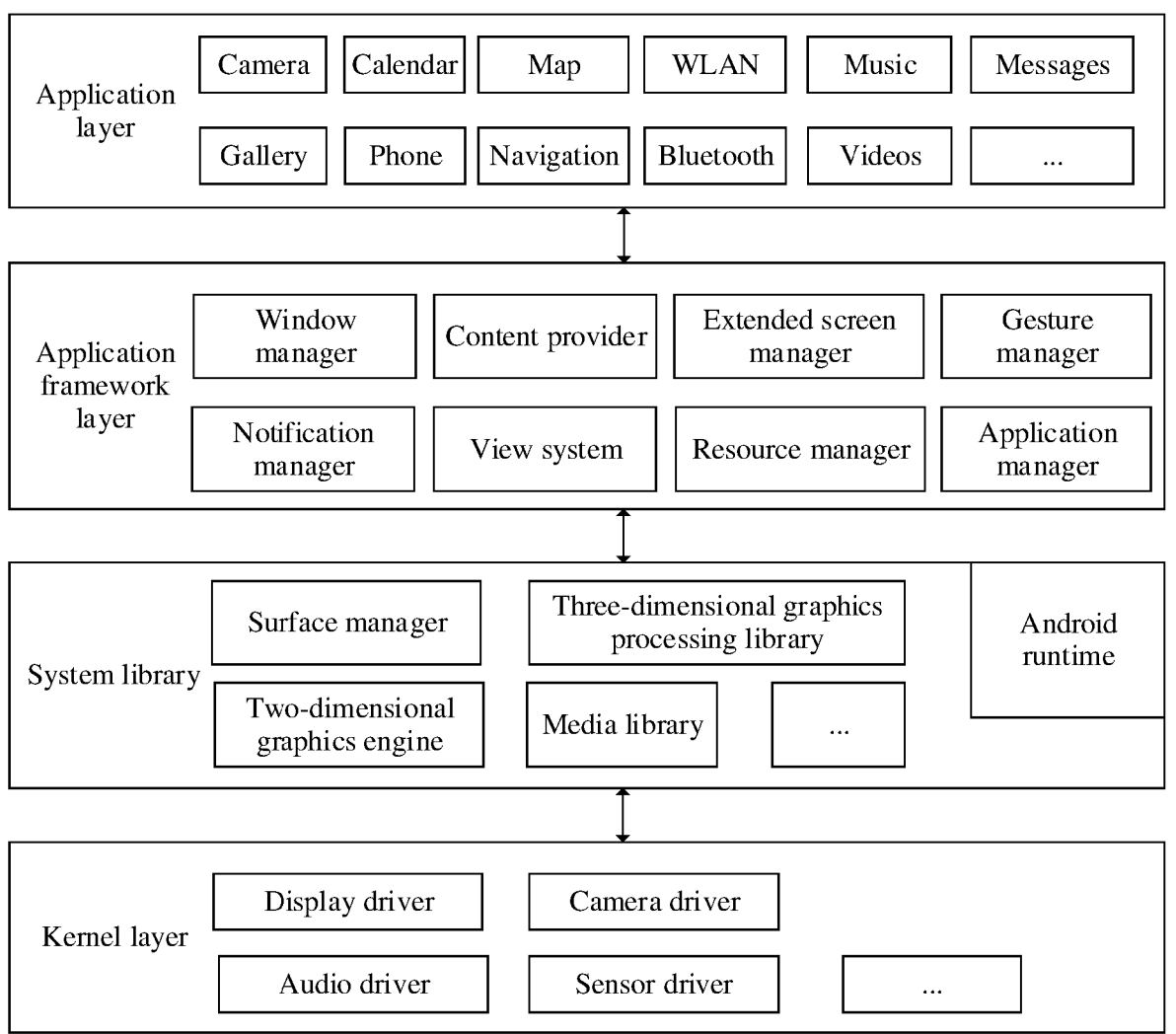
FIG. 5 is a block diagram of a software structure of an electronic device according to an embodiment of this application.

FIG. 5 is a block diagram of a software structure of an electronic device 100 according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 5, the application packages may include applications such as Camera, Gallery, Calendar, Calls, Maps, Navigation, WLAN, Bluetooth, Music, Videos, and Messages. In embodiments of this application, the application packages may include a start document application, a messages application 102, and a browser 103.

The application framework layer provides an application programming interface (application programming interface, API) and a programming framework for an application at the application layer.

As shown in FIG. 5, the application framework layer may include: an extended screen manager, a window manager, a content provider, a view system, a resource manager, a notification manager, a gesture manager, an application manager, and the like.

The gesture manager is configured to identify a gesture operation performed by a user on a screen of the electronic device 100.

The extended screen manager is configured to determine an electronic device connected to the electronic device 100 in a wired or wireless manner, and configure a screen of the electronic device as an extended screen of the electronic device 100. In embodiments of this application, the extended screen manager may further determine a location relationship between the extended screen and the electronic device 100 based on a location relationship between the electronic device and the electronic device 100.

The window manager is configured to manage a window program. The window manager may obtain a size of the display, determine whether there is a status bar, perform screen locking, take a screenshot, and the like. In embodiments of this application, the window manager may display, in a thumbnail or split-screen manner, an application that is started by the electronic device 100.

The content provider is configured to store and obtain data, and enable the data to be accessed by an application. The data may include a video, an image, audio, calls that are made and received, a browsing history, a bookmark, a phone book, and the like.

The view system includes visual controls such as a control for displaying a text and a control for displaying an image. The view system may be configured to construct an application. The display interface may include one or more views. The view herein is used to display a visual control in an area in which the view is located and process an event that occurs in the area in which the view is located. In embodiments of this application, the view system may display, on a screen of the electronic device 200 connected to the electronic device 100, an execution result of a gesture operation performed on the electronic device 100. In addition, the view system may further set a display area on a side of the execution result displayed on the screen of the electronic device 200, and display, in the display area, the icon of the application that is displayed on the screen of the electronic device 100.

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without a user interaction.

The application manager is configured to obtain information about a running application, and may obtain a name, a package name, and the like of the application. In embodiments of this application, the application manager may determine an application currently displayed on a screen of the electronic device 100 and a name of the application.

The Android runtime includes a kernel library and a virtual machine. The Android runtime is responsible for scheduling and management of the Android system.

The kernel library includes two parts: a performance function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

Figure 6:
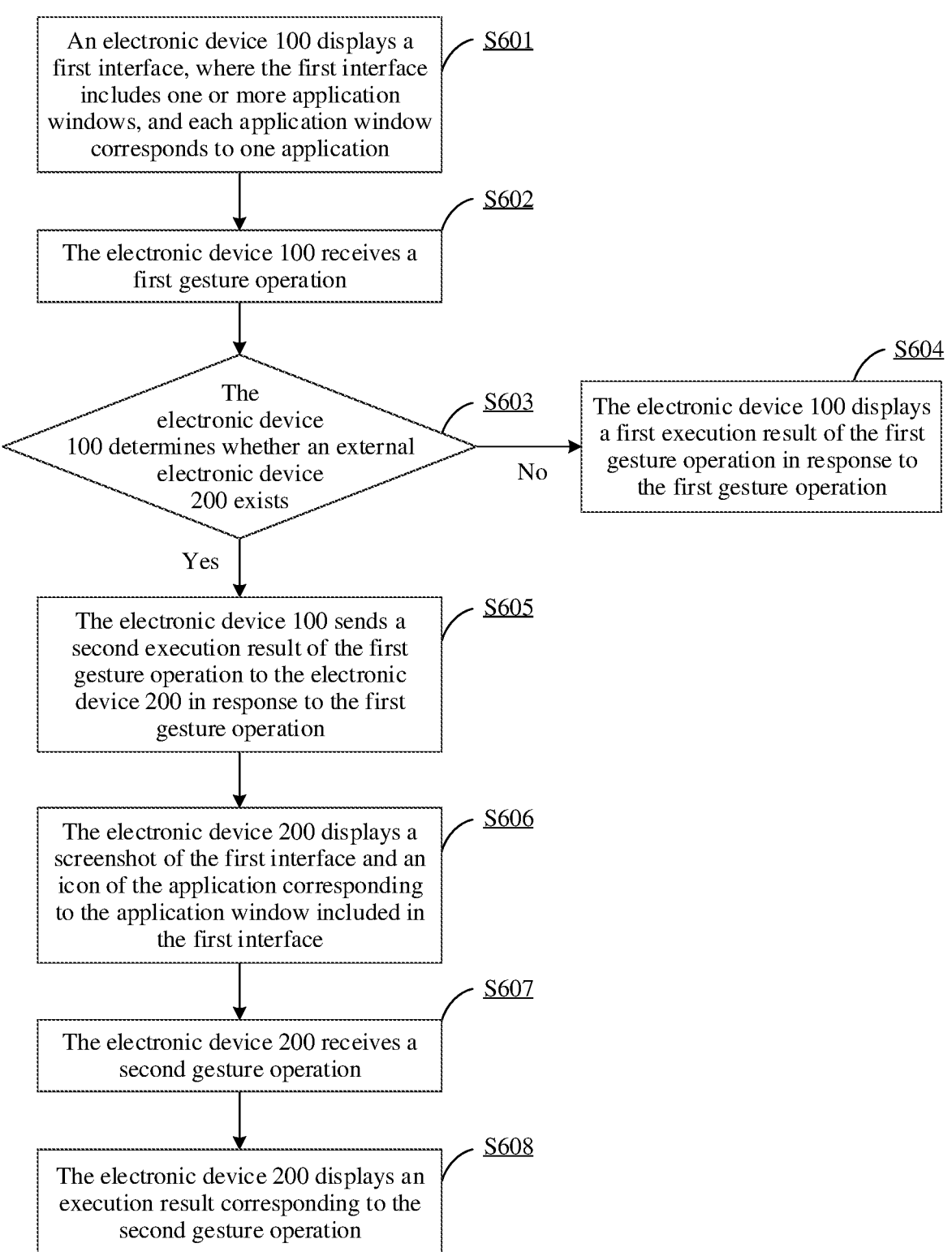
FIG. 6 is a method flowchart of a human-computer interaction method of an electronic device according to an embodiment of this application.

The following describes in detail a method for cross-screen display of an application according to an embodiment of this application by using FIG. 6. A solution for cross-screen display of an application in FIG. 6 in this embodiment of this application is applied to an electronic device. The electronic device described in FIG. 6 may be a tablet computer.

Specifically, as shown in FIG. 6, the method for cross-screen display of an application includes the following steps.

S601: The electronic device 100 displays a first interface, where the first interface includes one or more application windows, and each application window corresponds to one application.

After a user opens the electronic device 100, as shown in FIG. 7, the user may tap a "document" icon 101 on a user interface (user interface, UI) of the electronic device 100. After the electronic device 100 receives an instruction of the tapping operation of the user, the electronic device 100 starts a document application 101. Similarly, the electronic device 100 may further sequentially start a messages application 102 and a browser 103.

The electronic device 100 may simultaneously display a plurality of application windows. For example, the user may perform a simultaneous display operation on the electronic device 100, so that a window manager of the electronic device 100 simultaneously displays application windows of the document application 101, the messages application 102, and the browser application 103 on a screen of the electronic device 100, to form the first interface of the electronic device 100. For example, the simultaneous display operation may be a gesture operation, of touching and holding for 3 seconds and sliding up, that is performed by the user on a lower edge of the screen of the electronic device 100. In an embodiment of this application, after the user performs the simultaneous display operation, as shown in FIG. 7, the application windows of the document application 101, the messages application 102, and the browser 103 are displayed on the screen of the electronic device 100 in a thumbnail manner.

It may be understood that, in another embodiment of this application, the window manager of the electronic device 100 may alternatively split the screen of the electronic device 100 into a plurality of windows, and display the document application 101, the messages application 102, and the browser 103 on split screens. One main window is combined with a plurality of auxiliary windows, to separately display the document application 101, the messages application 102, and the browser 103, so that the user may pay attention to the application in each window. Alternatively, when opening each application, the electronic device 100 uses a non-full-screen window by default, so that application windows of all opened applications can be displayed on the screen.

S602: The electronic device 100 receives a first gesture operation.

Figures 8A, 8B:
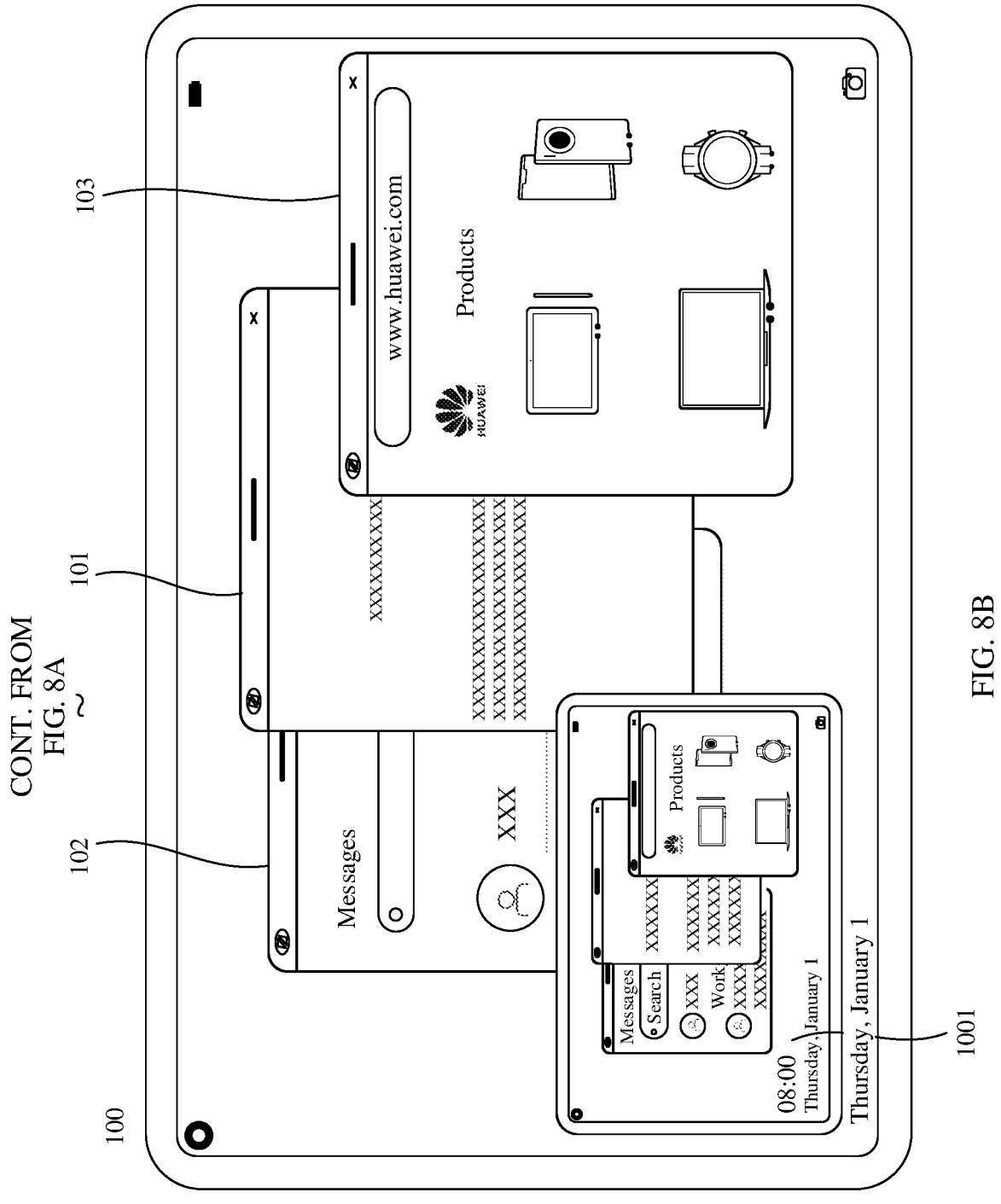
FIG. 8A and FIG. 8B are a diagram of a scenario in which a gesture operation of taking a screenshot is performed on a screen of an electronic device according to an embodiment of this application.

The electronic device 100 may identify, by using a gesture manager, the first gesture operation performed by the user. For example, in this embodiment of this application, the first gesture operation herein may be a gesture operation of three-finger sliding performed by the user on the screen of the electronic device 100. As shown in FIG. 8A and FIG. 8B, the gesture operation of three-finger sliding that is used as the first gesture operation may be specifically three-finger vertical sliding down. The gesture operation may be performed at any location on the screen.

In another embodiment of this application, the first gesture operation may alternatively be another gesture operation or a button function, for example, a gesture operation of touching a bottom of the screen of the electronic device 100 and sliding up, or an operation of two-finger sliding down, or a tapping operation by using one or more knuckles.

S603: The electronic device 100 determines whether an external electronic device 200 exists, and if the external electronic device 200 exists, S605 is performed, or if the external electronic device 200 does not exist, S604 is performed.

For example, the electronic device 100 may determine, in the following manners, that there is an external electronic device 200: The electronic device 100 determines that an electronic device 200 that is connected to the electronic device 100 and that serves as an extended screen exists; or the electronic device 100 determines that an electronic device 200 that is connected to the electronic device 100 in a wireless or wired manner exists. The extended screen herein refers to another screen that shares a host with the electronic device 100. When the electronic device 200 and the electronic device 100 are located in a same local area network, or when the electronic device 200 and the electronic device 100 are logged in with a same user account, it may be considered that the electronic device 200 is connected to the electronic device 100 in a wireless manner. In other words, it is considered that the external electronic device 200 exists. A plurality of extended screens may be connected to the electronic device 100 at the same time, or a plurality of external electronic devices 200 may exist at the same time. In this case, when identifying the external extended screen or the external electronic device 200, the electronic device 100 may further identify a direction of the external device relative to the electronic device 100.

In another embodiment of this application, step S603 is optional. Alternatively, the electronic device 100 may directly respond to the first gesture operation without determining whether the external electronic device 200 exists. For example, when the electronic device 100 does not have the external electronic device 200, the electronic device 100 takes a screenshot of the first interface of the screen and stores the screenshot. If the electronic device 100 has the external electronic device 200, an execution result of the first gesture operation is displayed on the electronic device 200. To be specific, the screenshot of the first interface of the screen of the electronic device 100 and an application identifier corresponding to the application window included in the first interface are displayed on the electronic device 200. In addition, the electronic device 100 may also display the screenshot of the first interface. Further, the electronic device 100 may store the screenshot of the first interface. The screenshot of the first interface refers to a snapshot of the first interface. The screenshot is a picture, and displayed content of the screenshot is the first interface. Generally, if the electronic device 100 displays the first interface in full screen, the screenshot of the first interface may be a screen snapshot taken when the electronic device 100 displays the first interface. In other words, the screenshot is content currently displayed on the screen of the electronic device 100.

S604: The electronic device 100 displays a first execution result of the first gesture operation in response to the first gesture operation.

For example, when the first gesture operation is the three-finger vertical sliding down described in step S602, an execution result corresponding to the gesture operation of three-finger vertical sliding down of the electronic device 100 may be taking a screenshot of the first interface of the screen of the electronic device 100. The screenshot includes the application windows of the document application 101, the messages application 102, and the browser 103 that are displayed in the thumbnail manner on the screen of the electronic device 100.

When the electronic device 100 is not connected to the electronic device 200 or another electronic device, as shown in FIG. 8A and FIG. 8B, the electronic device 100 may display, on the screen of the electronic device 100, the execution result of the first gesture operation, namely, a thumbnail of a screenshot 1001 of the first interface of the screen of the electronic device 100. The user may tap the thumbnail, to display the screenshot in full screen on the screen of the electronic device 100. The user may further edit the screenshot, and details are not described herein again.

It should be noted that, in another implementation, if it is determined in S603 that the external electronic device 200 exists, S604 and S605 may be performed simultaneously. To be specific, in response to the first gesture operation, the electronic device 100 displays the screenshot of the first interface on the screen of the electronic device 100, and the electronic device 100 sends the screenshot of the first interface and the icon of the application corresponding to the application window included in the first interface to the electronic device 200.

S605: The electronic device 100 sends a second execution result of the first gesture operation to the electronic device 200 in response to the first gesture operation.

It may be understood that, when the electronic device 100 determines that the external electronic device 200 exists, the electronic device 100 sends the second execution result of the first gesture operation to the electronic device 200. The second execution result may include the screenshot of the first interface of the screen of the electronic device 100 and the application identifier corresponding to the application window included in the first interface. In other words, when the external electronic device 200 exists, the electronic device 100 may send the screenshot of the first interface and the application identifier corresponding to the application window included in the first interface to the electronic device 200. The application identifier may be an application icon, or may be other information used to identify an application.

S606: The electronic device 200 displays the screenshot of the first interface and the icon of the application corresponding to the application window included in the first interface.

Figure 9B:
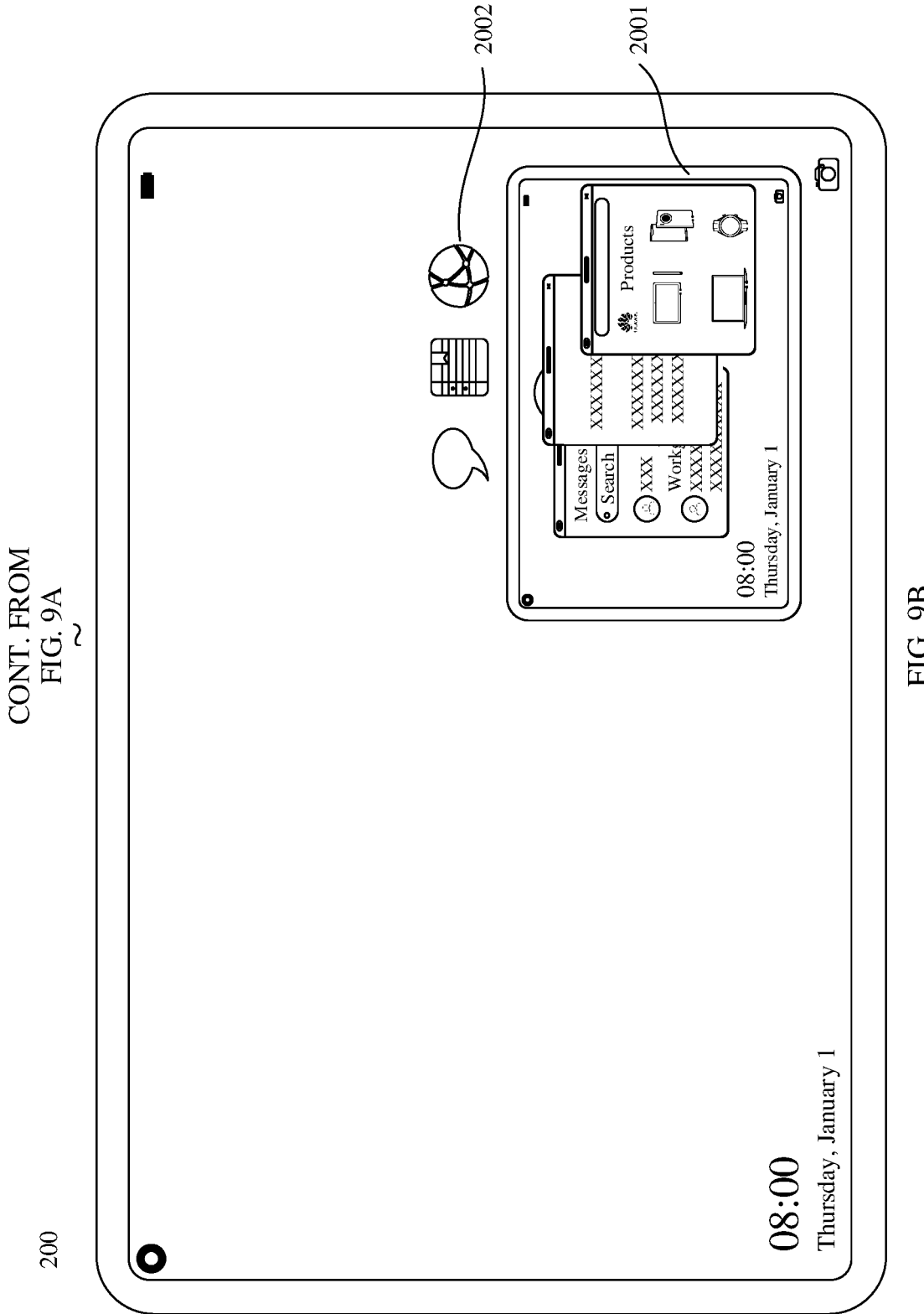

As shown in FIG. 9A and FIG. 9B, the electronic device 200 displays a screenshot 2001 of the first interface. The screenshot includes three windows: the document application 101, the messages application 102, and the browser 103. In addition, the electronic device 200 further displays, on the screen, an icon of an application corresponding to each application window included in the first interface. The electronic device 200 may obtain, based on the application identifier sent by the electronic device 100, an application icon corresponding to the application identifier. For example, the electronic device 200 sequentially displays, above the screenshot 2001 of the first interface, icons 2002 corresponding to the document application 101, the messages application 102, and the browser 103. In addition, specific locations of these application icons are not limited in embodiments of this application. For example, as shown in FIG. 9A and FIG. 9B, the icons 2002 corresponding to the document application 101, the messages application 102, and the browser 103 may be aligned with the document application 101, the messages application 102, and the browser 103 in the screenshot 2001. Alternatively, in another embodiment, the icons may not be fully aligned with the windows in the screenshot.

Specifically, the application identifier may be actively sent by the electronic device 100 to the electronic device 200, or may be obtained by the electronic device 200 from the electronic device 100. For example, the electronic device 100 can learn of the application identifier corresponding to the currently opened application window. When sending the second execution result to the electronic device 200 in response to the first gesture operation, the electronic device 100 may actively send the application identifier or the application icon to the electronic device 200. The application icon may alternatively be considered as an application identifier. Alternatively, the electronic device 200 may obtain the application identifier from the electronic device 100 through the following process: The electronic device 200 obtains, based on an application manager (for example, an ActivityManager of an Android system) of the electronic device 100, an application (for example, getRecentTasks) that currently runs on the electronic device 100. The electronic device 200 further obtains a name of the application that currently runs, and obtains an icon of the application based on the name.

Then, still as shown in FIG. 9A and FIG. 9B, the electronic device 200 displays the obtained icon of the application and the screenshot of the first interface on the screen of the electronic device 200. For example, for the document application 101, the messages application 102, and the browser 103, the electronic device 200 may display the screenshot 2001 in an area of the screen, for example, a lower left side, a lower right side, an upper left side, an upper right side, a left side, a right side, an upper side, and a lower side of the screen of the electronic device 200. In addition, the electronic device 2000 may display, near the screenshot 2001, an icon of an application included in the screenshot. For example, the electronic device 2000 displays the icon above the screenshot, or displays the icon 2002 below, on a left side of, or on a right side of the screenshot. The icons 2002 may be sequentially displayed based on an order of the three windows of the document application 101, the messages application 102, and the browser 103 in the screenshot.

S607: The electronic device 200 receives a second gesture operation.

The second gesture operation performed on the screen of the electronic device 200 may include the following types: a gesture operation of tapping performed by the user on the screenshot of the first interface displayed by the electronic device 200, or a gesture operation of tapping performed by the user on the icon of the application displayed above the screenshot, or a gesture operation of dragging performed by the user on the icon of the application displayed above the screenshot, or a gesture operation performed by the user on an area other than the icon of the application and the screenshot.

It may be understood that, in another embodiment of this application, when the user performs the second gesture operation on the screen of the electronic device 200, the electronic device 200 may send an instruction corresponding to the gesture operation to the electronic device 100. The electronic device 100 displays, on the screen of the electronic device 200 based on the received instruction, an execution result corresponding to the instruction.

S608: The electronic device 200 displays the execution result corresponding to the second gesture operation.

Figures 1, 10A:
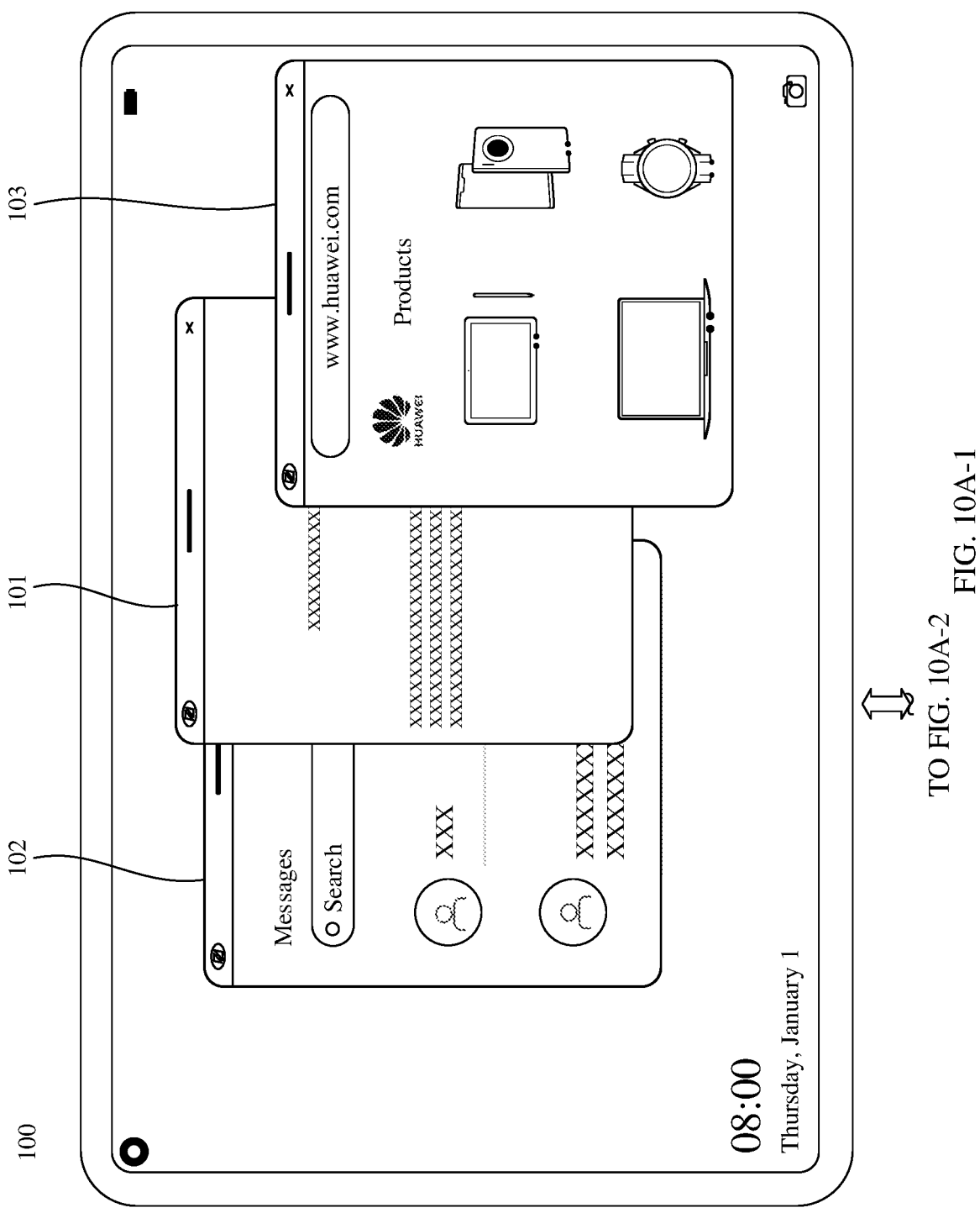
Figures 1, 2, 10A:
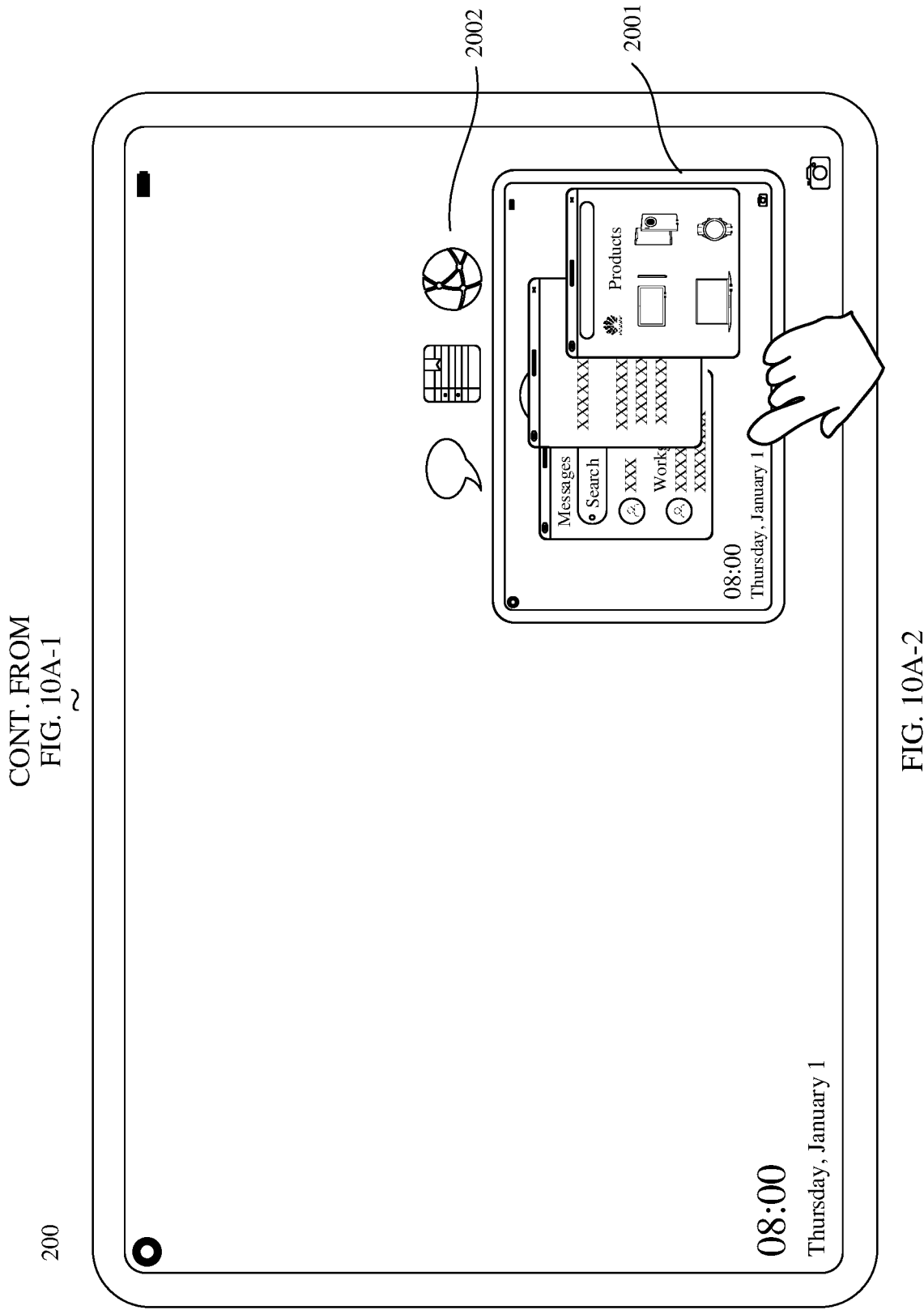
Figure 10B:
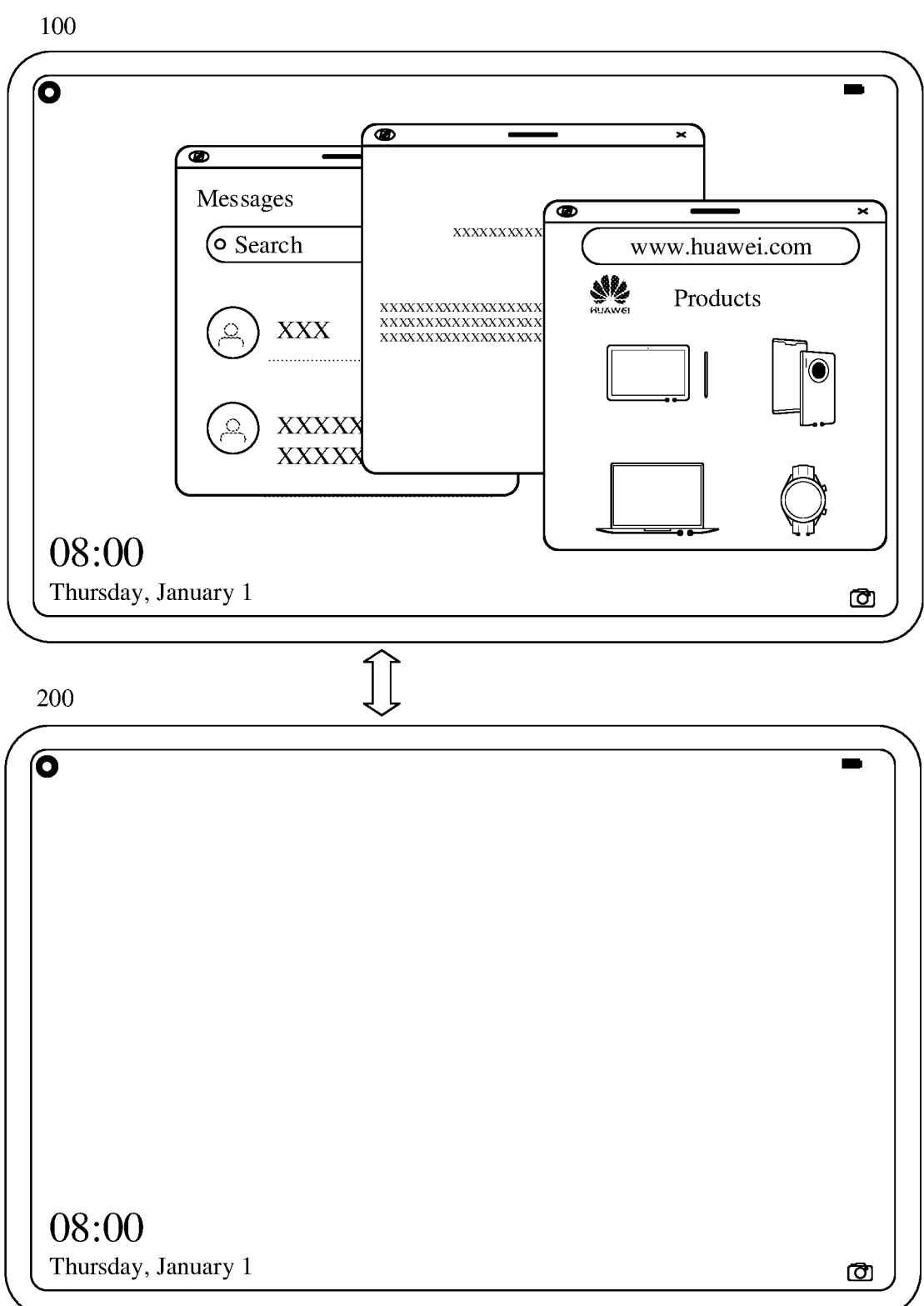

Different second gesture operations correspond to different execution results. For example, the second gesture operation may be a gesture operation of tapping performed on the screenshot displayed on the electronic device 200. A corresponding execution result is that the electronic device 100 may perform a method similar to that in step S604. For example, as shown in FIG. 10A-1 and FIG. 10A-2, the user performs a tapping operation on the screenshot 2001 in the electronic device 200. In response to the tapping operation, as shown in FIG. 10B, the screenshot is displayed in full screen on the screen of the electronic device 100, and the user may further edit the screenshot. In addition, the electronic device 200 no longer displays the screenshot 2001 and the icon 2002. Alternatively, the user performs a tapping operation on the screenshot 2001 in the electronic device 200. In response to the tapping operation, the screenshot may be displayed in full screen on the screen of the electronic device 200, so that the user can perform an operation such as editing or saving the screenshot in the electronic device 200.

Figures 1, 2, 11A:
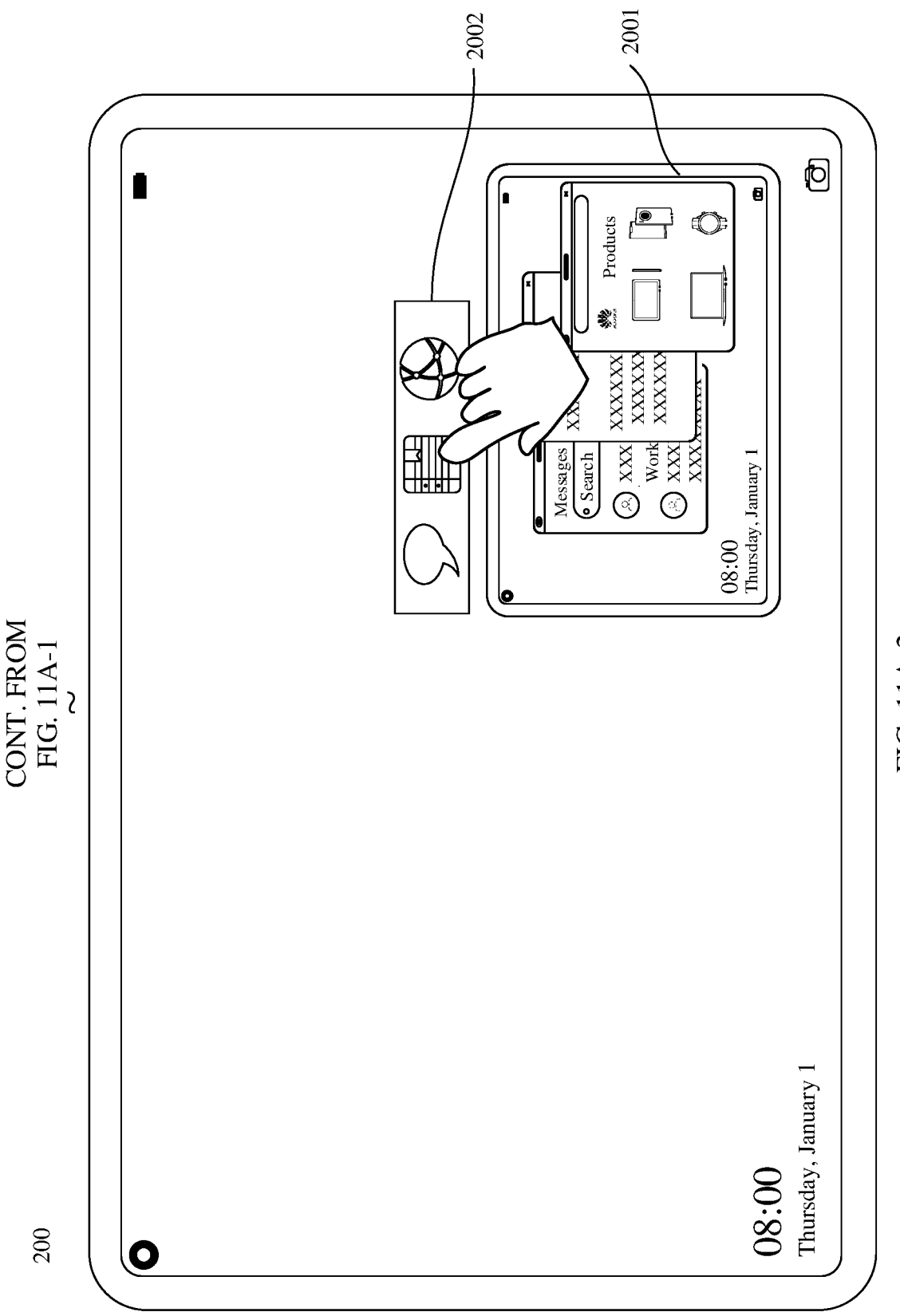
Figure 11B:
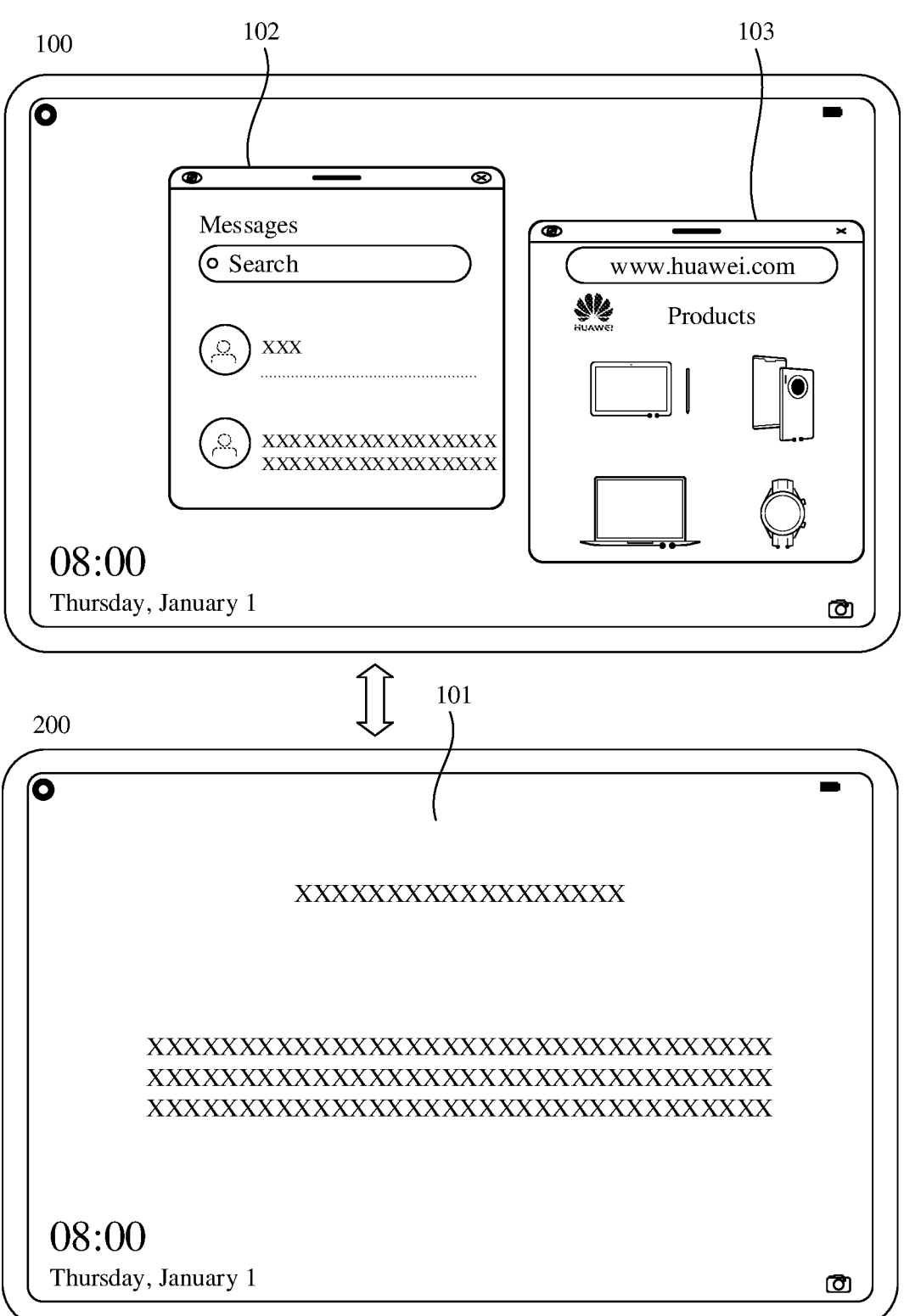

For example, the second gesture operation may be a gesture operation of tapping performed on the icon corresponding to the application identifier sent by the electronic device 100. A corresponding execution result is that the electronic device 200 opens the application corresponding to the icon and displays a window of the application, and the electronic device 100 removes the window of the application from the screen. In other words, the user moves the application from the screen of the electronic device 100 to the screen of the electronic device 200 for display by performing the tapping operation on the icon of the application. When the application is moved to the electronic device 200 for display, full-screen display may be performed, or nonfull-screen display may be performed. For example, as shown in FIG. 11A-1 and FIG. 11A-2, icons 2002 corresponding to the document application 101, the messages application 102, and the browser 103 may be displayed on an upper side of the screenshot 2001. The user performs a tapping operation on an icon of the document application 101 in the icon 2002 displayed on the screen of the electronic device 200. The electronic device 200 sends an instruction of the tapping operation to the electronic device 100. The instruction of the tapping operation may include an application name corresponding to the icon tapped by the user and a type of the tapping operation. In response to the instruction of the tapping operation, as shown in FIG. 11B, the electronic device 100 moves the application window of the document application 101 to the screen of the electronic device 200 for display.

Figures 1, 2, 12A:
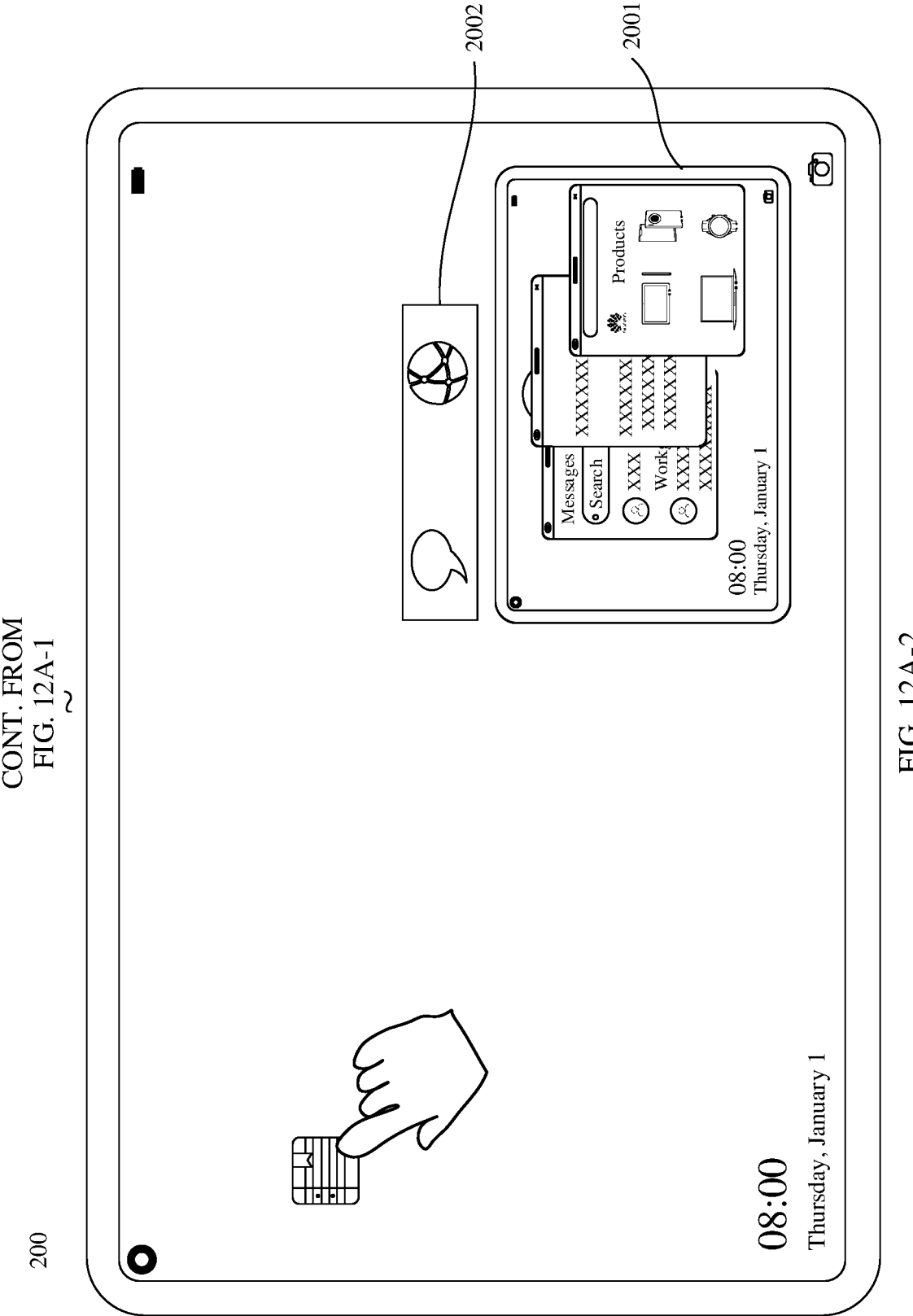
Figure 12B:
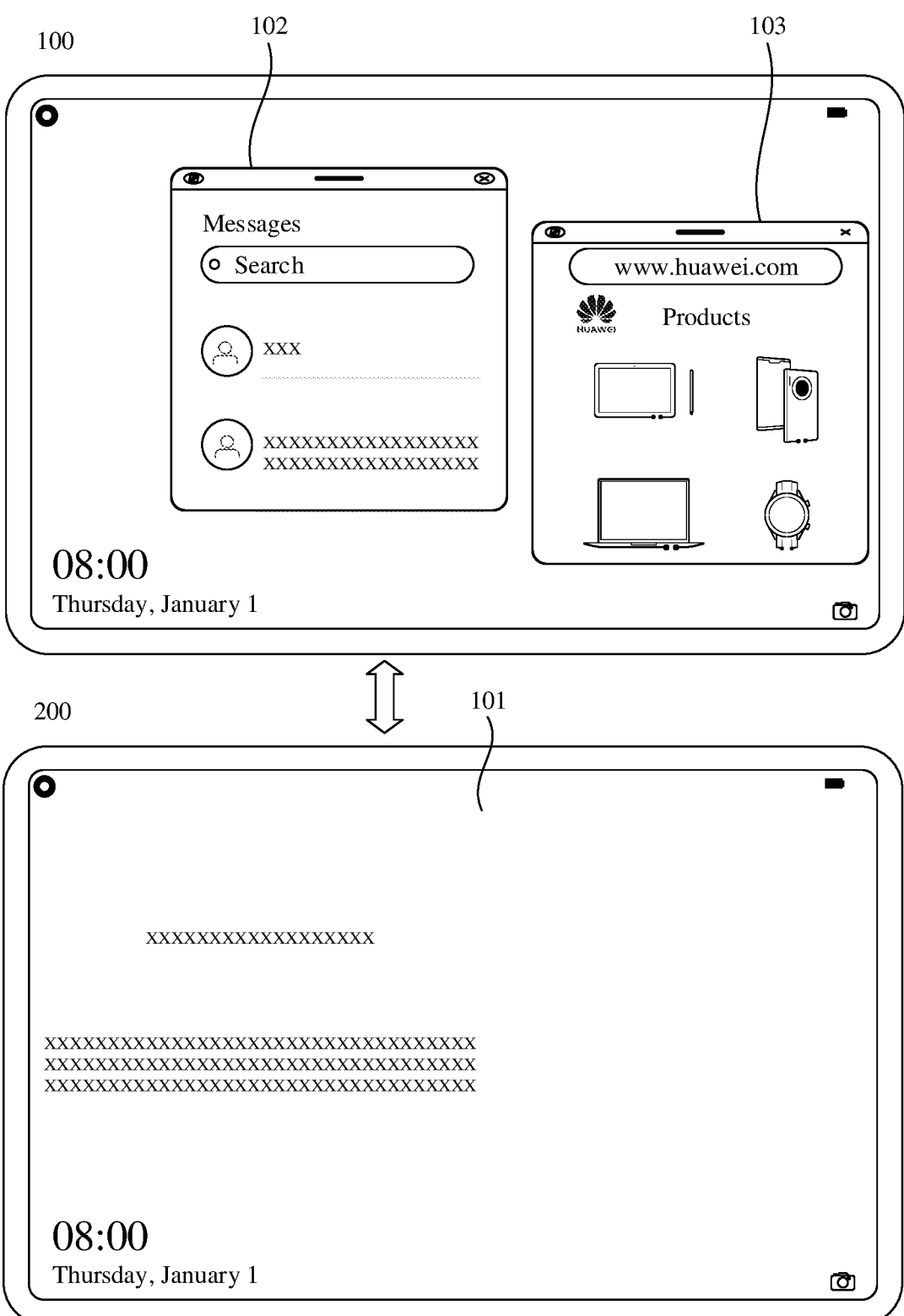

For example, the second gesture operation may further be a gesture operation of dragging performed on the icon corresponding to the application identifier sent by the electronic device 100. A corresponding execution result is that the electronic device 200 may open, in a left split screen, a right split screen, or a full screen manner, the application corresponding to the icon and display a window of the application on the screen of the electronic device 200 based on a final location of the icon of the application after the dragging operation is performed on the icon of the application. At the same time, the electronic device 100 removes the window of the application from the screen. In other words, the user may perform the dragging operation on the icon of the application to move the application from the screen of the electronic device 100 to the screen of the electronic device 200 for display, and may determine a display manner of the application based on the final location of the icon of the application. For example, as shown in FIG. 12A-1 and FIG. 12A-2, the user touches and holds the icon of the document application 101 in the icon 2002 displayed on the screen of the electronic device 200, drags the icon to the left side of the screen of the electronic device 200, and releases the icon. In this case, as shown in FIG. 12B, the electronic device 200 sends the instruction of the dragging operation to the electronic device 100. The instruction of the dragging operation may include a location at which the user drags and releases the icon, an application name corresponding to the icon, and a type of the drag operation. In response to the instruction of the tapping operation, as shown in FIG. 12B, the electronic device 100 moves the application window of the document application 101 to the left split screen of the screen of the electronic device 200 for display. In this case, the screen of the electronic device 100 displays a second interface, and the second interface includes the application windows of the messages application 102 and the browser 103.

Figure 13:
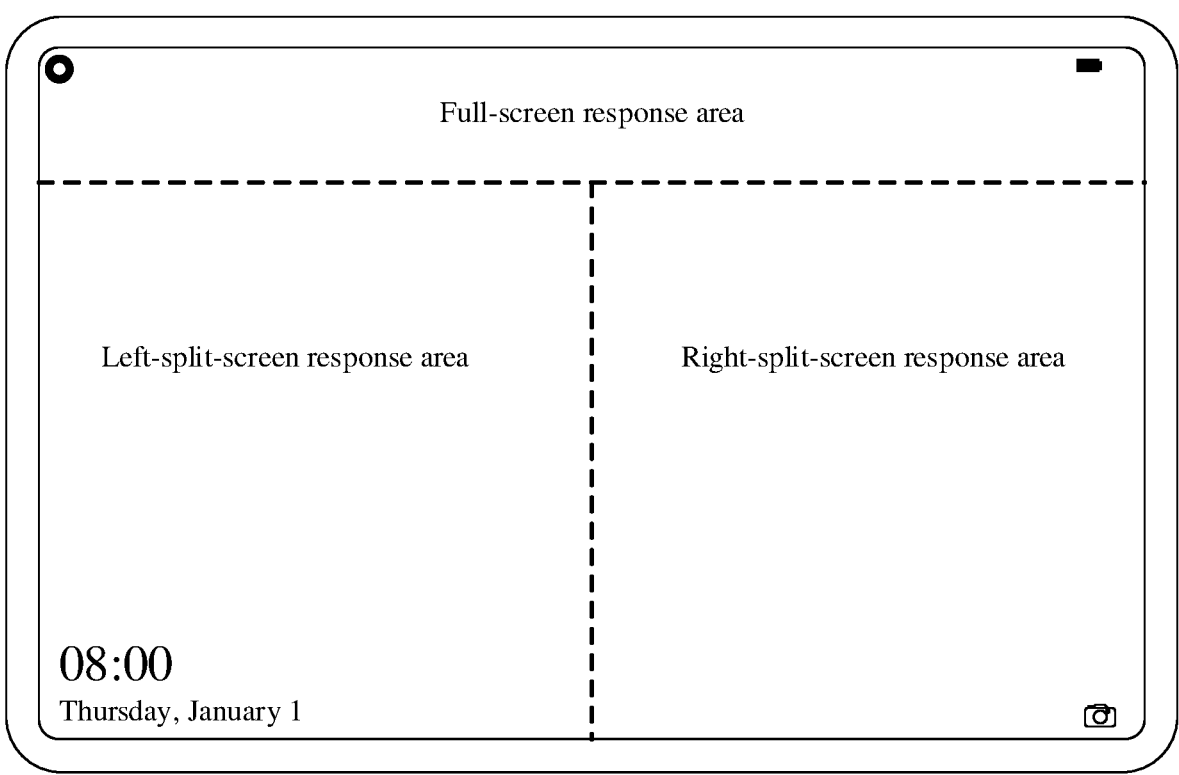
FIG. 13 is a schematic diagram of dividing a screen of a second electronic device into three display areas according to an embodiment of this application.

In this embodiment of this application, the display manner of the application on the screen of the electronic device 200 may be determined based on the final location that the user drags and releases the icon of the application by using the following method. For example, as shown in FIG. 13, the electronic device 200 may split the screen of the electronic device 200 into three response areas: a left-split-screen response area, a right-split-screen response area, and a full-screen response area. The left-split-screen response area, the right-split-screen response area, and the full-screen response area respectively correspond to a left split screen display manner, a right split screen display manner, and a full screen display manner. The electronic device 100 may detect, in real time through the communication connection to the electronic device 200, which area of the screen of the electronic device 200 that the final location that the user drags and releases the icon of the application falls, and further determine a display manner of the application on the screen of the electronic device 200. A method for dividing the left-split-screen response area and the right-split-screen response area by the electronic device 200 may be as follows: The left-split-screen response area corresponds to a left half screen of the screen of the electronic device 200, and the right-split-screen response area corresponds to a right half screen. For the full-screen response area, the electronic device 200 may divide an area formed by 100 pixels vertically downward on an upper edge of the screen of the electronic device 200 into the full-screen response area. In embodiments of this application, it can be learned from FIG. 13 that, an area in which the left-split-screen response area and the right-split-screen response area overlap with the full-screen response area is the full-screen response area overlap.

It may be understood that the 100 pixels herein are merely an example, and any other numerical value may also be used.

In another embodiment of this application, the electronic device 200 may alternatively detect, in real time, which area of the screen of the electronic device 200 that the final location that the user drags and releases the icon of the application falls, and further determine a display manner of the application window on the screen of the electronic device 200. After receiving the application window sent by the electronic device 100, the electronic device 200 displays the application window in the determined display manner.

Figures 1, 2, 14A:
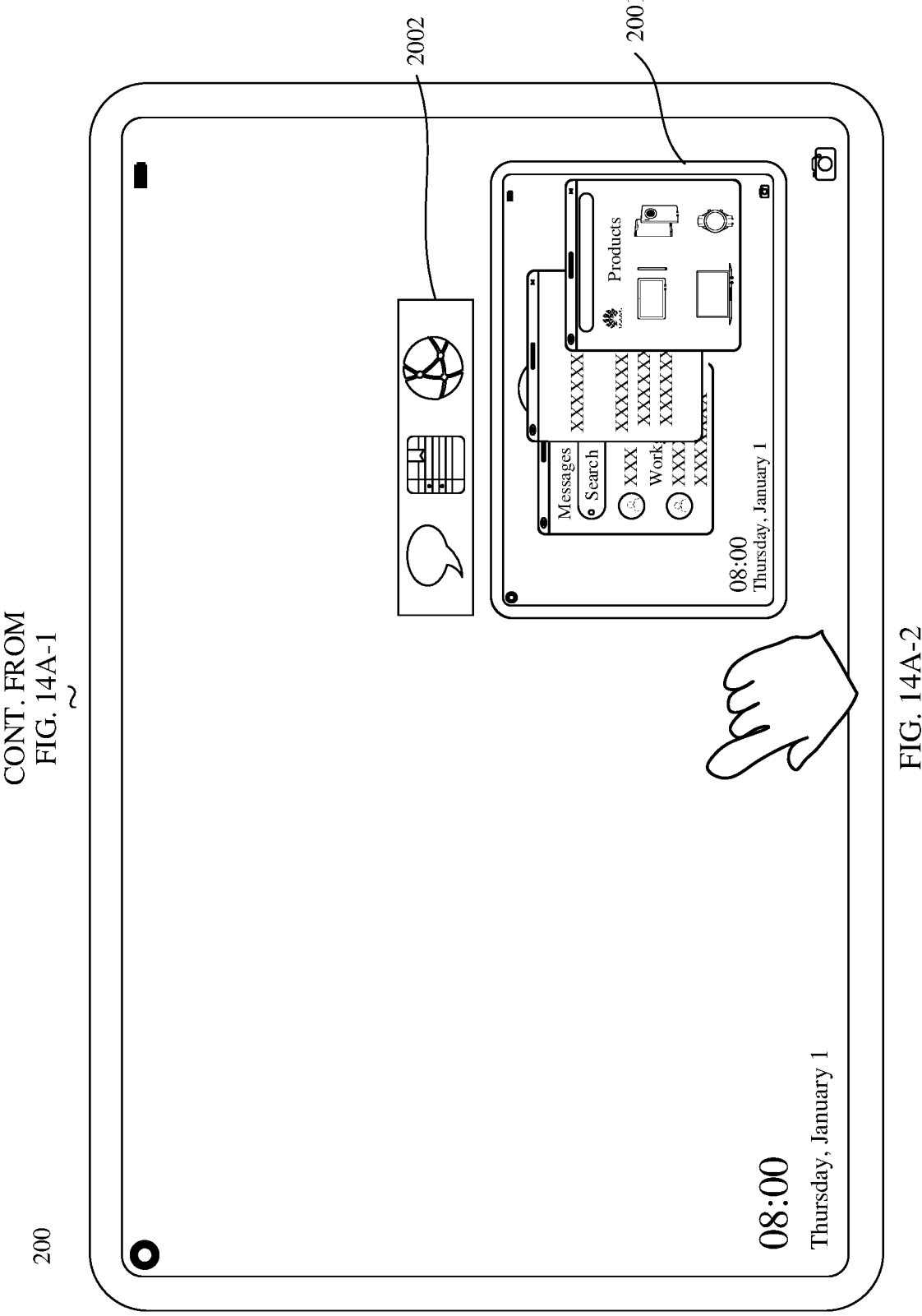
Figure 14B:
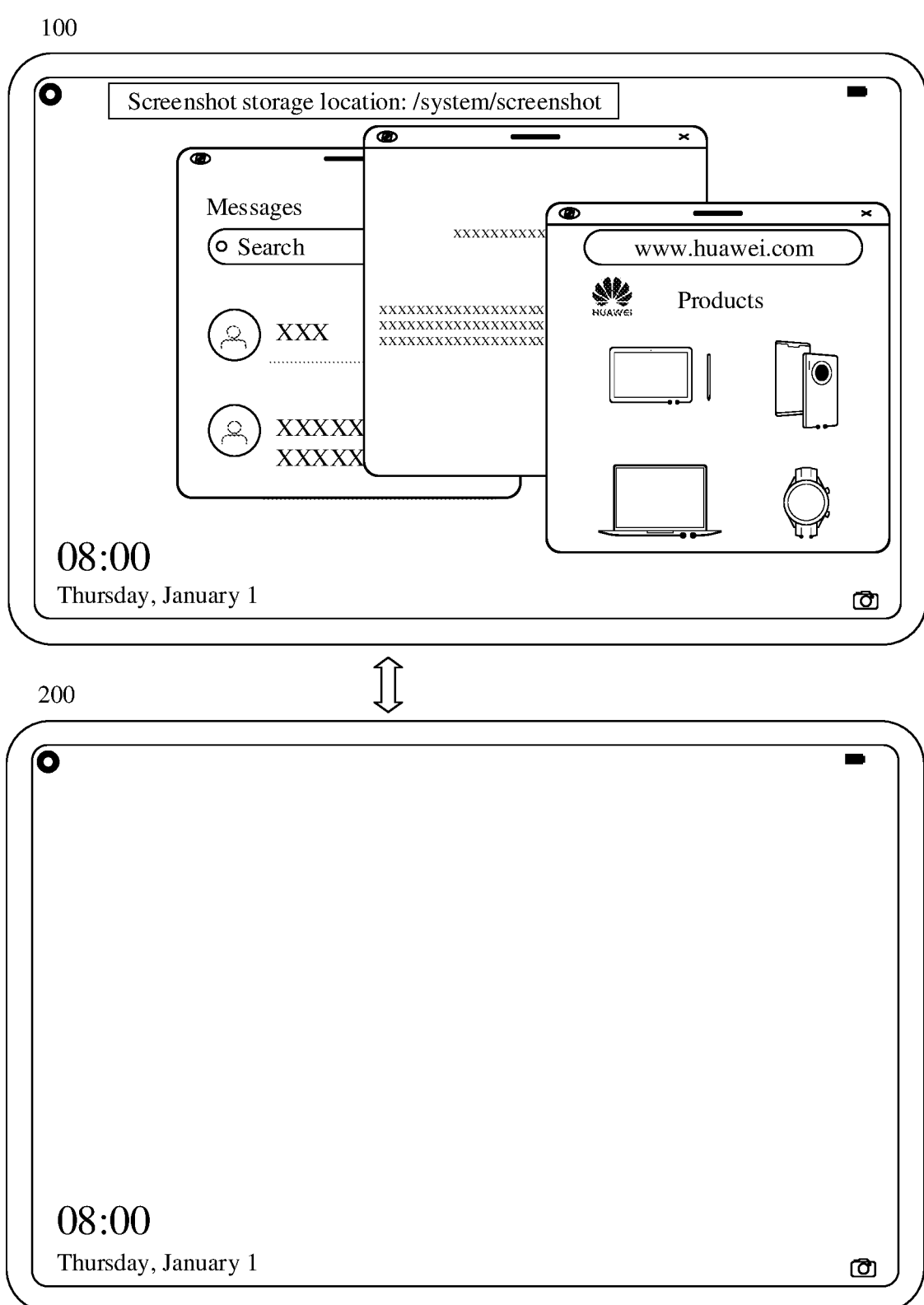

It may be understood that, when the user performs a gesture operation on the area other than the icon of the application and the screenshot, the electronic device 200 may delete the screenshot of the current application and the icon of the application from the screen of the electronic device 200. At the same time, the screen of the electronic device 100 prompts that the screenshot is saved, and a storage location of the screenshot may also be displayed. For example, as shown in FIG. 14A-1 and FIG. 14A-2, the user performs a tapping operation in an area other than the screenshot 2001 and the icon 2002 on the screen of the electronic device 200. In this case, as shown in FIG. 14B, the electronic device 100 may delete the screenshot 2001 and the icon 2002 on the screen of the electronic device 200. In addition, the screen of the electronic device 100 prompts that the screenshot of the current screen of the electronic device 100 is saved. In other words, the electronic device 100 completes the operation of taking a screenshot of the current screen of the electronic device 100 in response to the instruction of the gesture operation of three-finger sliding down.

In steps S601 to S608 described in FIG. 6, the electronic device 100 may be communicatively connected to one or more other electronic devices through a wired connection, for example, a USB (Universal Serial BUS, universal serial bus) connection, or a wireless connection, for example, a WI-FI (Wireless Fidelity, wireless fidelity) connection or a Bluetooth connection.

Figure 15A:
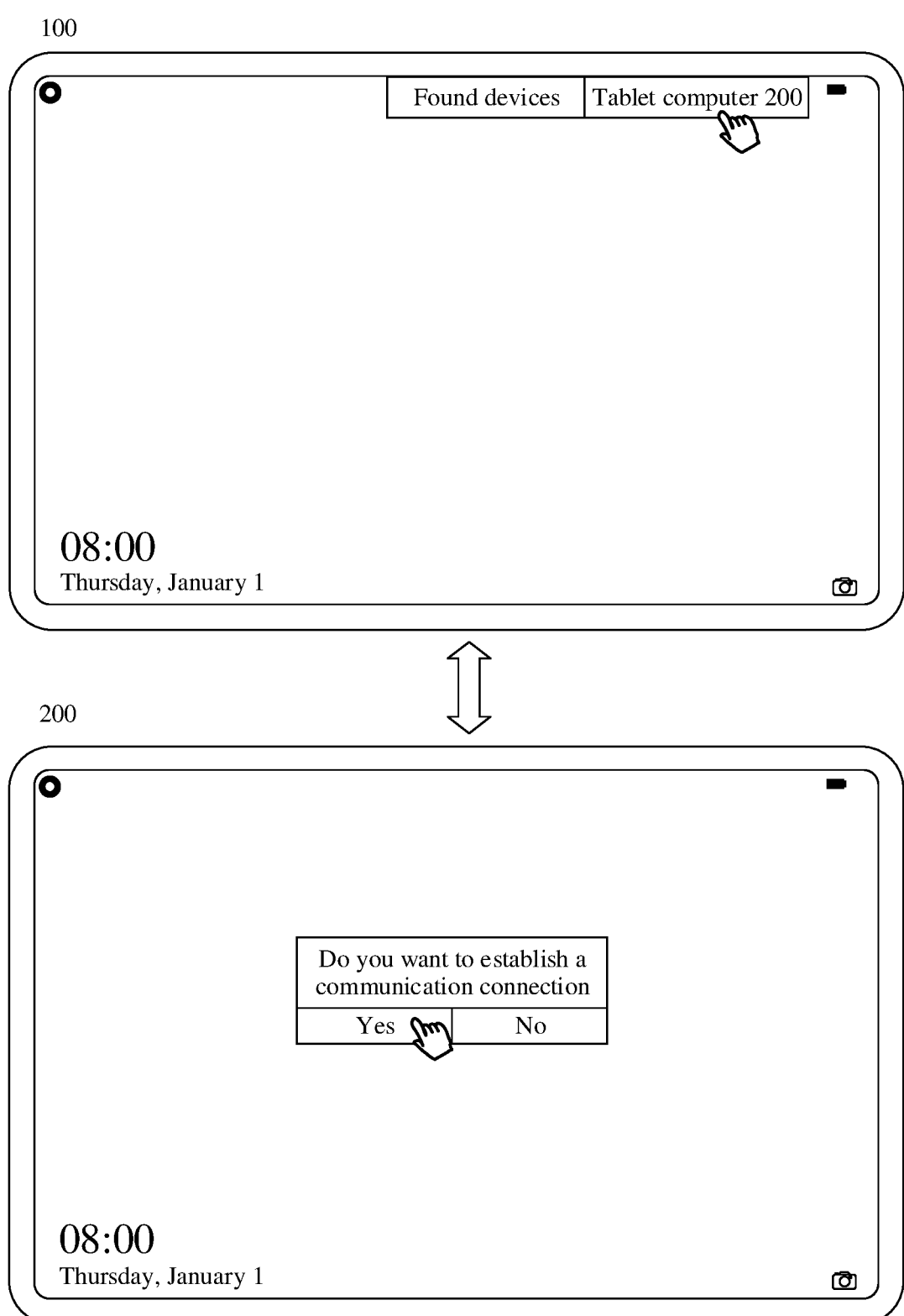
FIG. 15A and FIG. 15B are diagrams of a scenario in which locations of a first electronic device and a second electronic device are determined after a communication connection is established between the first electronic device and the second electronic device according to an embodiment of this application.

For example, as shown in FIG. 15A, a method for establishing a communication connection between the electronic device 100 and the electronic device 200 includes: The electronic device 100 finds an electronic device 200 connected to the electronic device 100 in a wired or wireless manner, for example, a tablet computer 200. The electronic device 100 sends a communication connection request to the electronic device 200. The electronic device 200 prompts whether to agree to establish the communication connection.

Figure 15B:
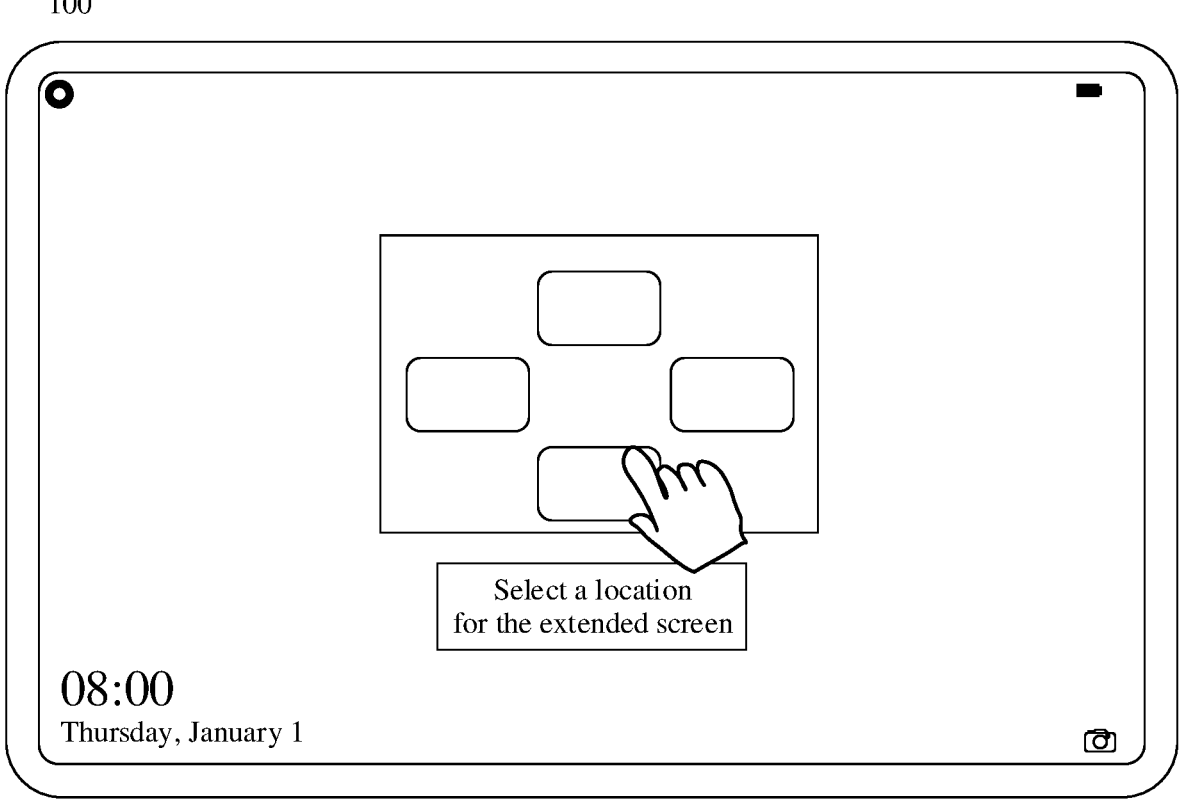

After a user clicks to confirm the establishment, as shown in FIG. 15B, the screen of the electronic device 100 may prompt a location of the screen of the electronic device 200 relative to the screen of the electronic device 100, and the user may choose to set the screen of the electronic device 200 below the screen of the electronic device 200. It may be understood that the electronic device 100 may further establish an extended display connection to the electronic device 200, and the screen of the electronic device 200 may be configured as an extended screen of the screen of the electronic device 100.

It may be understood that, in another embodiment of this application, the electronic device 100 may automatically determine the location of the screen of the electronic device 200 relative to the screen of the electronic device 100 based on a spatial location relationship between the electronic device 100 and the electronic device 200, and the user does not need to select. For example, the electronic device 100 may determine the spatial location relationship between the electronic device 100 and the electronic device 200 based on a direction of a Wi-Fi signal between the electronic device 100 and the electronic device 200 or a UWB (Ultra Wide-Band, ultra wideband) positioning technology, and then further determine the location of the screen of the electronic device 200 relative to the screen of the electronic device 100.

In another embodiment of this application, the electronic device 100 may further determine, based on a default configuration of an operating system of the electronic device 100, the location of the screen of the electronic device 200 that is communicatively connected to the electronic device 100 relative to the screen of the electronic device 100. For example, the operating system of the electronic device 100 sets, by default, the screen of the electronic device 200 that is communicatively connected to the electronic device 100 on a right side of the screen of the electronic device 100.

Steps S601 to S608 described in FIG. 6 show a cross-screen display method for moving a window of an application from the electronic device 100 to a screen of the electronic device 200 by performing a first gesture operation on the electronic device 100 and performing a second gesture operation on an execution result of the first gesture operation. The following describes in detail another display method of an application of the electronic device 100 according to an embodiment of this application by using FIG. 16. The display solution of the application in FIG. 16 in this embodiment of this application may be implemented by executing a related program by the processor 110 of the electronic device 100. In FIG. 16, based on an execution result of a supported gesture operation, such as a three-finger sliding operation, the electronic device 100 adds a determining condition or a subsequent gesture operation to implement sharing of the window of the application with another electronic device connected to the electronic device 100. The electronic device described in FIG. 16 may be a tablet computer, a vehicle-mounted machine, and a mobile phone.

Specifically, as shown in FIG. 16, the display method of the application includes the following steps.

S1601: An electronic device 100 displays a first interface, where the first interface includes one or more application windows, and each application window corresponds to one application.

Step S1601 may be the same as step S601. A user may start a document application 101, a messages application 102, and a browser 103 on the electronic device 100. The electronic device 100 displays the first interface, where the first interface includes application windows of the document application 101, the messages application 102, and the browser 103 that are displayed in a thumbnail manner.

S1602: The electronic device 100 receives a first gesture operation.

Step S1602 may be the same as step S602. For example, in this embodiment of this application, the first gesture operation herein may be a gesture operation of three-finger sliding. An execution result corresponding to the gesture operation of three-finger sliding may be taking a screenshot of the first interface of the screen of the electronic device 100, and displaying the screenshot on the screen of the electronic device 100.

S1603: The electronic device 100 displays a first execution result of the first gesture operation in response to the first gesture operation.

Figure 17A:
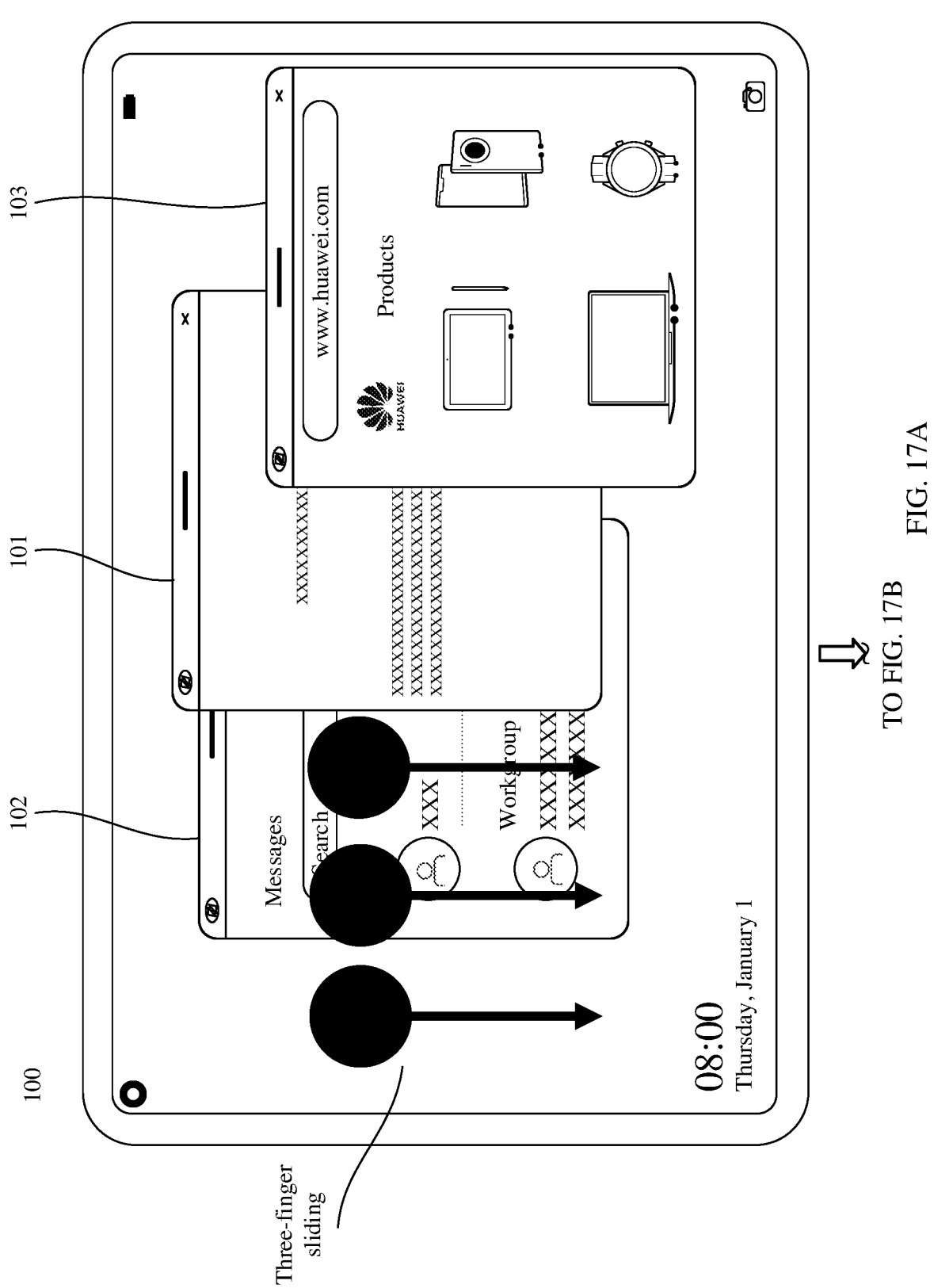
FIG. 17A and FIG. 17B are a diagram of a scenario in which a screenshot of a screen of an electronic device and an icon of an application included in the screenshot are displayed after a gesture operation is performed on the screen of the electronic device according to an embodiment of this application.
Figures 17A, 17B:
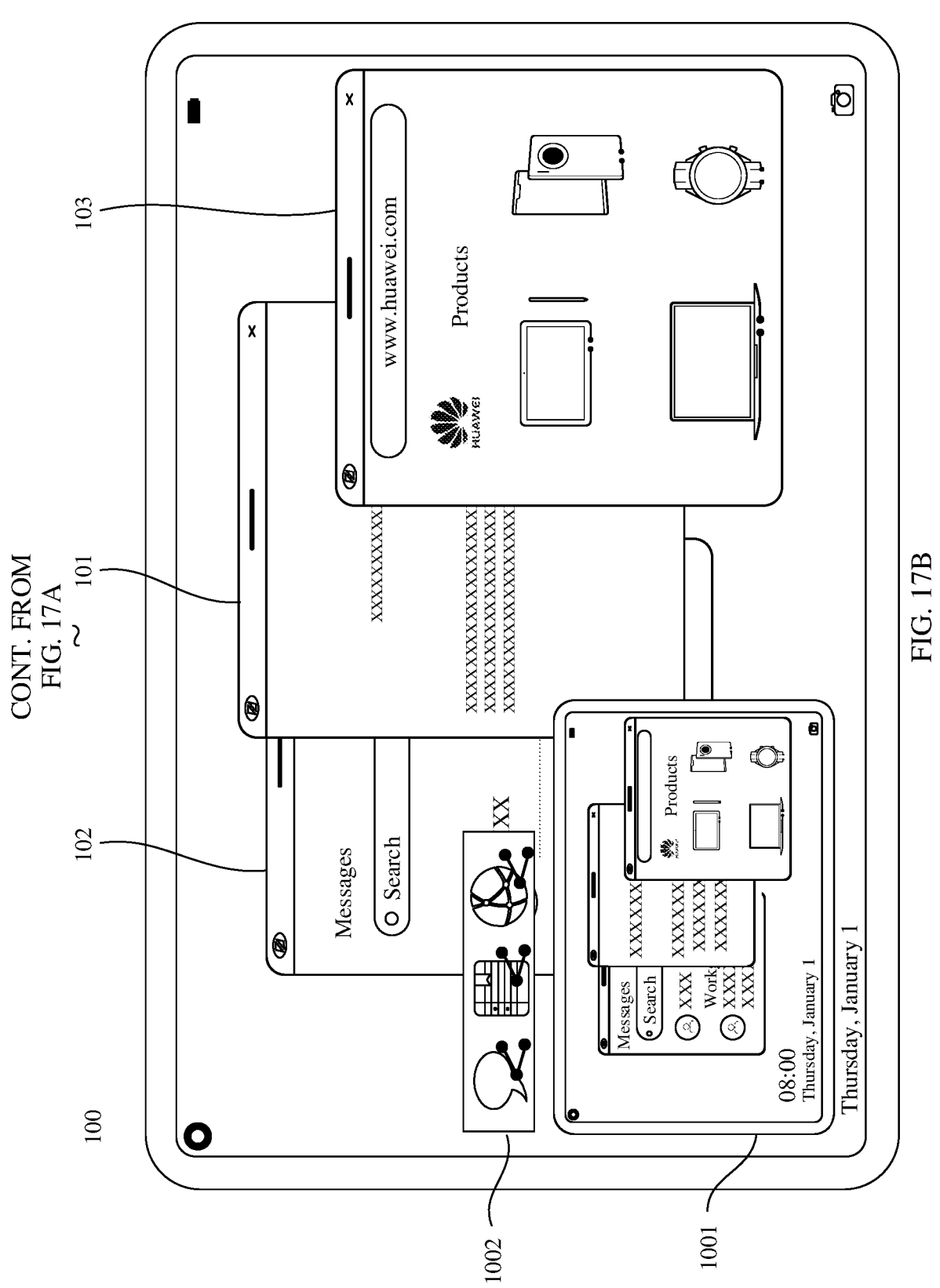

Step S1603 is similar to step S604. For example, when the first gesture operation is the three-finger vertical sliding down described in step S1602, as shown in FIG. 17A and FIG. 17B, an execution result corresponding to the gesture operation of three-finger vertical sliding down of the electronic device 100 may be: The electronic device 100 obtains the screenshot of the first interface of the electronic device 100 that includes the current document application 101, the messages application 102, and the browser 103, and obtains icons corresponding to the document application 101, the messages application 102, and the browser 103. A difference from step S607 lies in that a screenshot 1001 of the document application 101, the messages application 102, and the browser 103 is displayed on the screen of the electronic device 100, and icons 1002 corresponding to the document application 101, the messages application 102, and the browser 103 are displayed in a display area above the screenshot 1001. As shown in FIG. 17A and FIG. 17B, the icons corresponding to the document application 101, the messages application 102, and the browser 103 may be attached with a sharing mark.

S1604: The electronic device 100 receives a second gesture operation, and displays an execution result of the second gesture operation.

Figure 18A:
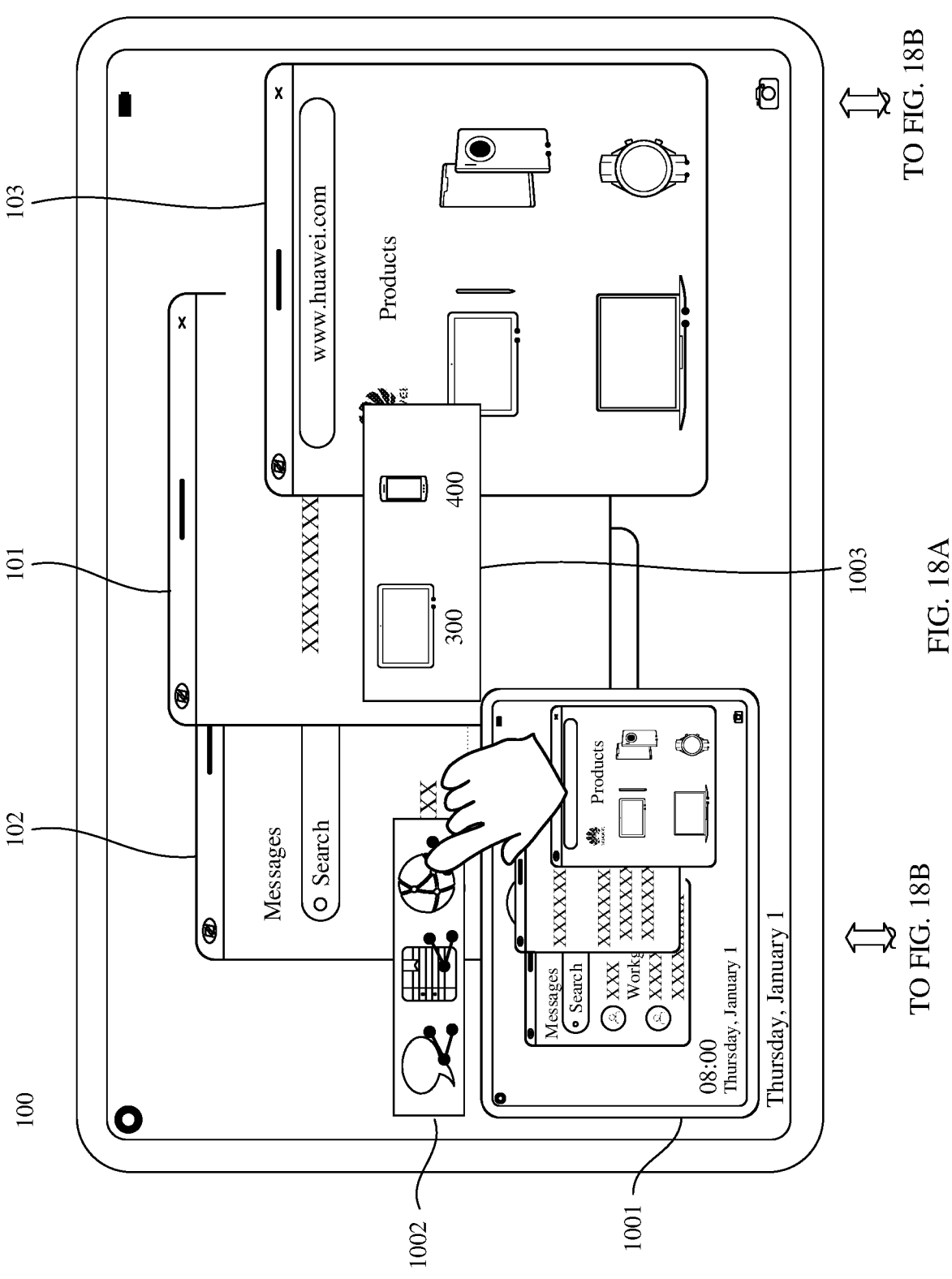

The second gesture operation is a gesture operation of tapping performed on the icon of the application displayed on the electronic device 100. That is, a tapping operation is performed on the icons of the document application 101, the messages application 102, and the browser 103 in the icon 1002 in FIG. 17A and FIG. 17B. An execution result corresponding to the second gesture operation may be that the electronic device 100 displays a sending object list on the screen. The sending object list may include another electronic device that establishes a connection to the electronic device 100. As shown in FIG. 18A and FIG. 18B, Wi-Fi connections are established between the electronic device 100 and an electronic device 300 and between the electronic device 100 and an electronic device 400. In this case, after the user taps the icon of the browser 103, the screen of the electronic device 100 displays a window 1003 that includes two options: the electronic device 300 and the electronic device 400.

S1605: The electronic device 100 obtains a third gesture operation, and sends an execution result of the third gesture operation.

Figure 19A:
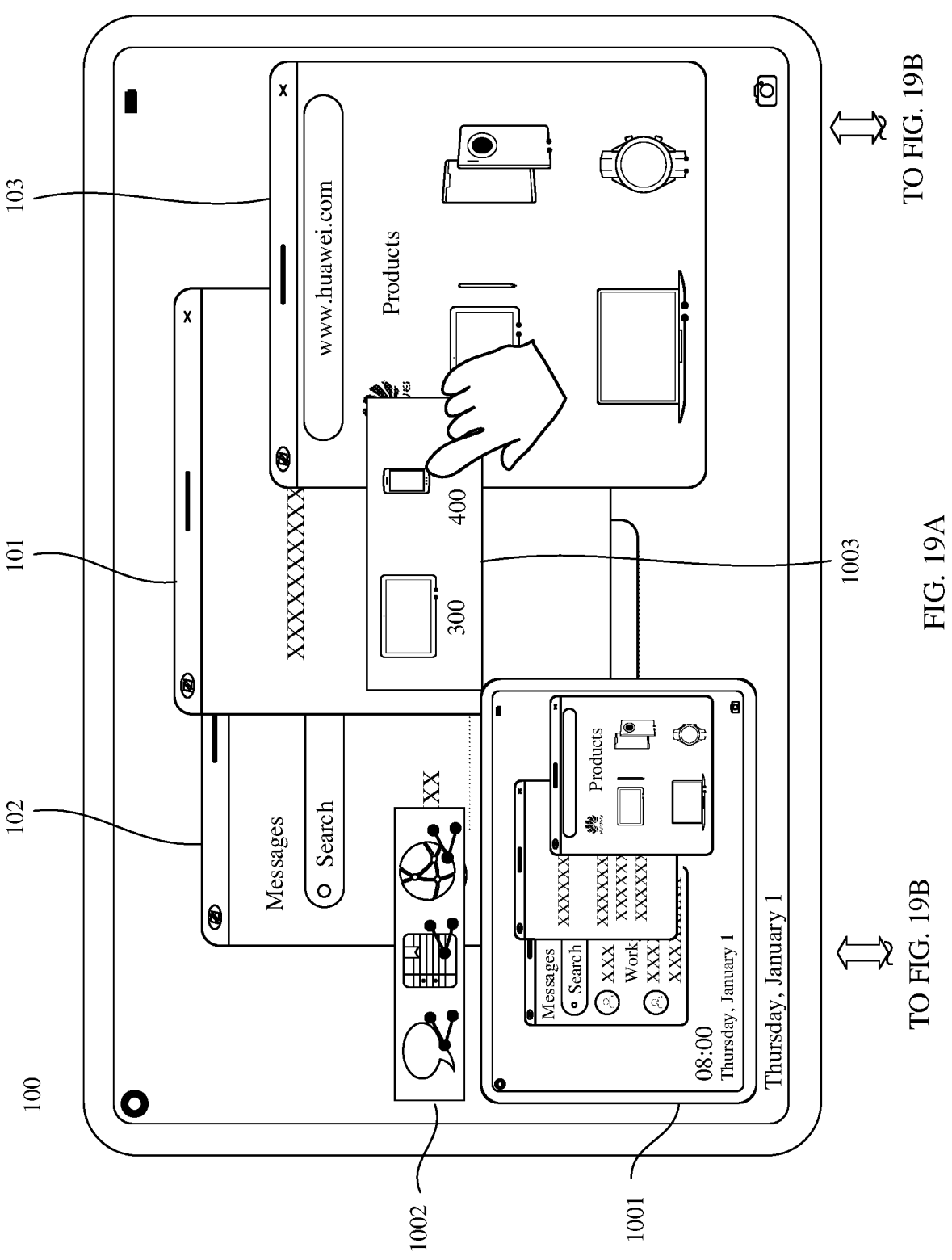

The third gesture operation may be a gesture operation of tapping performed on a sending object in the sending object list displayed on the screen of the electronic device 100 shown in FIG. 18A and FIG. 18B. For example, in the window in which the electronic device 300 and the electronic device 400 are displayed on the screen of the electronic device 100 shown in FIG. 18A and FIG. 18B, one of the two options is tapped as the sending object. An execution result corresponding to the third gesture operation may be: The electronic device 100 may send the second gesture operation in step S1604, that is, display content of the application corresponding to the icon on which the tapping operation is performed, to the sending object for display. For example, the user performs a gesture operation of tapping on the icon of the browser 103 on the screen of the electronic device 100 in step S1604, and after the user taps the option of the electronic device 400 in the window 1003 that includes the two options of the electronic device 300 and the electronic device 400 on the screen of the electronic device 100, that is, in the sending object list, as shown in FIG. 19A and FIG. 19B, the electronic device 400 starts the browser application to display content displayed by the browser 103 of the electronic device 100.

It may be understood that, in the scenario shown in FIG. 15A and FIG. 15B in embodiments of this application, the electronic device 100 is connected only to the electronic device 200, for example, the tablet computer 200, and a location of the screen of the electronic device 200 is set directly below the screen of the electronic device 100. However, in another embodiment of this application, the electronic device 100 may be connected to any quantity of electronic devices. In other words, the electronic device 100 may be connected to screens of any quantity of electronic devices, for example, two screens, four screens, or eight screens. This is not limited herein.

Figure 20:
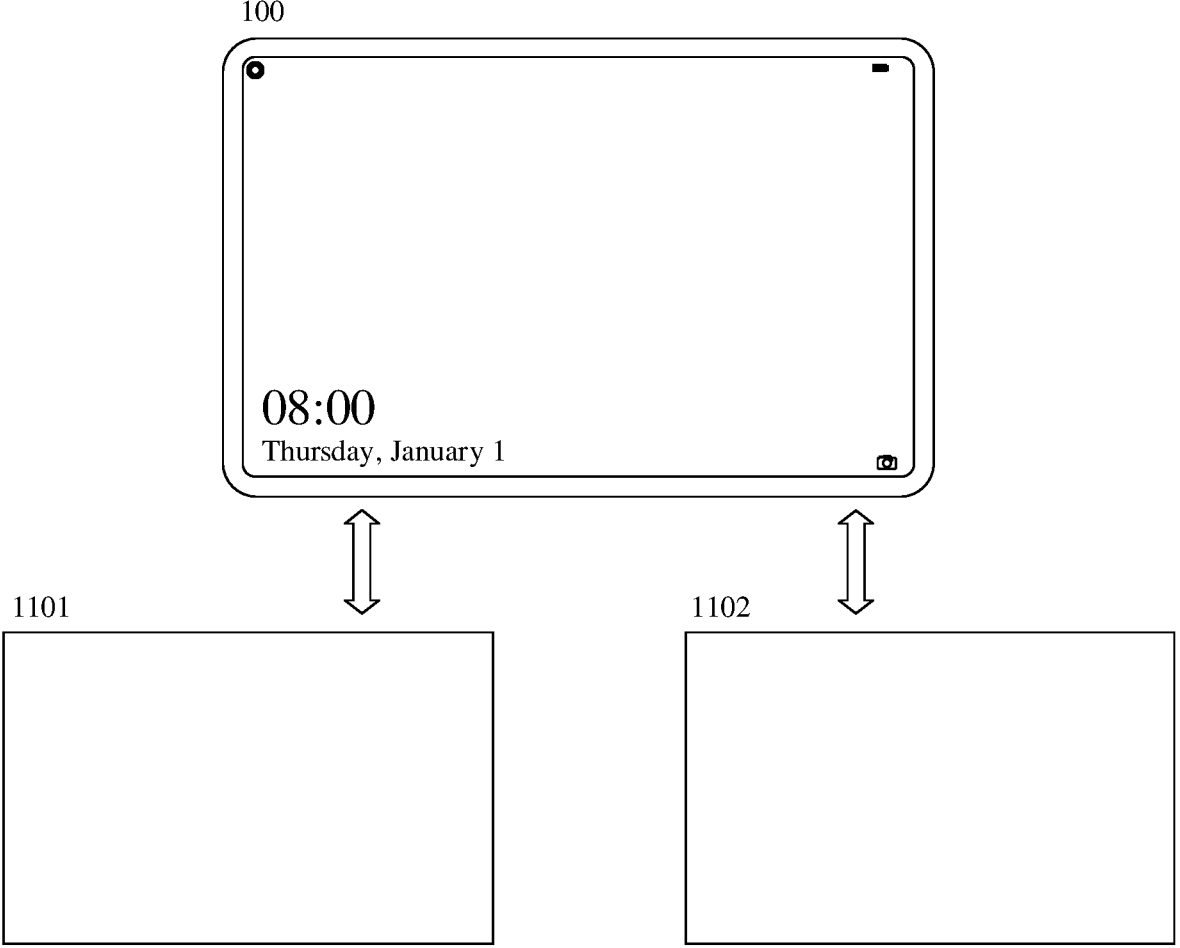
FIG. 20 is a diagram of a scenario in which an electronic device establishes a communication connection to a plurality of electronic devices according to an embodiment of this application.
Figure 21A:
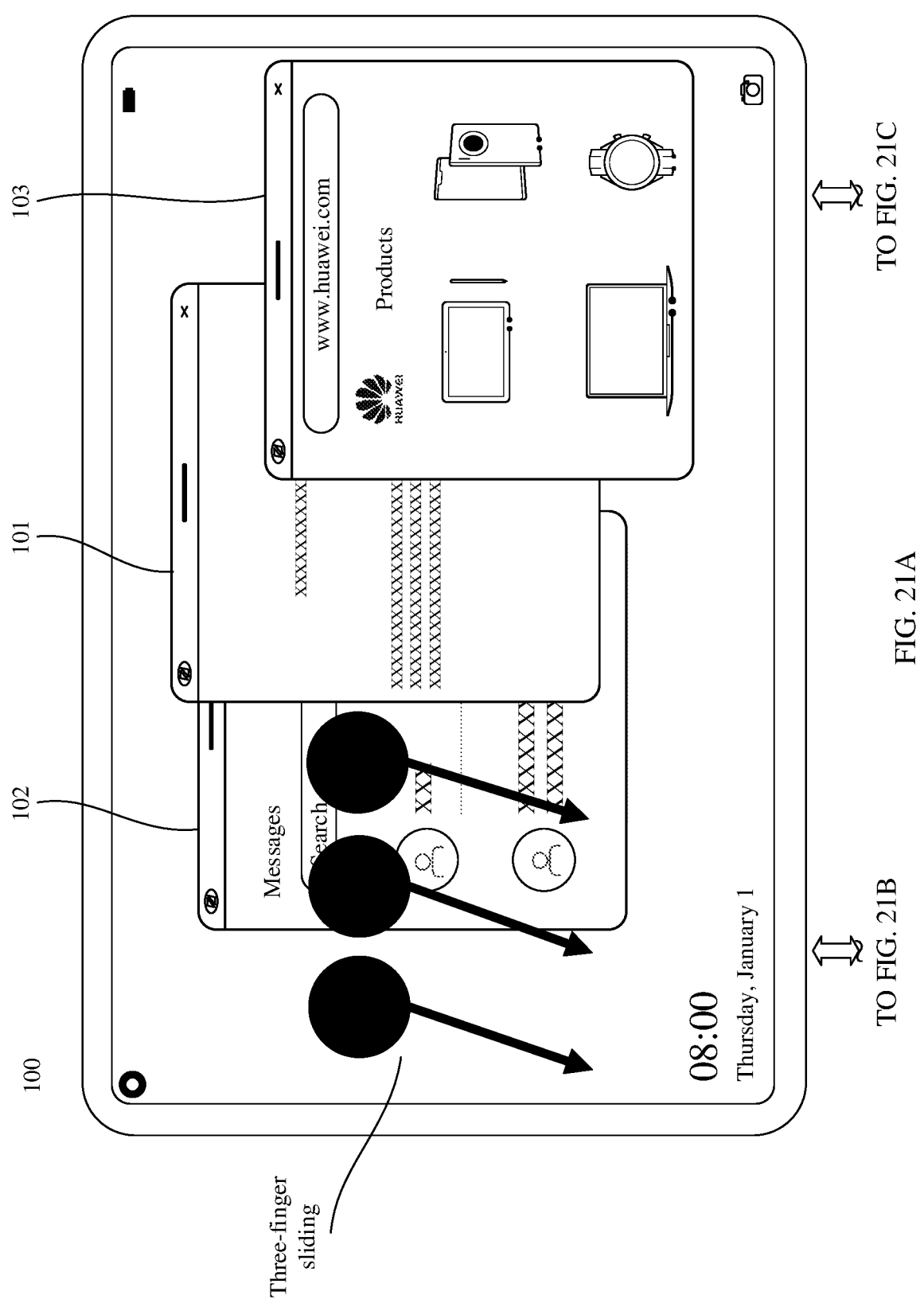
FIG. 21A to FIG. 21C are a diagram of a scenario in which an electronic device displays a screenshot of a screen and an icon of an application included in the screenshot on a second electronic device corresponding to a direction of a gesture operation according to an embodiment of this application.
Figures 21A, 21B:
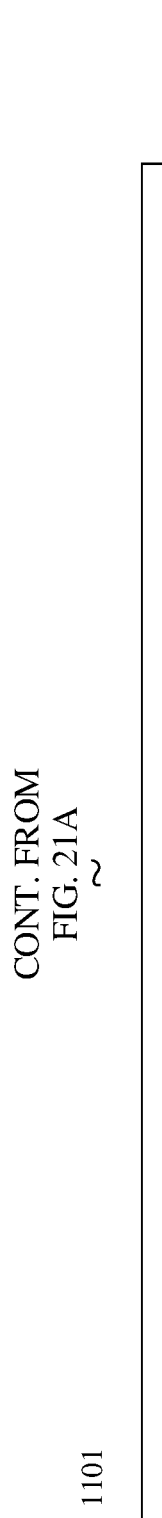
Figures 21A, 21C:
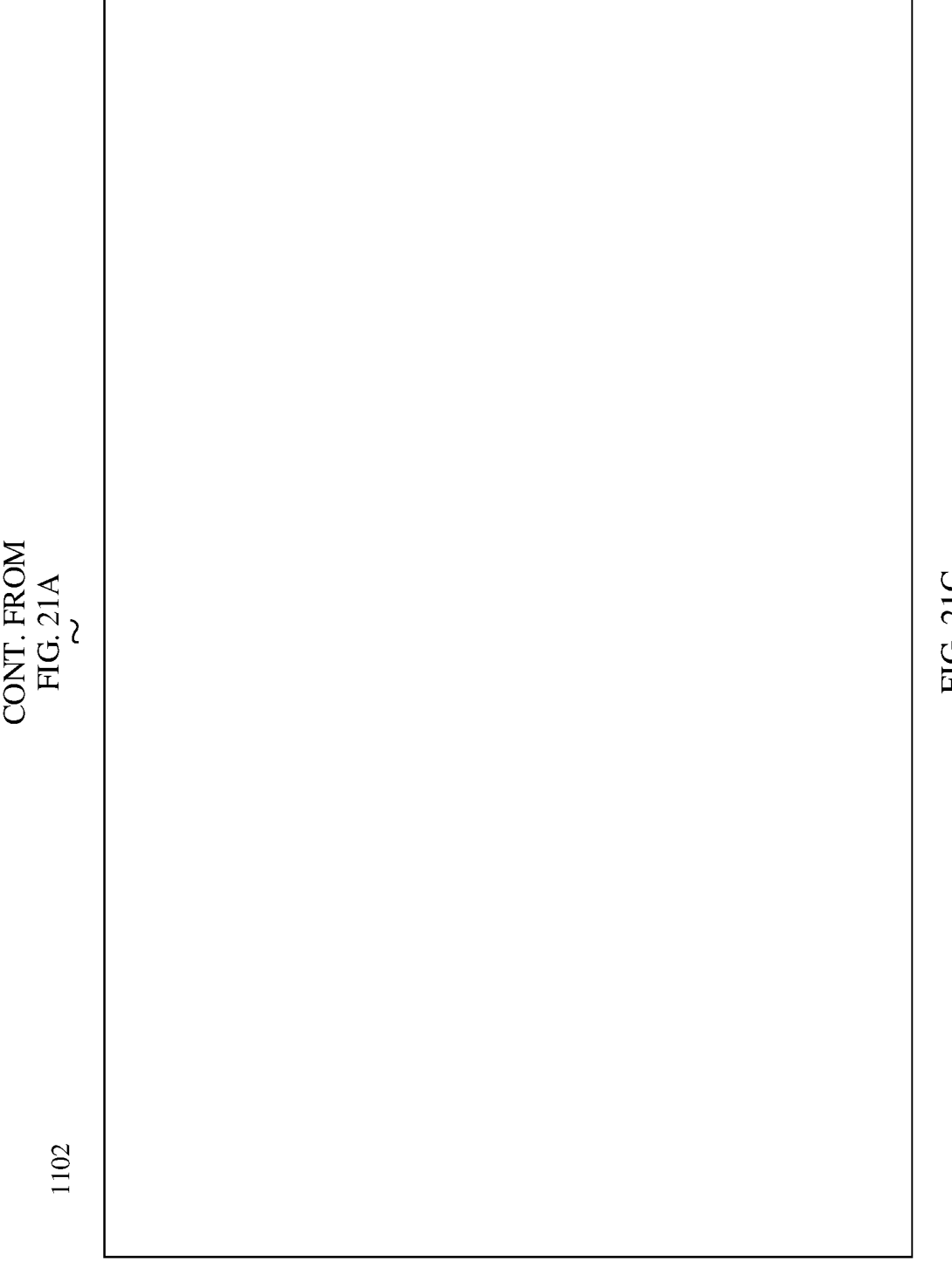

FIG. 20 shows a scenario in which an electronic device 100 is connected to screens of two electronic devices. As shown in FIG. 20, a user sets a screen of an electronic device 1101 and a screen of an electronic device 1102 at a lower left side and a lower right side of a screen of the electronic device 100. In the scenario in FIG. 20, based on a gesture operation already supported by the electronic device 100, a method for moving a window of an application from the electronic device 100 to the electronic device 1101 or the electronic device 1102 may be similar to steps S601 to S609 described in FIG. 6. That the gesture operation is three-finger sliding is used as an example. A difference lies in that a gesture direction of the three-finger sliding may correspond to a direction between the electronic device 1101 and the electronic device 1102 and the screen of the electronic device 100, for example, three-finger sliding lower right and three-finger sliding lower left. In addition, the electronic device 100 may display the execution result of the three-finger sliding, that is, the screenshot of the screen of the electronic device 100 and the application icon included in the screenshot, in a display area close to a screen side of the electronic device 100 on a screen of the electronic device in the gesture direction of the three-finger sliding. As shown in FIG. 21A to FIG. 21C, after the user performs the gesture operation of three-finger sliding lower left on the screen of the electronic device 100, the electronic device 100 displays a screenshot 11011 on an upper right side of the screen of the electronic device 1101, that is, a location close to the screen of the electronic device 100. The electronic device 100 displays an icon 11012 above the screenshot 11011, and sequentially displays the icons based on an order of the document application 101, the messages application 102, and the browser 103.

It may be understood that, in another embodiment of this application, for example, a gesture operation supported by the electronic device 100 is three-finger sliding. If the electronic device 100 detects that no electronic device connected to the electronic device 100 exists in the gesture direction of the three-finger sliding, the electronic device

Figure 22A:
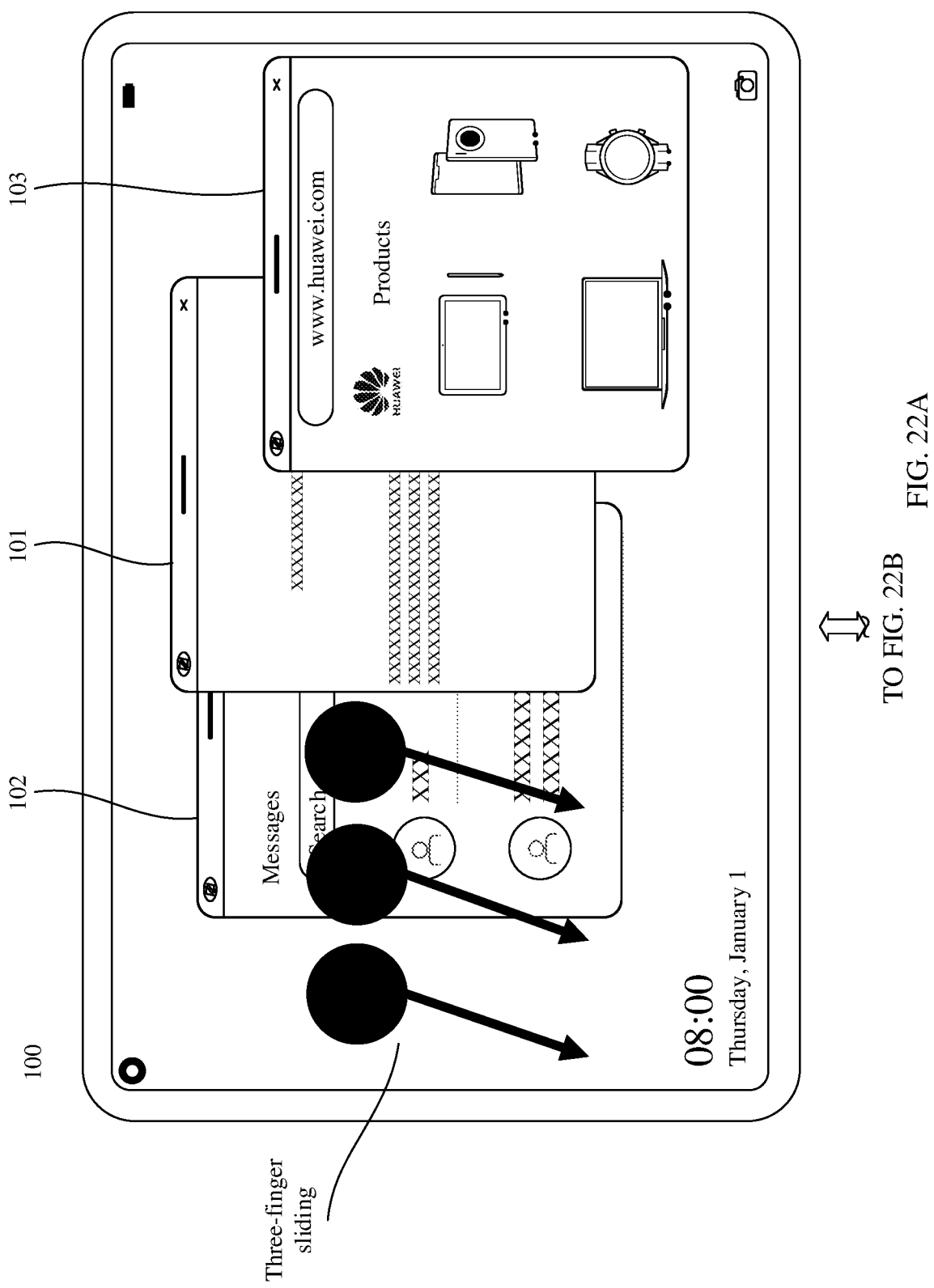
FIG. 22A and FIG. 22B are a diagram of a scenario in which an electronic device displays a screenshot of a screen and an icon of an application included in the screenshot on a local area of a screen of a second electronic device corresponding to a direction of a gesture operation according to an embodiment of this application.
Figures 22A, 22B:
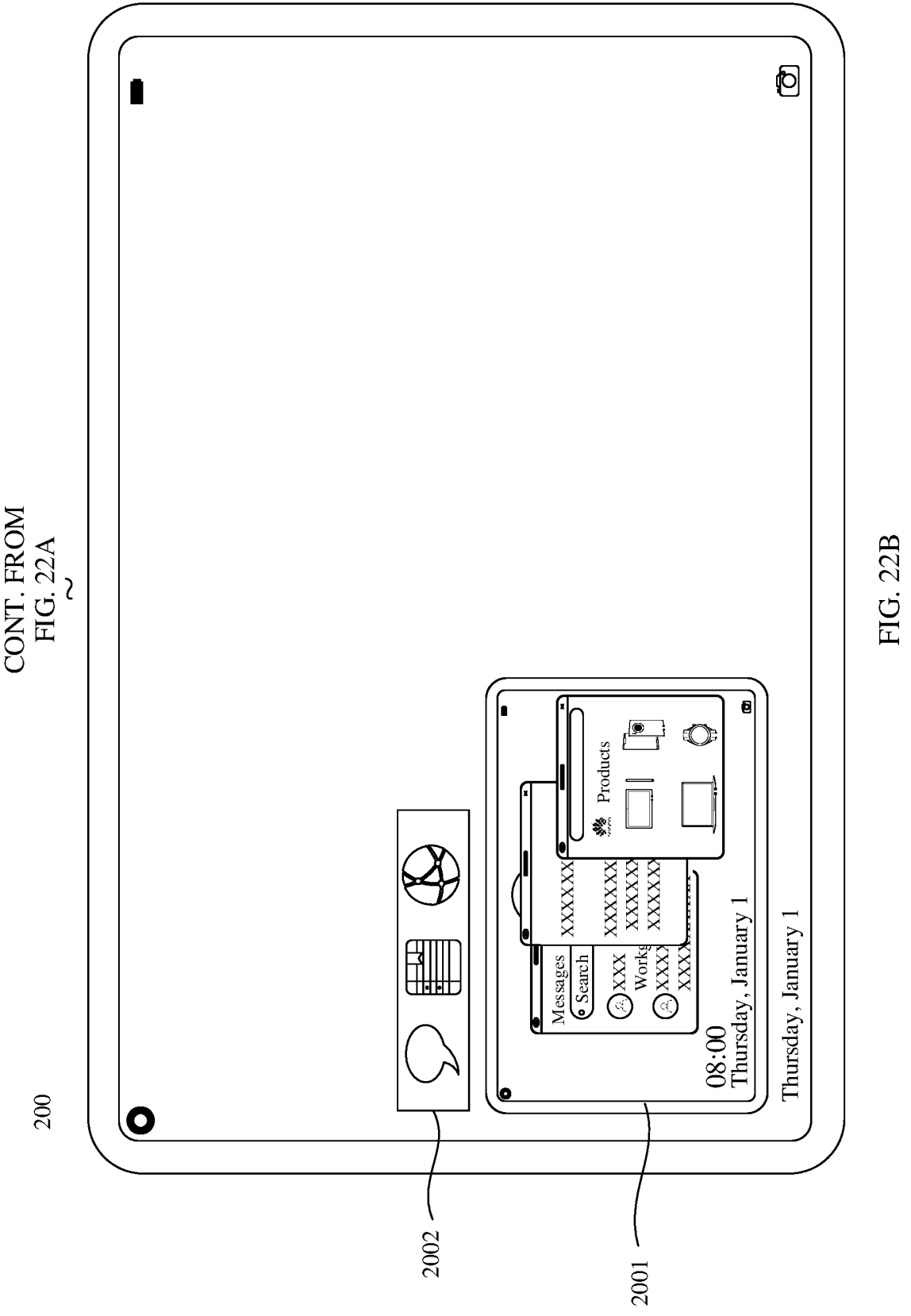

100 may choose to display the execution result of the gesture operation and the application identifier included in the execution result on a screen of an electronic device that is close to the gesture direction, so that the execution result and the application identifier included in the execution result are consistent with the gesture direction. For example, as shown in FIG. 22A and FIG. 22B, the electronic device 100 is connected to the electronic device 200 in an extended manner. The electronic device 200 is located directly below the electronic device 100, and the three-finger sliding performed by the user on the electronic device 100 is three-finger sliding lower left. When the electronic device 100 determines that there is no electronic device in a lower left location, the electronic device 100 may display the screenshot 2001 of the screen of the electronic device 100 and the icon 2002 of the application included in the screenshot 2001 on the screen of the electronic device 200. In addition, the screenshot 2001 and the icon 2002 may be located on a lower left side of the screen of the electronic device 100.

Figure 23:
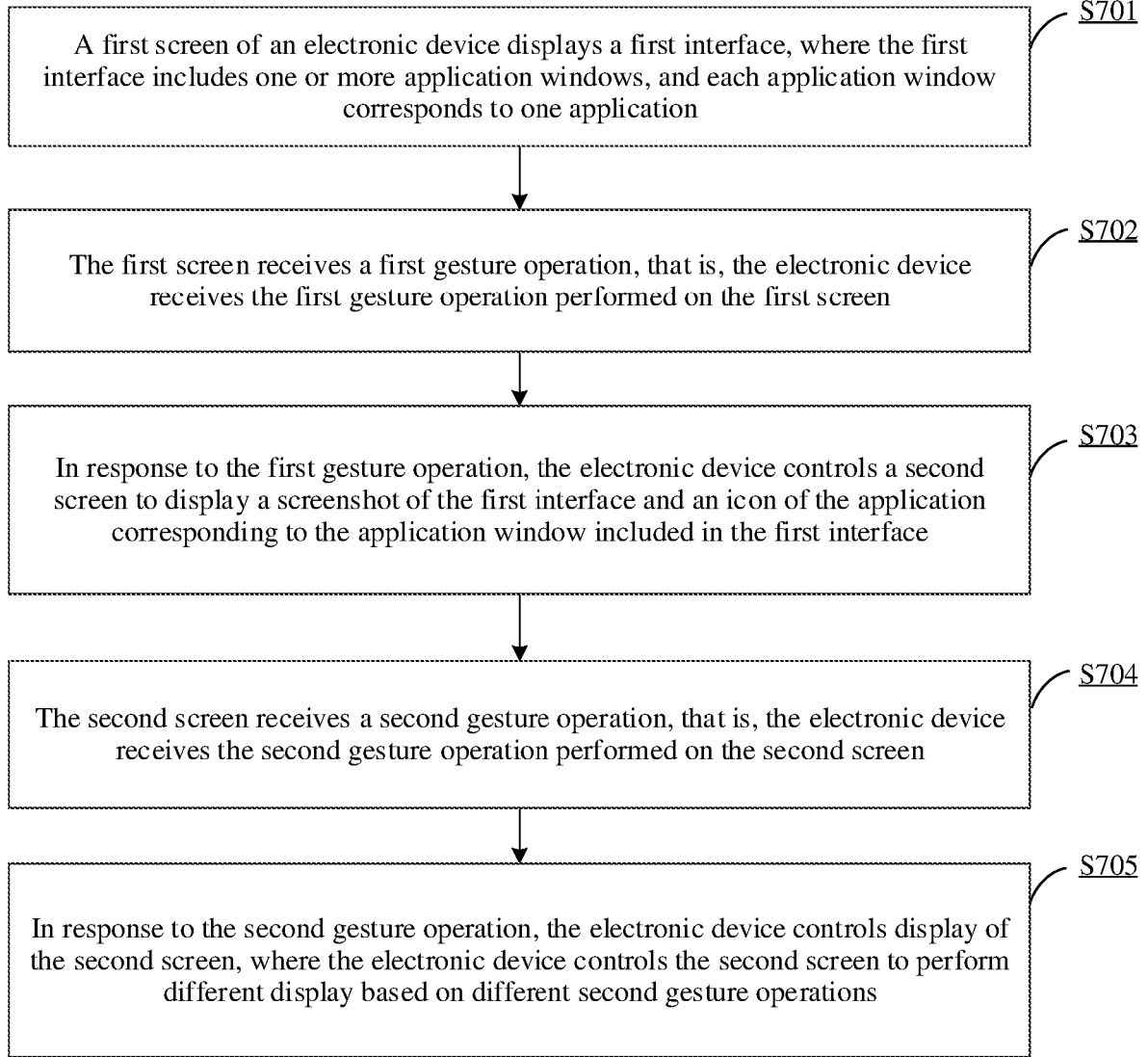
FIG. 23 is a flowchart of another human-computer interaction method of an electronic device according to an embodiment of this application.

FIG. 23 is a flowchart of another human-computer interaction method of an electronic device according to an embodiment of this application. The method is applied to an electronic device having two screens. The electronic device includes a first screen and a second screen.

S701: The first screen of the electronic device displays a first interface, where the first interface includes one or more application windows, and each application window corresponds to one application.

S702: The first screen receives a first gesture operation, that is, the electronic device receives the first gesture operation performed on the first screen.

S703: In response to the first gesture operation, the electronic device controls the second screen to display a screenshot of the first interface and an icon of an application corresponding to an application window included in the first interface.

S704: The second screen receives a second gesture operation, that is, the electronic device receives the second gesture operation performed on the second screen.

S705: In response to the second gesture operation, the electronic device controls display of the second screen. Based on different second gesture operations, the electronic device controls the second screen to perform different display.

For example, if the second gesture operation is a gesture operation of tapping performed on a screenshot displayed on the second screen, the electronic device controls the second screen or the first screen to display the screenshot in full screen, and then a user can perform an operation on the screenshot, or after a preset time, the electronic device automatically saves the screenshot.

If the second gesture operation is a gesture operation of tapping a first icon displayed on the second screen, the electronic device opens, on the second screen, an application corresponding to the first icon and displays a window of the application. For example, the application window may be displayed in full screen, or may be displayed in non-full screen. Content of the application window displayed on the second screen is the same as that of the application window previously displayed on the first screen. That is, migration of the application window from the first screen to the second screen is implemented based on the second operation.

If the second gesture operation is a gesture operation of dragging performed on the first icon displayed on the second screen, the electronic device opens, on the second screen, an application corresponding to the first icon, and displays a window of the application at different locations based on a dragging direction. For example, if the user drags the first icon on the second screen to the left of the screen, the electronic device may display, on a left split screen of the second screen, the application window corresponding to the first icon. If the user drags the first icon on the second screen to the right of the screen, the electronic device may display, on a right split screen of the second screen, the application window corresponding to the first icon. The dragging operation may be holding an icon and dragging the icon on the screen, or may be sliding on the screen after the icon is selected, but the icon may not be dragged.

In addition, for related content in this embodiment of this application, refer to the descriptions in the foregoing embodiments.

It should be understood that although terms such as "first" and "second" may be used herein to describe various features, these features should not be limited by these terms. These terms are merely used for distinction, and shall not be understood as an indication or implication of relative importance. For example, without departing from the scope of the example embodiments, a first feature may be referred to as a second feature, and similarly the second feature may be referred to as the first feature.

Furthermore, various operations will be described as a plurality of separate operations in a manner that is most conducive to understanding illustrative embodiments. However, a described sequence should not be construed as implying that these operations need to depend on the described sequence. A plurality of these operations may be performed in parallel, concurrently, or simultaneously. In addition, the sequence of the operations may be further rearranged. The processing may be terminated when the described operations are completed, but may also have additional operations not included in the figures. The processing may correspond to a method, a function, a procedure, a subroutine, a subprogram, or the like.

References to "an embodiment", "embodiments", "an illustrative embodiment", and the like in the specification indicate that the described embodiment may include a specific feature, structure, or property, but each embodiment may or may not necessarily include the specific feature, structure, or property. In addition, these phrases are not necessarily intended for a same embodiment. In addition, when specific features are described with reference to specific embodiments, knowledge of a person skilled in the art can affect combination of these features with other embodiments, regardless of whether these embodiments are explicitly described.

Unless otherwise stated, terms "contain", "have", and "include" are synonymous. A phrase "A/B" indicates "A or B". The phrase "A and/or B" indicates "(A), (B), or (A and B)".

As used herein, the term "module" may refer to being a part thereof, or include a memory (a shared memory, a dedicated memory, or a group memory) for running one or more software or firmware programs, an application-specific integrated circuit (ASIC), an electronic circuit and/or a processor (a shared processor, a dedicated processor, or a group processor), a combined logic circuit, and/or another proper component that provides the function.

In the accompanying drawings, some structure or method features may be shown in a specific arrangement and/or order. However, it should be understood that such a specific arrangement and/or order is not required. In some embodiments, these features may be described in a manner and/or order different from that shown in the descriptive accompanying drawings. In addition, structure or method features included in a specific accompanying drawing do not mean that all embodiments need to include such features. In some embodiments, these features may not be included, or these features may be combined with other features.

Embodiments of this application are described above in detail with reference to the accompanying drawings. However, use of the technical solutions of embodiments of this application is not limited to various applications mentioned in embodiments of this application, and various structures and variations may be easily implemented with reference to the technical solutions of embodiments of this application, to achieve various beneficial effects mentioned in this specification. Without departing from the purpose of embodiments of this application, any variation made within the scope of knowledge possessed by a person of ordinary skill in the art shall fall within the scope of embodiments of this application.

What is claimed is:

1. A method, comprising:
   receiving, by a second electronic device, a first picture and identification information of at least one application sent by a first electronic device based on a first operation, wherein the first picture comprises a screenshot of a first interface currently displayed by the first electronic device, wherein each application of the at least one application corresponds to an application window opened on the first interface, and wherein the identification information comprises an icon of each application of the at least one application, the icon of each application of the at least one application being separate from the first picture;
   displaying, by the second electronic device, the first picture and each icon corresponding to the at least one application, wherein the first picture covers at least a part of a display area of the second electronic device;
   receiving, by the second electronic device, a second operation performed on a first icon, wherein the first icon corresponds to a first application of the at least one application; and
   displaying, by the second electronic device in response to the second operation, an application window of the first application corresponding to the first icon, wherein content of the application window of the first application displayed by the second electronic device comprises a same content as that of an application window of the first application opened on the first interface.

2. The method according to claim 1, wherein displaying, by the second electronic device in response to the second operation, the application window of the first application corresponding to the first icon comprises:
   sending, by the second electronic device, a first instruction to the first electronic device in response to the second operation;
   receiving, by the second electronic device, first information sent by the first electronic device in response to the first instruction, wherein the first information indicates the application window of the first application corresponding to the first icon; and
   displaying, by the second electronic device based on the first information, the application window of the first application corresponding to the first icon.

3. The method according to claim 1, the method further comprising:
   before receiving, by the second electronic device, the first picture and the identification information of the at least one application, displaying, by the first electronic device, the first interface in full screen, wherein the first interface comprises at least one application window corresponding to the at least one application;

receiving, by the first electronic device, the first operation performed on the first interface; and sending, by the first electronic device in response to the first operation, the first picture and the identification information of the at least one application to the second electronic device.

4. The method according to claim 2, wherein displaying, by the second electronic device based on the first information, the application window of the first application corresponding to the first icon comprises:

displaying, by the second electronic device in full screen based on the first information and the second operation, the application window of the first application corresponding to the first icon.

5. The method according to claim 2, wherein displaying, by the second electronic device based on the first information, the application window of the first application corresponding to the first icon comprises:

displaying, by the second electronic device on a left side of a screen based on the first information and the second operation, the application window of the first application corresponding to the first icon.

6. The method according to claim 5, wherein the second operation comprises a dragging of the first icon to a first area of the screen of the second electronic device, and the first area is located on the left side of the screen of the second electronic device.

7. The method according to claim 2, wherein displaying, by the second electronic device based on the first information, the application window of the first application corresponding to the first icon comprises:

displaying, by the second electronic device on a right side of a screen, based on the first information and the second operation, the application window of the first application corresponding to the first icon.

8. The method according to claim 7, wherein the second operation comprises a dragging of the first icon to a first area of the screen of the second electronic device, wherein the first area is located on the right side of the screen of the second electronic device.

9. The method according to claim 2, wherein displaying, by the second electronic device based on the first information, the application window of the first application corresponding to the first icon comprises:

displaying, by the second electronic device on an upper side of a screen, based on the first information and the second operation, the application window of the first application corresponding to the first icon.

10. The method according to claim 9, wherein the second operation comprises a dragging of the first icon to a first area of the screen of the second electronic device, wherein the first area is located on the upper side of the screen of the second electronic device.

11. The method according to claim 2, wherein displaying, by the second electronic device based on the first information, the application window of the first application corresponding to the first icon comprises:

displaying, by the second electronic device on a lower side of a screen, based on the first information and the second operation, the application window of the first application corresponding to the first icon.

12. The method according to claim 11, wherein the second operation comprises a dragging of the first icon to a first area of the screen of the second electronic device, wherein the first area is located on the lower side of the screen of the second electronic device.

13. The method according to claim 1, wherein the second electronic device is connected to the first electronic device in a wireless or wired manner; or the second electronic device and the first electronic device are connected to a same wireless local area network; or the second electronic device and the first electronic device are logged in with a same user account; or the second electronic device is an extended screen of the first electronic device; or the second electronic device and the first electronic device respectively comprise two screens of a same electronic device.

14. The method according to claim 1, wherein the first operation comprises a three-finger sliding operation; or the first icon corresponding to the first application of the at least one application is displayed above, below, to the left of, or to the right of the first picture.

15. A method, applied to an electronic device comprising a first screen and a second screen, the method comprising:

displaying, by the first screen, a first interface in full screen, wherein the first interface comprises at least one application window corresponding to at least one application;

receiving, by the first screen, a first operation performed on the first interface;

controlling, by the electronic device in response to the first operation, the second screen to display a first picture and an icon of each application of the at least one application, wherein the first picture is a screenshot of the first interface, and the first picture covers at least a part of a display area of the second screen;

receiving, by the second screen, a second operation performed on a first icon, wherein the first icon corresponds to a first application of the at least one application; and displaying, by the second screen in response to the second operation, an application window of the first application corresponding to the first icon, wherein content of the application window of the first application displayed on the second screen comprises the same content as that of an application window of the first application opened on the first interface, wherein the icon of each application of the at least one application is separate from the first picture.

16. The method according to claim 15, wherein the first operation comprises at least one of sliding up, sliding down, sliding left, sliding right, sliding lower left, sliding lower right, sliding upper left, or sliding upper right on the first interface.

17. The method according to claim 15, wherein displaying, by the second screen in response to the second operation, the application window of the first application corresponding to the first icon comprises:

controlling, by the electronic device in response to the second operation, the second screen to display the application window of the first application corresponding to the first icon.

18. The method according to claim 15, wherein displaying, by the second screen in response to the second operation, the application window of the first application corresponding to the first icon comprises:

displaying, by the second screen in full screen in response to the second operation, the application window of the first application corresponding to the first icon.

19. The method according to claim 15, wherein displaying, by the second screen in response to the second operation, the application window of the first application corresponding to the first icon comprises:

displaying, by the second screen on a left side of the second screen in response to the second operation, the application window of the first application corresponding to the first icon.

20. An electronic device, comprising:

at least one processor; and at least one memory coupled to the at least one processor and configured to store programming instructions that, when executed by the at least one processor, cause the electronic device to:

receive a first picture and identification information of at least one application sent by an other electronic device based on a first operation, wherein the first picture comprises a screenshot of a first interface currently displayed by the other electronic device, wherein each application of the at least one application corresponds to an application window opened on the first interface, and wherein the identification information comprises an icon of the each application of the at least one application;

display the first picture and each icon of the at least one application, wherein the first picture covers at least a part of a display area of the electronic device;

receive a second operation performed on a first icon, wherein the first icon corresponds to a first application of the at least one application; and display, in response to the second operation, an application window of the first application corresponding to the first icon, wherein content of the application window of the first application displayed by the electronic device comprises a same content as that of an application window of the first application opened on the first interface, wherein the icon of each application of the at least one application is separate from the first picture.

* * * * *